United States Patent
Clark et al.

(10) Patent No.: US 11,468,559 B2
(45) Date of Patent: Oct. 11, 2022

(54) CELLULAR ANALYSIS

(71) Applicant: The University of Chicago, Chicago, IL (US)

(72) Inventors: Marcus R. Clark, Chicago, IL (US); Maryellen L. Giger, Elmhurst, IL (US); Vladimir M. Liarski, Chicago, IL (US); Adam Sibley, Corpus Christi, TX (US)

(73) Assignee: THE UNIVERSITY OF CHICAGO, Chicago, IL (US)

(*) Notice: Subject to any disclaimer, the term of this patent is extended or adjusted under 35 U.S.C. 154(b) by 0 days.

(21) Appl. No.: 16/607,218

(22) PCT Filed: Apr. 25, 2018

(86) PCT No.: PCT/US2018/029426
§ 371 (c)(1),
(2) Date: Oct. 22, 2019

(87) PCT Pub. No.: WO2018/200715
PCT Pub. Date: Nov. 1, 2018

(65) Prior Publication Data
US 2020/0380672 A1 Dec. 3, 2020

Related U.S. Application Data

(60) Provisional application No. 62/489,605, filed on Apr. 25, 2017.

(51) Int. Cl.
*G06T 7/00* (2017.01)
*G06T 7/136* (2017.01)
(Continued)

(52) U.S. Cl.
CPC ............ *G06T 7/0012* (2013.01); *G06T 7/136* (2017.01); *G06T 7/143* (2017.01); *G06T 7/73* (2017.01);
(Continued)

(58) Field of Classification Search
CPC . G06T 2207/10056; G06T 2207/20024; G06T 2207/20081; G06T 2207/20084;
(Continued)

(56) References Cited

U.S. PATENT DOCUMENTS 8,300,938 B2   10/2012  Can et al.
9,613,254 B1*  4/2017  Sarachan ............. G06K 9/6215
(Continued)

OTHER PUBLICATIONS

Van Valen, David A., et al. "Deep learning automates the quantitative analysis of individual cells in live-cell imaging experiments." PLoS computational biology 12.11 (2016): e1005177. (Year: 2016).*
(Continued)

*Primary Examiner* — Andrae S Allison
(74) *Attorney, Agent, or Firm* — Bell & Manning, LLC

(57) ABSTRACT

A method of analyzing cell populations includes receiving, by a transceiver of a computing device, an image of a tissue sample. The method also includes analyzing, by a processor of the computing device, the image of the tissue sample using image analysis. The image analysis parameters are determined by machine learning. The method also includes determining, by the processor and based on the analyzing, one or more cell features, such as shape, of a cell in the tissue sample. The method further includes identifying, by the processor, an interaction of the cell with an additional cell based at least in part on the shape of the cell.

17 Claims, 52 Drawing Sheets

(51) Int. Cl.
G06T 7/143 (2017.01)
G06T 7/73 (2017.01)
(52) U.S. Cl.
CPC ........... G06T 2207/10056 (2013.01); G06T 2207/20024 (2013.01); G06T 2207/20081 (2013.01); G06T 2207/20084 (2013.01); G06T 2207/30024 (2013.01)
(58) Field of Classification Search
CPC ......... G06T 2207/30024; G06T 7/0012; G06T 7/136; G06T 7/143; G06T 7/73
See application file for complete search history.

(56) References Cited

U.S. PATENT DOCUMENTS

| 2009/0325810 | A1 | 12/2009 | Lapointe et al. | |
|---|---|---|---|---|
| 2010/0111916 | A1 | 5/2010 | Xiang | |
| 2010/0150423 | A1* | 6/2010 | Hong | G06K 9/342 382/133 |
| 2013/0126755 | A1 | 5/2013 | Kemnitz | |
| 2016/0042511 | A1* | 2/2016 | Chukka | G06T 7/0012 382/133 |
| 2017/0003267 | A1* | 1/2017 | Meyer | G01N 33/4833 |
| 2017/0091527 | A1 | 3/2017 | Sarachan et al. | |
| 2017/0309021 | A1* | 10/2017 | Barnes | G06T 7/0012 |

OTHER PUBLICATIONS

Mues, Marsilius, et al. "Real-time in vivo analysis of T cell activation in the central nervous system using a genetically encoded calcium indicator." Nature medicine 19.6 (2013): 778-783. (Year: 2013).*
Anbeek, Petronella, et al. "Probabilistic brain tissue segmentation in neonatal magnetic resonance imaging." Pediatric research 63.2 (2008): 158-163. (Year: 2008).*
Al-Kofahi et al, Improved Automatic Detection and Segmentation of Cell Nuclei in Histopathology Images, IEEE Transactions on Biomedical Engineering, vol. 57, No. 4, Apr. 2010 841 (Year: 2010).*
Liarski, Vladimir M., et al. "Cell distance mapping identifies functional T follicular helper cells in inflamed human renal tissue." Science translational medicine 6.230 (2014): 230ra46-230ra46. (Year: 2014).*
Liarski et al., "Cell Distance Mapping Identifies Functional T Follicular Helper Cells in Inflamed Human Renal Tissue," www.ScienceTranslationalMedicine.org, Apr. 2, 2014, vol. 6, Issue 230, pp. 1-11.
The PCT Notification Concerning Transmittal of International Preliminary Report on Patentability issued in International application No. PCT/US2018/029426 dated Nov. 7, 2019, pp. 1-8.
The Partial Supplementary European Search Report dated Dec. 21, 2020 issued for EP Patent Application No. 18791433.8; pp. 1-14.
Thomas J. Fellers et al., "Introduction to Confocal Microscopy," Dec. 17, 2012, XP055756950, retrieved from the Internet: URL:https://www.ed.unc.edu/microscopy/files/2018/06/introduction-to-confocal-microscopy.pdf [retrieved on Dec. 4, 2020], pp. 1-7.
Syed Saiden Abbas et al., "A comparative study of cell classifiers for image-based high-throughput screening," BMC Bioinformatics 2014, vol. 15, No. 342, pp. 1-10.
The Extended European Search Report dated Mar. 22, 2021 for EP Patent Application No. 18 791 433.8; pp. 1-11.

* cited by examiner

CD3/LFA1/CAM/MHC

CD3/LFA1/ICAM/MHC

CD3/LFA1/ICAM/MHC

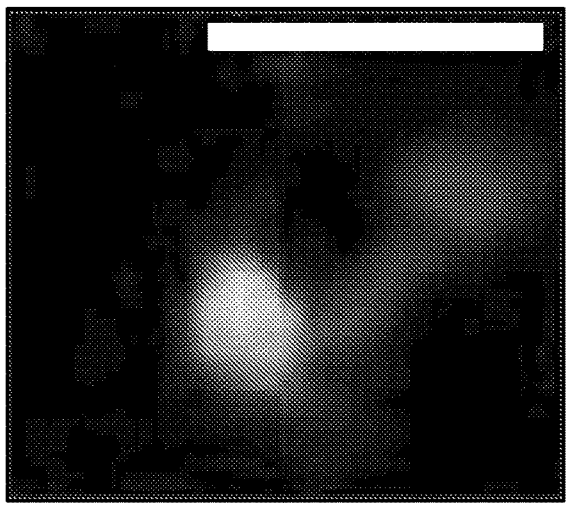
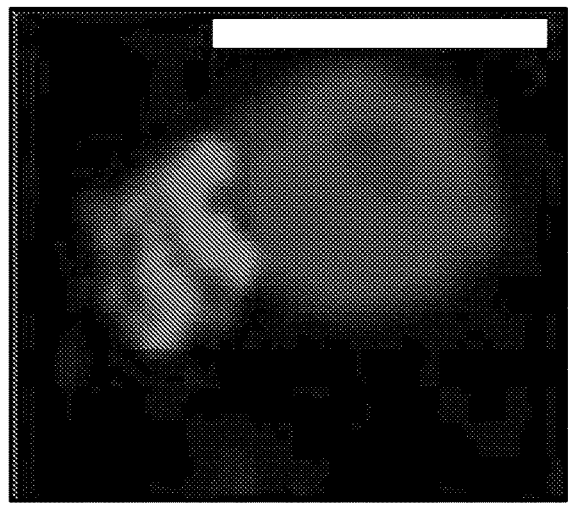
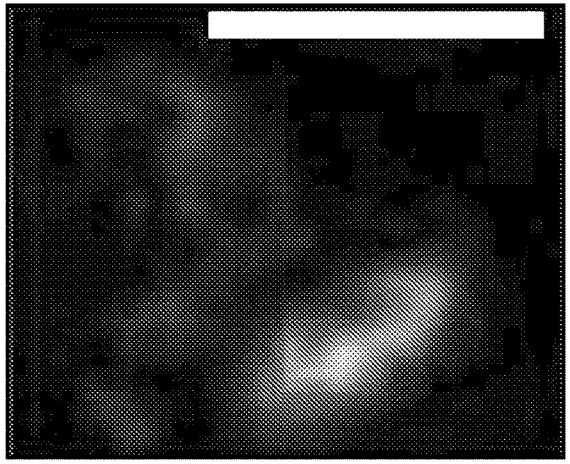
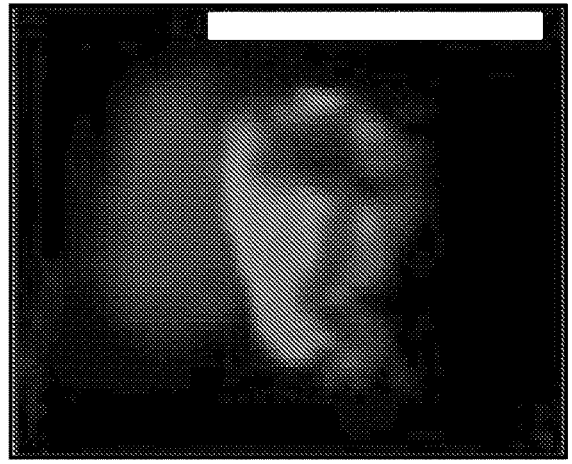
FIG. 8A  FIG. 8B

|  | TPEM | | CDM | | Independent Validation | |
|---|---|---|---|---|---|---|
| Number of Lymph Nodes | 7 | | 4 | | 3 | |
| Number of ROIs | 295 | | 295 | | 233 | |
| Cell Type | WT | 5CC7 | WT | 5CC7 | WT | 5CC7 |
| Cell Velocity | 99 | 98 | | | | |
| Arrest Coefficient | 405 | 410 | | | | |
| Interactions | 111 | 173 | | | | |
| Manual Traning | | | 867 | 946 | | |
| Automatic Segmentation | | | 297 | 364 | 637 | 1222 |

FIG. 9

| Mouse segmentation performance | | | |
|---|---|---|---|
| Average IOU score +/- 1 stdev | Ta | Tw | dendritic |
|  | 0.81 +/- 0.11 | 0.76 +/- 0.10 | 0.90 +/- 0.06 |
| Sensitivity | 0.80 | 0.90 | 0.93 |
| Specificity | 0.88 | 0.91 | 0.97 |

FIG. 12

|  | Logistic Regression | Random Forest | SVM | Tuned Neural Network |
|---|---|---|---|---|
| AUC | 0.84 | NA | 0.75 | 0.82 |
| AUC 95% CI | (0.626-0.932) | NA | NA | (0.77-0.91) |
| Accuracy | 0.76 | NA | 0.77 | 0.80 |
| Classification Error | 0.22 | 0.10 for split 1, 0.49 for split 2 | 0.20 | 0.18 |

FIG. 13A

|  | Simple NN | Linear Output NN | Tuned NN |
|---|---|---|---|
| AUC | 0.61 | NA | 82.1 |
| AUC 95% CI | 0.37-0.81 | NA | 76.8-91.3 |
| Accuracy | 0.62 | 0.65 | 0.79 |
| Steps | 351 | 1764 | 11860 |
| Cross Entropy Error | 19.74 | 16.17 | 2.31 |

FIG. 13B

| | pDC | mDC |
|---|---|---|
| Manual Training Set | | |
| Biopsies | 7 | 2 |
| ROIs | 172 | 71 |
| CD3+CD4+ | 2035 | 473 |
| CD3+CD4- | 1119 | 249 |
| Dendritic Cells | 1176 | 256 |
| Full Data Set | | |
| Biopsies | 22 | 22 |
| ROIs | 364 | 323 |
| Mean TI score | 1.91±1.02 | 1.95±1.00 |
| 0: no TI | 2 | 2 |
| 1: ≤25% TI involvement | 6 | 5 |
| 2: ≤50% TI involvement | 6 | 7 |
| 3: >50% TI involvement | 8 | 8 |
| CD3+CD4+ | 8071 | 3843 |
| CD3+CD4- | 3195 | 1568 |
| Dendritic Cells | 4121 | 2518 |
| Mean number of CD3+CD4+/DC | 1.95 | 1.53 |
| Mean number of CD3+CD4-/DC | 0.78 | 0.62 |

FIG. 16

|  | mDC | pDC |
|---|---|---|
| Number of Biopsies | 25 | 25 |
| Mean TI Score | 1.91±1.02 | 1.95±1.00 |
| 0: No TI | 2 | 2 |
| 1: ≤25% TI Involvement | 6 | 5 |
| 2: ≤50% TI Involvement | 6 | 7 |
| 3: >50% TI Involvement | 8 | 8 |
| Number of ROIs | 161 | 388 |
| $CD3^+CD4^+$ | 101 (62.7)% | 496 (59.8%) |
| $CD3^+CD4-$ | 60 (37.3%) | 182 (40.2%) |
| Number of Total T Cells | 765 | 324.6 |
| Number of $CD3^+CD4^+$ | 517 (67.6%) | 2131 (65.7%) |
| Number of $CD3^+CD4-$ | 248 (32.4%) | 1115 (34.3%) |
| Number of Dendritic Cells | 522 | 1608 |
| Mean Number of T Cells Per DC | 1.47 | 2.02 |
| $CD3^+CD4^+$ | 0.99 | 1.33 |
| $CD3^+CD4-$ | 0.48 | 0.69 |
| TI Score 3 |  |  |
| Number of Total T Cells | 747 | 3083 |
| $CD3^+CD4^+$ | 499 | 2010 |
| $CD3^+CD4-$ | 248 | 1073 |
| Number of Dendritic Cells | 416 | 1440 |
| Mean Number of T Cells Per DC | 1.80 | 2.14 |
| $CD3^+CD4^+$ | 1.20 | 1.40 |
| $CD3^+CD4-$ | 0.60 | 0.75 |
| TI Score 2 |  |  |
| Number of Total T Cells | NA | 69 |
| $CD3^+CD4^+$ | NA | 49 |
| $CD3^+CD4-$ | NA | 20 |
| Number of Dendritic Cells | NA | 86 |
| Mean Number of T Cells Per DC | NA | 0.80 |
| $CD3^+CD4^+$ | NA | 0.57 |
| $CD3^+CD4-$ | NA | 0.23 |

FIG. 18

| A | B | C | D |
|---|---|---|---|
| TI Score 1 | | | |
| Number of Total T Cells | | 18 | 94 |
| CD3$^+$CD4$^+$ | | 18 | 72 |
| CD3$^+$CD4- | | 0 | 22 |
| Number of Dendritic Cells | | 106 | 82 |
| Mean Number of T Cells Per DC | | 0.17 | 1.15 |
| CD3$^+$CD4$^+$ | | 0.17 | 0.90 |
| CD3$^+$CD4- | | 0 | 0.27 |
| TI Score 0 | | | |
| Number of Total T Cells | | NA | NA |
| CD3$^+$CD4$^+$ | | NA | NA |
| CD3$^+$CD4- | | NA | NA |
| Number of Dendritic Cells | | NA | NA |
| Mean Number of T Cells Per DC | | NA | NA |
| CD3$^+$CD4$^+$ | | NA | NA |
| CD3$^+$CD4- | | NA | NA |

**FIG. 18
(Continued)**

CELLULAR ANALYSIS

CROSS-REFERENCE TO RELATED APPLICATION

This application is a National Stage of International Application No. PCT/US2018/029426, filed Apr. 25, 2018, which claims the benefit of U.S. Patent Application No. 62/489,605, filed Apr. 25, 2017, the contents of which are herein incorporated by reference.

GOVERNMENT LICENSE RIGHTS

This invention was made with government support under 5 U19 AI082724 awarded by the NIH/NIAID, under 5 R01-AR055646 awarded by the NIH/NIAMS, and under T32 EB002103 by the NIH. The government has certain rights in the invention.

BACKGROUND

The immune system of a body refers to a network of cells, tissues, and organs that work together to defend the body against antigens such as bacteria, parasites, and fungi that cause illness or infection. In a healthy individual, the immune system works to prevent illnesses and helps cure the body when an illness is contracted. However, in an individual with an autoimmune disease, the immune system attacks healthy cells, which can result in organ or tissue damage, abnormal organ growth, changes in organ function, etc. Physicians and researchers have identified approximately 80 different autoimmune diseases, and it is estimated that autoimmune diseases affect upwards of 50 million Americans. Common autoimmune diseases include lupus, rheumatoid arthritis, type 1 diabetes, chronic kidney disease, rheumatoid arthritis, Sjögren's syndrome, celiac disease, Crohn's disease, ulcerative colitis, multiple sclerosis, Grave's disease, Hashimoto's thyroiditis, Henoch-Schonlein purpura, Immune thrombocytopenic purpura, and psoriasis.

SUMMARY

An illustrative method of analyzing cells includes receiving, by a transceiver of a computing device, an image of a tissue sample. The method also includes analyzing, by a processor of the computing device, the image of the tissue sample using machine learning, for example, deep learning with a convolutional neural network. "Deep learning" is a class of machine learning algorithms that use a cascade of many layers of processing units for feature extraction, filtering, segmentation, and/or transformation. The method determines, by the processor, both the relative positions of individual cells in different cell populations in a tissue sample as well as the shape of each cell within each population. With this information, the method can then identify which cell populations are interacting and thereby infer functional cell networks, such as, but not limited to, immune cell networks. The method can be applied to any tissue and therefore any disease which is manifested in organs.

Another illustrative method of analyzing cell populations includes receiving, by a transceiver of a computing device, an image of a tissue sample. The method also includes analyzing, by a processor of the computing device, the image of the tissue sample using image analysis. The image analysis parameters are determined by machine learning. The method also includes determining, by the processor and based on the analyzing, a shape of a cell in the tissue sample. The method further includes identifying, by the processor, an interaction of the cell with an additional cell based at least in part on the shape of the cell.

Another illustrative method of analyzing cells includes receiving, by a transceiver of a computing device, an image of a tissue sample. The method also includes segmenting, by a processor of the computing device, the image of the tissue sample using image analysis. Image analysis parameters are determined by deep learning.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 6F depicts sensitivity and specificity of CDM composite measure (distance plus 10 T cell shape characteristics) to discriminate antigen specific from WT T cells less than 24 µm in accordance with an illustrative embodiment. This is an initial preliminary analysis on subset of data. A final analysis based on a full mouse data set provided is in FIG. 14. As discussed herein, conclusions that can be made from analyses in FIGS. 6 and 14 are similar.

FIG. 7D depicts sensitivity and specificity of discriminating between CD3+CD4+ and CD3+CD4− cells interacting with pDCs at all distances (AUC=0.67, $p=10^{-5}$) in accordance with an illustrative embodiment. Full, complete analysis of entire data set provided in FIG. 15. Conclusions that can be derived from experiments in FIGS. 7 and 15 are similar.

FIG. 8A depicts confocal microscopy of WT cells interacting with DCs in accordance with an illustrative embodiment.

FIG. 8B depicts examples of 5CC7 cells interacting with DCs in accordance with an illustrative embodiment.

FIG. 9 is a table that includes a summary of mouse data sets used by the CDM system in accordance with an illustrative embodiment.

FIG. 10B is a more complete schematic drawing of the same DCNN summarized in FIG. 10A.

FIG. 12 is a table depicting mouse segmentation performance data in accordance with an illustrative embodiment.

FIG. 13A is a table depicting a comparison of four models used for analysis of mouse nuclear segmentation at a minimum distance cutoff of ≤25 µm in accordance with an illustrative embodiment.

FIG. 13B is a comparison of three neural network models for the dataset depicted in FIG. 13A in accordance with an illustrative embodiment.

FIG. 16 is a table depicting a summary of the human data sets used to test the CDM system in accordance with an illustrative embodiment.

FIG. 18 is a table depicting a summary of lupus nephritis biopsies used for training and analysis in accordance with an illustrative embodiment.

DETAILED DESCRIPTION

Figure 1A:
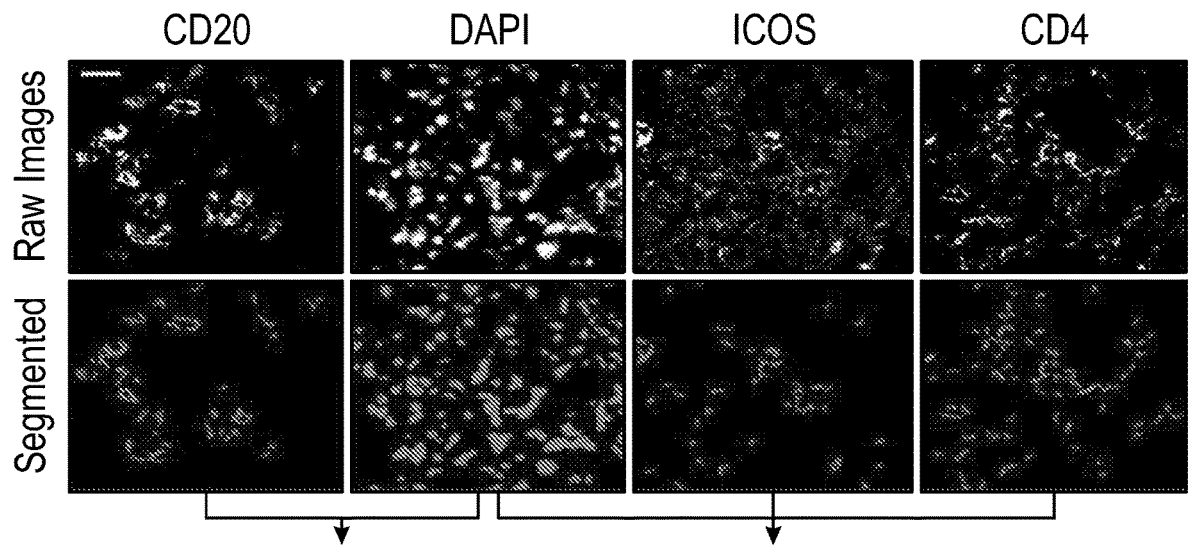
FIG. 1A depicts representative confocal raw images for the indicated markers (top row) and those same images after filtering and segmentation in accordance with an illustrative embodiment.

As discussed above, autoimmune diseases affect millions of individuals worldwide. Unfortunately, to date, researchers and physicians do not fully understand the causes of autoimmune diseases or the cellular interactions that occur during such illnesses that result in inflammation and other symptoms. Single cell technologies, such as Ribonucleic Acid (RNA)-Sequencing, have now made it possible to identify rare inflammatory cell populations infiltrating human tissue. However, with this reductionist approach, information regarding the cellular architecture of inflammation is lost. Furthermore, there are currently no tools available to understand how these cell populations are organized in inflammation and to identify underlying adaptive cell networks. This lack of tools not only limits the ability of scientists to understand human autoimmunity. It limits the ability of scientists to understand how immune responses against solid cancers influence tumor growth and how productive immune responses are mounted against infections in tissue.

Identifying and quantifying such cellular networks is critical for determining which cells and cell-mediated process are causing damage in affected organs in a wide-variety of autoimmune diseases including lupus nephritis and renal allograft rejection, two diseases in which the methods described herein have been validated. Such knowledge is instrumental in guiding treatment with biological therapies in a wide variety of autoimmune and inflammatory diseases.

In addition, it is now appreciated that productive immune responses to cancer can eradicate detectable tumor burden and induce a durable remission in some patients. However, there are no analytical tools to quantify how productive immune responses are organized in human cancer. Such knowledge would inform how best to enhance immune responses to particular cancers and identify specific patients likely to respond to targeted biological therapies.

Immunity in tissues is critical for eradicating and controlling many types of infection. Examples of specific infections include tuberculosis, histoplasmosis, cryptococcus, blastomycosis and other infectious chronic granulomatous diseases. Clinical infectious diseases include, pneumonia, septic arthritis, pericarditis, meningitis, hepatitis, encephalitis, etc.

Using a deep convolutional neural network (DCNN, deep learning), the inventors have developed computational approaches to precisely segment features in multi-channel confocal cellular images, obtained via confocal laser scanning microscopy in ways that both capture cell position and retain cell shape. This process is generally referred to herein as Cell Distance Mapping, or CDM. There are various embodiments of the CDM system described herein. In an original embodiment, the CDM system used fixed filters to segment objects and did not capture cell shape. Another, more developed embodiment of the CDM system uses a DCNN and is able to accurately capture cell shape. Furthermore, some embodiments of the CDM system use and include a subsequent tuned neural network to analyze the DCNN output to determine which combinations of cell distance and T cell shape best discriminates between two T cell populations relative to a specific T cell population. All analysis beyond that provided in FIGS. 1-4, uses the latter embodiments of the CDM system. All embodiments are referred to herein as the CDM system or simply CDM. The CDM was developed based on a hypothesis that both cell proximity and T cell shape could be used to identify populations of antigen presenting cells (APCs), providing cognate help to T cells.

To test the hypothesis, pigeon cytochrome C-pulsed stimulated dendritic cells (DCs), polyclonal wild-type T cells, and 5CC7 transgenic T cells were labeled and adoptively transferred into murine recipients. Lymph nodes of the murine recipients were first imaged using two-photon excitation microscopy, and were then harvested for imaging by multi-channel confocal microscopy. Analysis of confocal images with CDM indicated that at least 11 different features including distance, dynamically weighted across regions of interest, could identify cognate DC:T cell interactions with a sensitivity and specificity approaching two-photon excitation microscopy. As known to those of skill in the art, two-photon excitation microscopy is considered the best method for studying cell:cell interactions in murine models of infection and disease. However, for technical reasons, two photon excitation microscopy cannot be performed in humans.

Additional experiments performed on human lupus nephritis biopsies suggested that CDM could hierarchically rank different APC population in regards to their relative contribution to in situ T cell cognate help. These data indicate that CDM can be used to identify and quantify adaptive cell networks in human inflammation.

CDM can be used to understand how in humans the immune system both mediates disease and can eradicate cancer. CDM can reveal specific mechanisms of immunity that can then be targeted therapeutically. Furthermore, CDM has the potential to identify important pathogenic mechanisms in individual patients. As a diagnostic test or approach, CDM is able to provide previously unobtainable information that enables personalized therapy in serious diseases, heterogeneous in their underlying pathogenic mechanisms. In certain embodiments, the CDM segmentation technique described herein can be used to determine differences between two or more biologic samples.

In certain embodiments, the CDM segmentation technique described herein includes 3 primary steps: deep convolutional neural network (DCNN) training and inference, extraction of analytical features from segmented objects, and a support vector machine (SVM) classifier that intakes the analytical object features.

In one embodiment, the DCNN was trained with supervised learning using stochastic gradient descent with momentum (SGDM) for optimization. Softmax cross entropy is used to compute the training error, which is used to update the DCNN parameters. Alternatively, a different cross entropy process may be used. Cell segmentation masks were produced and validated. These masks were used as pixel level annotations used to train the neural network. Pixel level annotations included several different classes of cells to be identified in tissue.

In one embodiment, the neural network structure includes 10 convolutional layers with 3 max filtering layers (similar to standard max pooling). Three dimensional (3D) convolutional kernels are used in the convolutional layers, with color being the $3^{rd}$ dimension in addition to the 2 spatial ones. This practice is used in part due to the lack of spatial colocalization between image features highlighted by immunofluorescent stains. For example, an image of an American flag that a standard large scale neural network might train on has red, white, and blue in the image. The color components for this image only give categorical information on whether a stripe or star is a certain color. In an immune fluorescently stained cellular image, the cell membrane might appear clearly in one color channel and be completely absent in another. In the same way one might see a nuclei in one stain and not in another, or only slightly.

In this embodiment, one other difference is that max filtering is used as opposed to max pooling. The difference is that max pooling reduces the size of images in a neural network by merging adjacent image pixels and giving the new pixel the larger value of the merged pixels. This reduces the complexity of the machine learning task and allows one to look at low level image features in lower neural network layers, and high level image features in higher neural network layers. As the size of the image is increasingly reduced by max pooling, it essentially becomes blurrier and blurrier. Max filtering, on the other hand, does not reduce the size of the image like max pooling. Instead it increases the sparsity of pooling and convolution operations with each successive pooling operation. This means essentially that the convolutional filter being used skips some pixels to capture higher scale image information.

It is noted that while the structure and organization of the neural network is somewhat rigid, there is a lot of room for adjustment. This often does not significantly alter the result, but the structure is not fixed and immutable.

In an illustrative embodiment, the neural network is implemented in a machine learning library, such as Tensorflow, which has up-to-date neural network libraries, and primarily uses a low-level application programming interface (API) to construct neural network architectures. In alternative embodiments, a different machine learning library may be used.

Once the neural network is trained on image labels, it is used on unlabeled image data to predict where the cells to be segmented are found in an image. This produces an output, such as a probability map image with values between 0 and 1 that predict the likelihood a pixel belongs to a certain cell type. Thresholding this probability map gives cell segmentations.

Once the deep neural network outputs a probability map, the probability map is thresholded to give cell segmentations, and the next step in the process involves extraction of analytical features from the segmented objects. In one implementation, a software routine, such as Matlab, is used to go through every image and eliminate objects based on area and solidity cutoffs, to eliminate bad segmentations in the images. Analytical features are then computed for the remaining objects in the image. These features may include, for example, area, major axis length, minor axis length, eccentricity, equivalent diameter, solidity, perimeter, circularity, major minor axis ratio, perimeter to circularity ratio, and minimum distance to a dendritic cell. The last feature, minimum distance to a dendritic cell, is computed by looking at every segmented T-cell and computing how close it is to the nearest dendritic cell.

Once extracted, the analytical features from all the cells are taken and put into some classification process such as a support vector machine. Here a cross validated support vector machine classifier is used to distinguish different cell populations. In an illustrative embodiment, 5 folds are used in the cross validation. In alternative embodiments, fewer or additional folds may be used. The patient cases between the 5 folds are separated out as evenly as possible, balancing the number of cells between folds as well using a greedy binning strategy. For all 5 folds, the SVM is trained on the other 4 folds and then tested on the held-out fold. The predictions from these 5 folds are averaged. Finally, the scores output from the SVM are used to generate a receiver operating characteristic (ROC) curve. The area under this curve provides an area under curve (AUC) value, which assesses how well the classifier performs with both sensitivity and specificity taken into consideration.

The above-described process can be utilized to help with understanding kidney ailments such as acute kidney injury and kidney disease. Acute kidney injury (AKI) is a common complication of a variety of diseases associated with up to 1.7 million deaths per year. Among those that survive AKI, progression to chronic kidney disease (CKD) is common. However, a fundamental understanding of AKI in humans is lacking and there are no effective pharmacological treatments. Furthermore, animal models have not proven useful for identifying successful therapies in humans. Therefore, there is a large unmet need to understand the human disease in a way that identifies both new therapeutics and in which patients they are most likely to be efficacious. Mechanistic studies in mice and observational studies in humans have identified likely pathogenic processes and components in AKI. These include vasculature dysfunction, endoplasmic reticulum stress, mitochondrial dysfunction, maladaptive repair, and inflammation. However, their relative importance and the mechanisms by which they cooperate to drive renal injury is unknown. It has become increasingly clear that inflammation is likely to be a central pathogenic process that holds great therapeutic promise. Both innate and adaptive immunity have been implicated including cellular constituents such as neutrophils, macrophages (both M1 and M2), natural killer cells, $CD4^+$ and $CD8^+$ T cells, dendritic cells (DCs), and renal epithelial tubular cells.

Likewise, CKD is very common, affecting over one in 10 Americans, yet there are limited therapeutic options. It is also a very heterogeneous disease group in terms of progression. While the diseases associated with CKD are known, and there are robust and reproducible criteria for each underlying cause, it is not currently possible to reliably identify those at risk for progression to renal failure. Among the causes of CKD, diabetes is the most common, while IgA nephropathy is a common immune-mediated glomerular disease resulting in CKD. It has become increasingly clear that inflammation plays a central role in these and other causes of CKD. In diabetic nephropathy, tubulointerstitial inflammation and tubular atrophy are strong predictors of progression to renal failure as they are for IgA nephropathy. However, researchers do not understand mechanisms of tubulointerstitial inflammation and injury in CKD sufficiently to identify meaningful patient subsets or proscribe therapy.

Another disease of interest is lupus nephritis. Many of the histological features, lack of relevant murine models and large unmet need in regards to biomarkers and therapies in lupus nephritis are applicable to a broad range of renal diseases manifesting tubulointerstitial inflammation. As demonstrated below, the novel technical and bioinformatics platforms have been developed to study lupus nephritis and renal allograft rejection clinical biopsies. However, the general approach can be applied to any renal disease, and more broadly to any human disease, in which an understanding of organ intrinsic pathogenic mechanisms is needed.

The lack of understanding of the mechanisms of renal inflammation in both AKI and CKD reflects a lack of technologies and methods to quantify and dissect in situ immunity in human tissue. As discussed herein, the proposed CDM systems use bioinformatics approaches to identify specific cell populations in situ and use relative spatial and cell shape characteristics to infer functional relationships between different cell populations. In particular, the CDM systems demonstrate that proximity to B cells can identify competent T follicular helper cells and identify cognate B:T cell help. Furthermore, assessing T cell shape in the context of dendritic cell (DC) proximity can identify cognate T:DC pairs. These data demonstrate that it is now possible to capture and quantify cell:cell interactions in situ. More specifically, the novel bioinformatic tools described herein can be used in conjunction with technical advances such as seven-color (or more colors as technologies advance or less colors as desired) scanning confocal microscopy and full biopsy tiling to obtain a quantitative and unbiased atlas of the pathogenic cellular networks underlying tubulointerstitial inflammation (TII) in different renal diseases. The proposed CDM systems also help to demonstrate that inflammation is not chaotic but organized around principles governing cell:cell interactions, and that a multiplicity of cell:cell interaction rules both restrain and define the architecture of inflammation in ways characteristic of each disease state.

In certain embodiments, the CDM systems described herein can be used to quantitatively map the cellular architecture of any organ. For example, in the kidney the relative position of cells and structures is critical for the normal functioning of the organ. Furthermore, these cellular architectures are disrupted in a variety of chronic renal diseases such as diabetes and hypertension. The CDM systems can be used to quantify how cellular architectures change with disease, which can be used diagnostically or prognostically.

As discussed above, the CDM systems described herein can be used to quantitatively dissect in situ pathogenic mechanisms in human TII and other autoimmune and immune-related diseases. In particular, the imaging and computational platforms described herein allow for identification of functional antigen presenting cell (APC):T cell cognate pairs in situ. These approaches were first developed to discriminate functional from non-functional T follicular helper ($T_{FH}$) cells in situ and to assess the expression distribution of important regulators of apoptosis in infiltrating lymphocytes. In one embodiment, convolutional neural network theory (machine deep learning) is applied to develop highly robust approaches to segment and spatially define complex features, such as nuclear and cell surface staining signatures. Applying CDM to seven-color confocal microscopy and full biopsy imaging allows for the capture interactions of complex cells (e.g., DCs providing cognate help to T cells). More broadly, the architecture of inflammation can be characterized in an unbiased, high throughput and highly quantitative way that approaches the sensitivity and specificity afforded by two-photon microscopy in mice.

The CDM systems described herein provides a method of evaluating, diagnosing, or providing a prognosis about a patient's immune system is responding to a disease. Specifically, the CDM systems provide a method of determining whether a cancer patient is likely to respond to immunotherapy. The CDM systems further provide a method of evaluating a cancer patient's response to immunotherapy treatment(s). Cancers that may be evaluated by the disclosed methods and compositions include cells and cancer cells from the bladder, bone, bone marrow, brain, breast, colon, esophagus, gastrointestine, gum, head, kidney, liver, lung, nasopharynx, neck, ovary, prostate, skin, stomach, testis, tongue, or uterus. In addition, the cancer may specifically be of the following histological type, though it is not limited to these: neoplasm, malignant; carcinoma; carcinoma, undifferentiated; giant and spindle cell carcinoma; small cell carcinoma; papillary carcinoma; squamous cell carcinoma; lymphoepithelial carcinoma; basal cell carcinoma; pilomatrix carcinoma; transitional cell carcinoma; papillary transitional cell carcinoma; adenocarcinoma; gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis coli; solid carcinoma; carcinoid tumor, malignant; branchiolo-alveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; nonencapsulating sclerosing carcinoma; adrenal cortical carcinoma; endometroid carcinoma; skin appendage carcinoma; apocrine adenocarcinoma; sebaceous adenocarcinoma; ceruminous adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; Paget's disease, mammary; acinar cell carcinoma; adenosquamous carcinoma; adenocarcinoma w/squamous metaplasia; thymoma, malignant; ovarian stromal tumor, malignant; thecoma, malignant; granulosa cell tumor, malignant; androblastoma, malignant; sertoli cell carcinoma; leydig cell tumor, malignant; lipid cell tumor, malignant; paraganglioma, malignant; extra-mammary paraganglioma, malignant; pheochromocytoma; glomangiosarcoma; malignant melanoma; amelanotic melanoma; superficial spreading melanoma; malignant melanoma in giant pigmented nevus; epithelioid cell melanoma; blue nevus, malignant; sarcoma; fibrosarcoma; fibrous histiocytoma, malignant; myxosarcoma; liposarcoma; leiomyosarcoma; rhabdomyosarcoma; embryonal rhabdomyosarcoma; alveolar rhabdomyosarcoma; stromal sarcoma; mixed tumor, malignant; mullerian mixed tumor; nephroblastoma; hepatoblastoma; carcinosarcoma; mesenchymoma, malignant; brenner tumor, malignant; phyllodes tumor, malignant; synovial sarcoma; mesothelioma, malignant; dysgerminoma; embryonal carcinoma; teratoma, malignant; struma ovarii, malignant; choriocarcinoma; mesonephroma, malignant; hemangiosarcoma; hemangioendothelioma, malignant; Kaposi's sarcoma; hemangiopericytoma, malignant; lymphangiosarcoma; osteosarcoma; juxtacortical osteosarcoma; chondrosarcoma; chondroblastoma, malignant; mesenchymal chondrosarcoma; giant cell tumor of bone; Ewing's sarcoma; odontogenic tumor, malignant; ameloblastic odontosarcoma; ameloblastoma, malignant; ameloblastic fibrosarcoma; pinealoma, malignant; chordoma; glioma, malignant; ependymoma; astrocytoma; protoplasmic astrocytoma; fibrillary astrocytoma; astroblastoma; glioblastoma; oligodendroglioma; oligodendroblastoma; primitive neuroectodermal; cerebellar sarcoma; ganglioneuroblastoma; neuroblastoma; retinoblastoma; olfactory neurogenic tumor; meningioma, malignant; neurofibrosarcoma; neurilemmoma, malignant; granular cell tumor, malignant; malignant lymphoma; Hodgkin's disease; Hodgkin's lymphoma; paragranuloma; malignant lymphoma, small lymphocytic; malignant lymphoma, large cell, diffuse; malignant lymphoma, follicular; mycosis fungoides; other specified non-Hodgkin's lymphomas; malignant histiocytosis; multiple myeloma; mast cell sarcoma; immunoproliferative small intestinal disease; leukemia; lymphoid leukemia; plasma cell leukemia; erythroleukemia; lymphosarcoma cell leukemia; myeloid leukemia; basophilic leukemia; eosinophilic leukemia; monocytic leukemia; mast cell leukemia; megakaryoblastic leukemia; myeloid sarcoma; and hairy cell leukemia. Moreover, T-cell anergy can be evaluated in precancers, such as metaplasia, dysplasia, and hyperplasia.

It is specifically contemplated that the disclosed methods can be used to evaluate immune system differences between stages of cancer, such as between hyperplasia, neoplasia, pre-cancer and cancer, or between a primary tumor and a metastasized tumor. A tumor sample or a cancer sample from a patient can include cancer cells or cells suspected of being cancerous.

It should be noted that CDM was developed for use on multicolor confocal images obtained from fresh frozen biopsy samples. This is a special case example. CDM is widely applicable to the study of any high-resolution images of human tissue, prepared through any means, in which the positions of cells and their shape (morphology) can be determined. Possible other types of images that could be analyzed by CDM include those obtained using immuno-electron microscopy and CyTOF mass cytometry tissue imaging.

Experimental Methods and Results

The CDM systems described herein have been used to demonstrate that TII and tubulointerstitial scarring are common features of human lupus nephritis (LuN) that predict unresponsiveness to current therapies and progression to renal failure. Interestingly, in those patients with more severe TII, tubulointerstitial infiltrates were usually organized into either well-circumscribed T:B cell aggregates or germinal centers (GCs) containing follicular dendritic cells. Foci of proliferating plasma cells (plasmablasts) were also a common feature. In contrast, only occasional intravascular B cells were found in glomeruli. These histological features of TII were suggestive of tertiary lymphoid neogenesis (TLN)

in which self-propagating adaptive immune responses develop directly within the target organ. Consistent with TLN, when laser capture microscopy (LCM) was used to sample the in situ expressed immunoglobulin repertoire, all three histological features were associated with intrarenal B cell antigen-driven clonal expansion and ongoing somatic hypermutation. The presence of either GCs or T:B aggregates was strongly associated with tubular basement membrane immune complexes. However, TII was not associated with low serum complement or high titers of anti-dsDNA antibodies. These data suggest that, distinct from mechanisms of systemic autoimmunity that drive glomerulonephritis, in situ immunity contributes to tubulointerstitial injury.

Two approaches were taken to dissecting in situ immunity in lupus tubulointerstitial nephritis. First, LCM was used to capture mRNA from single B cells or plasmablasts in seven different fresh frozen biopsies. Also, cDNA was synthesized and PCR used to amplify and sequence the variable (V) regions from the expressed immunoglobulin heavy and light chains. Clonally expanded Vh and Vl paired segments were cloned into human IgG1 heavy chain or the appropriate light chain encoding vectors respectively, and expressed. Characterization of antigenic specificities of these in situ selected antibodies revealed that only 4 of 25 had predominant HEp-2 nuclear reactivity and none were reactive with dsDNA. Rather, 11 of 25 had prominent HEp-2 cytoplasmic reactivity. Subsequent studies demonstrated that 10 of these 11 antibodies reacted directly with vimentin that had not been post-translationally modified. Vimentin was highly upregulated in the inflamed tubulointerstitium and serum anti-vimentin antibodies were highest in those patients with severe TII. Finally, three HEp-2 negative antibodies preferentially reacted with inflamed renal tissue. These studies suggest that in situ adaptive immunity is highly coordinated and directed against molecular features of inflammation. These studies have also been expanded in several directions including developing and validating methods to isolate B cells from fresh biopsies, subjecting them to single cell RNA-seq, and assembling full Ig sequences for analysis and expression.

Figure 1B:
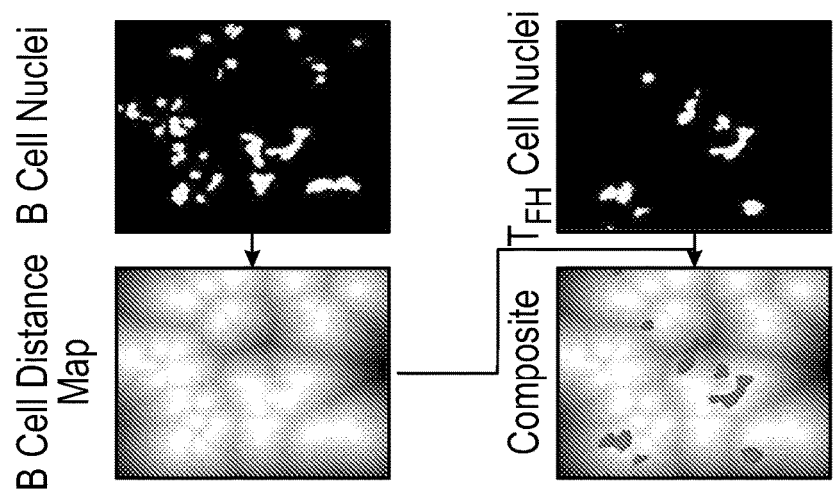
FIG. 1B depicts B cell and $T_{FH}$ cell nuclei, a cell distance map from the closest B cell nuclei, and a superimposed image of the positions of the CD4$^+$ICOS$^+$ cell nuclei in accordance with an illustrative embodiment.

In the second approach, it was determined whether in situ B cell activation is dependent upon cognate help by resident specialized T follicular helper ($T_{FH}$) cells. However, at the time there were no methods available to quantify cell:cell interactions in human tissue. Therefore, computer visualization techniques were developed, derived from those used to assess digital mammograms and magnetic resonance images, to analyze confocal images of human tissue. The initial approach is represented in FIG. 1. Original raw output images were processed to obtain binary maps for the outputs from both DAPI and each fluorescent channel representing specific cell surface stains, and these are depicted in FIG. 1A in accordance with an illustrative embodiment. Lymphocyte membrane staining in tissue is complex, likely reflecting the irregular shapes that these cells acquire as they migrate through dense organ structures. This made it difficult to definitively identify the membranous boundaries of individual cells. In contrast, DAPI staining usually revealed the complete border of each nucleus. Therefore, membrane staining was used in combination with its respective DAPI correlate to definitively assign nuclei to specific cell types. Specifically, in FIG. 1b, CD20 or CD4 and ICOS staining were assigned to nuclei to identify B and $T_{FH}$ cell nuclei respectively. All B cell nuclei were then used to construct a distance map in which each pixel value represented the Euclidean distance from the pixel to the closest B cell nucleus edge. This distance map is depicted in FIG. 1B in accordance with an illustrative embodiment. Overlaying T cell (CD4$^+$ICOS$^+$PD-1$^+$) nuclei allowed for calculation of minimum distances between the edges of B and putative $T_{FH}$ cell nuclei. It is noted that, occasionally, T and B cell membranes were so intertwined that apparent single nuclei were double assigned. In FIG. 1B, in the lower right panel, T cell nuclei are highlighted. Thus, minimum distances (usually 100-300 measurements/bx) could be accurately computed between the edges of each B cell nucleus to the edge of the closest T cell nucleus in pixel increments.

Figure 2A:
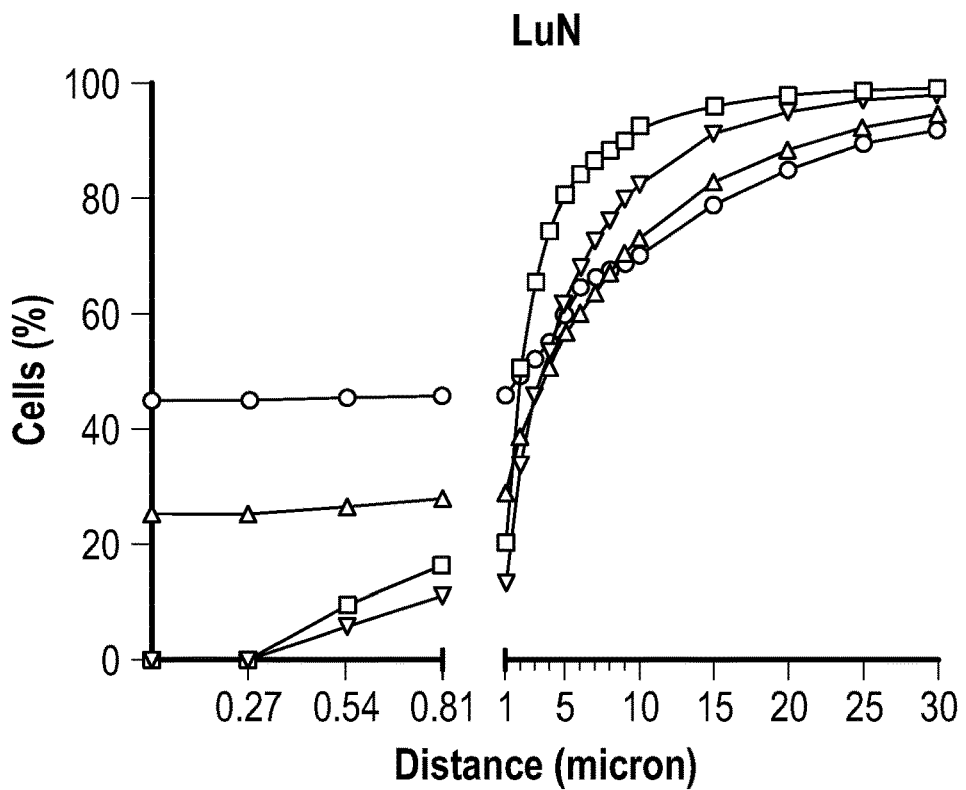
FIG. 2A depicts cumulative frequency of distance distributions for human lupus nephritis (LuN), tonsil GC, T cell mediated renal allograft rejection (TCMR), and mixed renal allograft rejection (MR) in accordance with an illustrative embodiment.
Figure 2A:
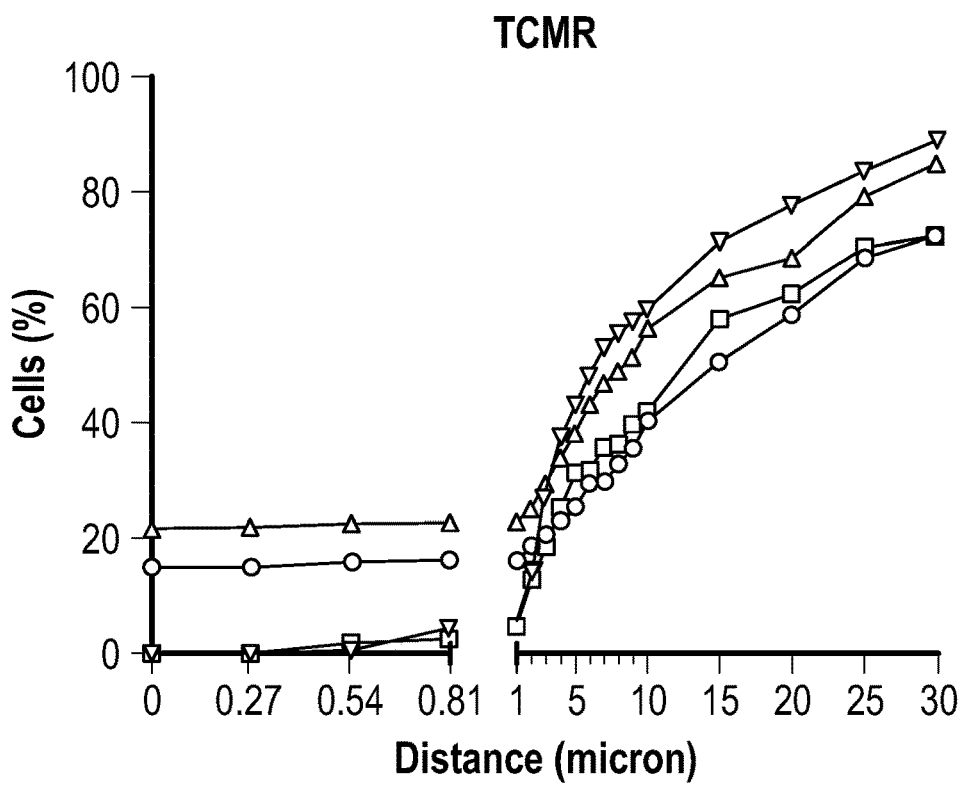
Figure 2A:
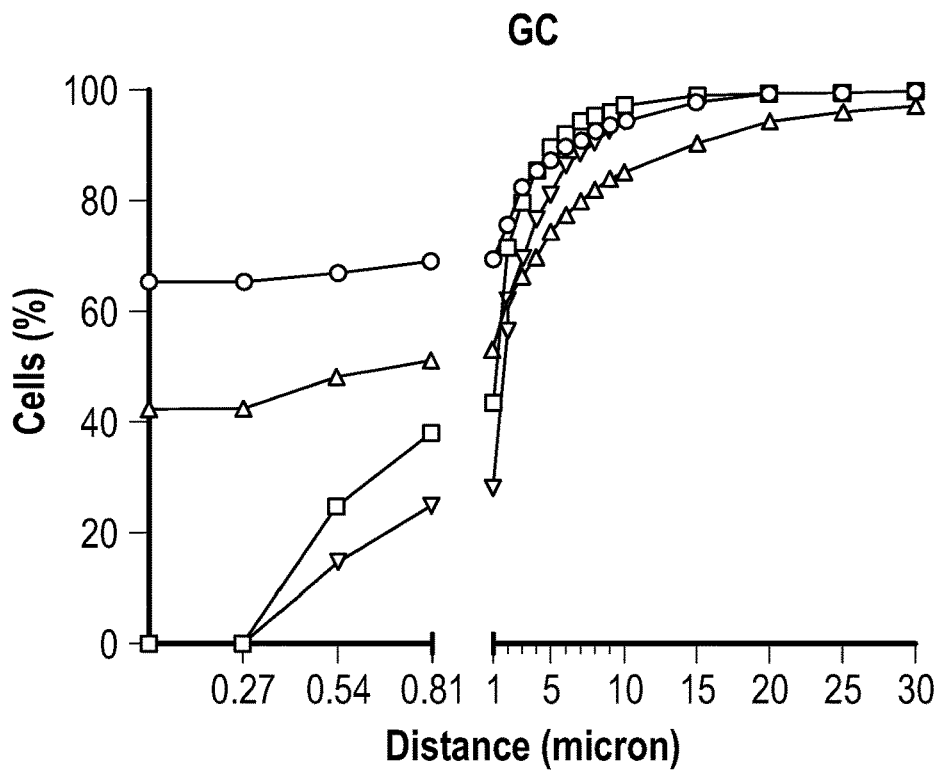
Figure 2A:
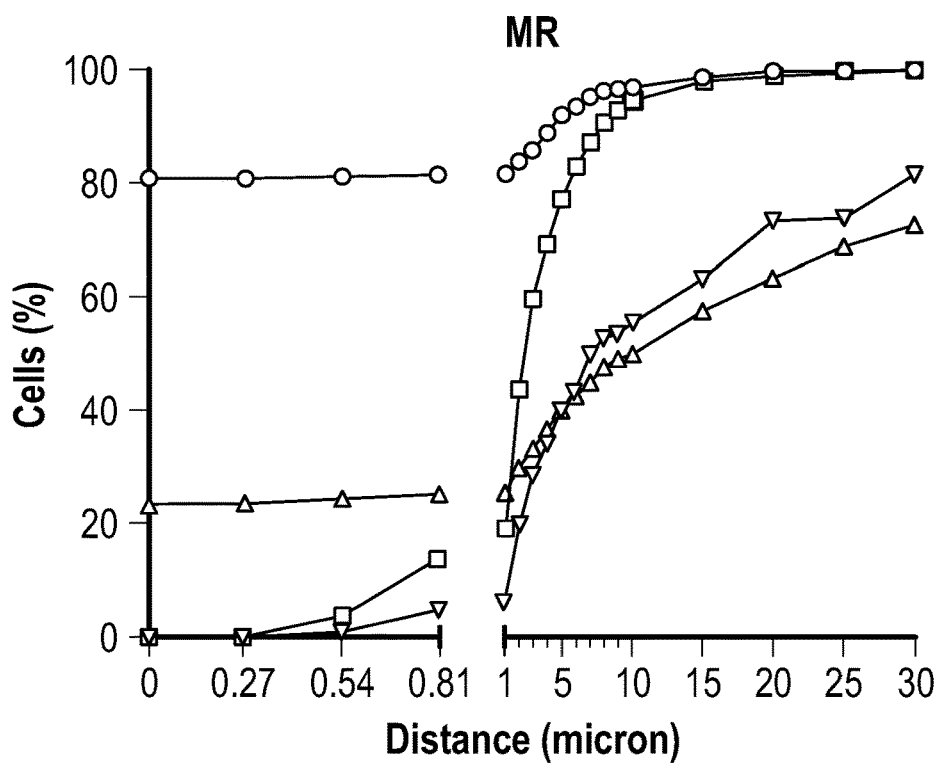

Results were plotted as the cumulative frequency of cell interactions as a function of distance. The distance (x-axis) is discontinuous with values of 1 μm and is divided into 1 pixel or 0.27 μm increments. Shown in FIG. 2A are the results obtained from germinal centers (GCs), LuN, T cell-mediated rejection (TCMR) and renal mixed allograft rejection (MR), in accordance with an illustrative embodiment. FIG. 2A also depicts the distributions of closest T cell to T cell distances (filled squares), B to B cell distances (open squares), B to T cell distances (closed circles), and T to B cell distances (open circles). Analysis of GCs revealed that essentially no B cell nuclei (cell) was less than 0.54 μm from another B cell and that no $T_{FH}$ cell was less than 0.54 μm from another $T_{FH}$ cell. However, most cells were within 10 μm (less than two cell widths) of a similar cell consistent with the dense cellular packing characteristic of GCs. Remarkably, 65% of $T_{FH}$ cells were less than 0.54 μm from a B cell and 42% of B cells were within 0.54 μm of a $T_{FH}$ cell. A similar pattern of inter-cell relationships was observed in LuN. Approximately 42% of $T_{FH}$ cells were less than 0.54 μm from the nearest B cell and 22% of B cells were less than 0.54 μm from a $T_{FH}$ cell. As with GCs, there were essentially no less than 0.54 μm homotypic cell pairs. However, and in contrast to GCs, in the lupus nephritis biopsies analyzed there were no apparent follicular dendritic cell networks, or histological features of GCs. In lupus TII, the observed T:B cell conjugate rates varied from those expected by chance from between $p=10^{-4}$ (least significant individual biopsy) to $p=10^{-100}$ (least significant group).

Figure 2B:
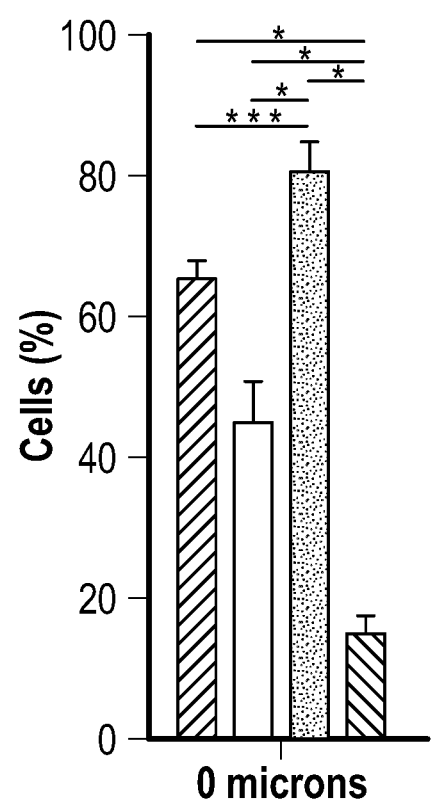
FIG. 2B depicts a comparison of mean fraction (%) of ICOS$^+$ $T_{FH}$ cells within 0.54 µm of a CD20$^+$ B cell in LuN (black bars), GC (white bars), MR (light gray bars), and TCMR (dark gray bars), where error bars denote SEM, with *P<0.0001, P=0.002, *P=0.02 in accordance with an illustrative embodiment.

Therefore, it is apparent that statistically robust information can be obtained from individual biopsies. TCMR, mixed rejection (MR) and LuN biopsies had a similar frequency of CD4$^+$ICOS$^+$PD-1+$T_{FH}$ cells. However, conjugate rates were radically different with only 22% of $T_{FH}$ cells in TCMR less than 0.54 μm from a B cell while the rate in MR was over 70%. Conjugate rates were very characteristic of each renal disease, as depicted in the diagram of FIG. 2B. Furthermore, GCs and those renal diseases characterized by local antibody deposition followed a logarithmic distribution of cell distances ($r^2$ range: 0.938-0.988) while TCMR followed a linear distribution (0.986). It should be noted that, while the frequencies of specific cells varied between biopsies, the relationships of these cells with other cells ($T_{FH}$ to B cells) was relatively consistent and characteristic of each disease. These data suggest that understanding cell networks can mitigate apparent disease heterogeneity.

Figure 3A:
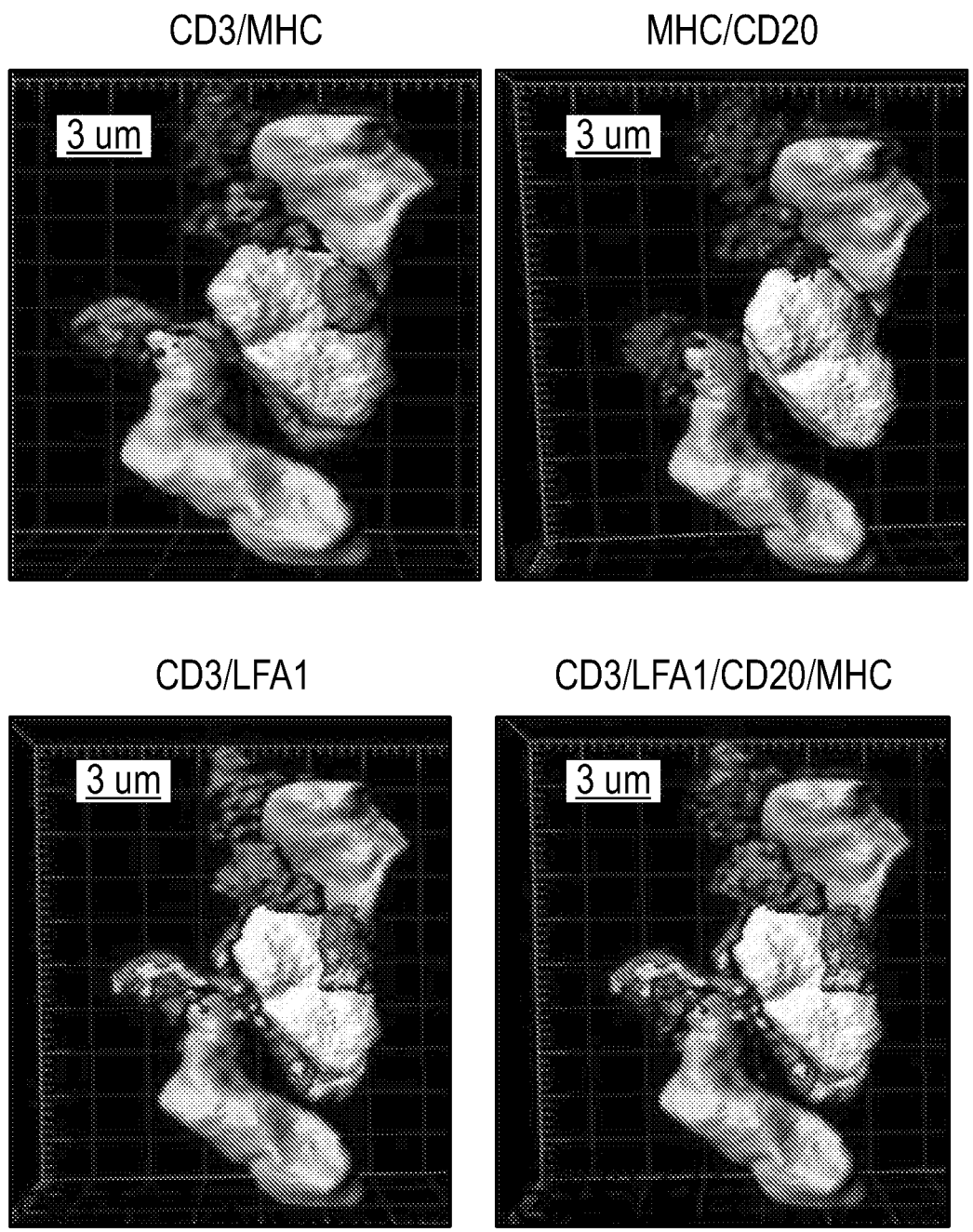
FIG. 3A depicts a T cell flanked by two B cells, where staining signatures for CD3, LFA1, CD20, and MHC class II are illustrated as well as their relationship to respective nuclei in accordance with an illustrative embodiment.
Figure 3B:
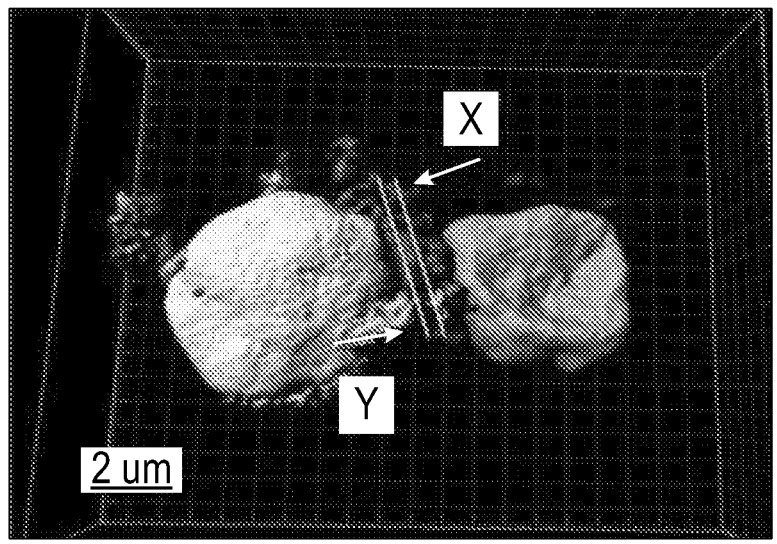
FIG. 3B depicts surface reconstruction of a LuN T follicular helper ($T_{FH}$) cell, delineated by CD3 and LFA1 staining, interacting with a B cell, delineated by MHC II and ICAM (left panel), and with successive orthogonal two-dimensional cuts (right panels) illustrating segregation of CD3 and LFA1 on T cell (x and y) and segregation of MHC class II and ICAM on B cell surface (x) in accordance with an illustrative embodiment.
Figure 3B:
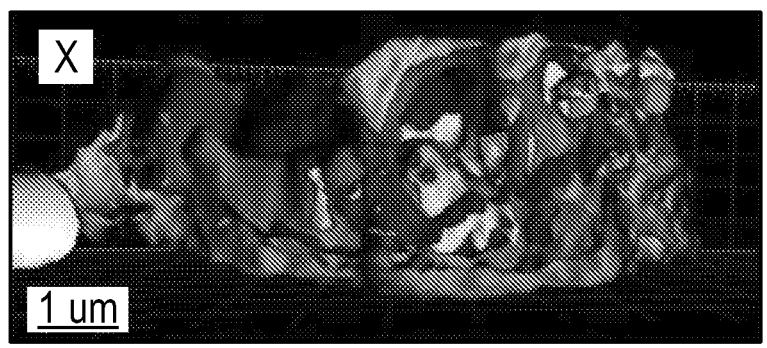
Figure 3B:
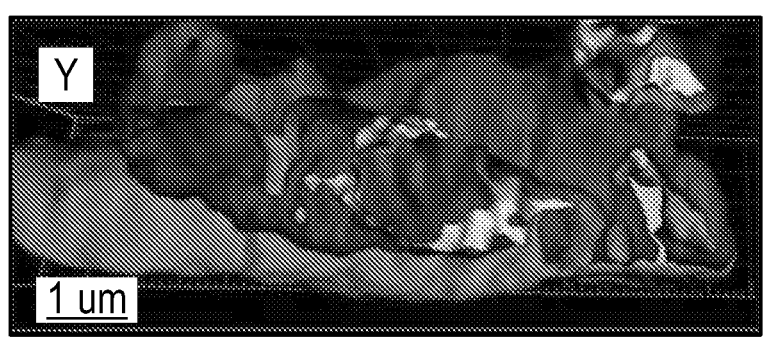

In addition, it has been established that antigen-dependent conjugates between T and B cells should be associated with the presence of supramolecular activation complexes. Therefore, 3D confocal microscopy was performed on 7 μm thick slices from LuN biopsies. Surface creation software was used to create surface objects based on immunofluorescent staining after manual threshold optimizations. FIGS. 3A-B include highly detailed visualizations of apposing cell membranes between B and T cells in accordance with an illustrative embodiment. In FIGS. 3A and 3B, which are lateral views of the T:B cell conjugate, apposition between TCR and MHC class II is evident. Cross-sectional views of the T:B cell conjugate in FIG. 3B revealed complex interfaces with MHC class II arrayed centrally flanked by ICAM1(x). On the T cell side, focal areas of TCR and LFA1 are evident (x, y). These data demonstrate that the close apposition of $T_{FH}$ and B cells in TII is associated with polarized TCR/MHC class II molecules and complex supramolecular activation complexes. Subsequently, LCM was used to confirm that those $T_{FH}$ cells competent to form conjugates with B cells expressed high levels of Bcl-6 and IL-21, two molecular signatures of fully mature $T_{FH}$ cells.

Figure 4:
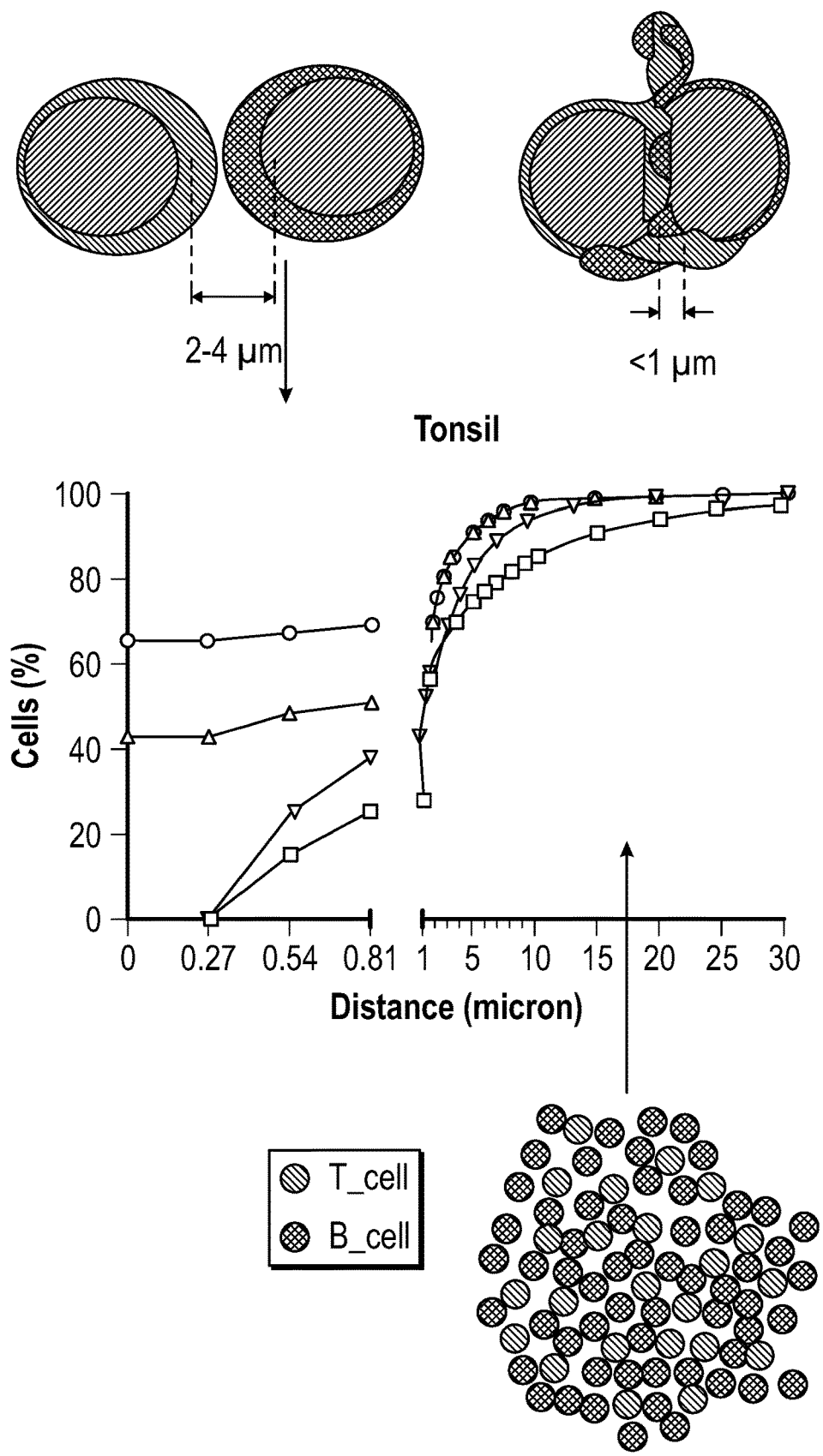
FIG. 4. depicts how cellular distances less than 1 µm capture cognate B:TFH interactions while larger distances describe relative global behavior of different cell populations in clinical biopsies in accordance with an illustrative embodiment.
Figure 4:
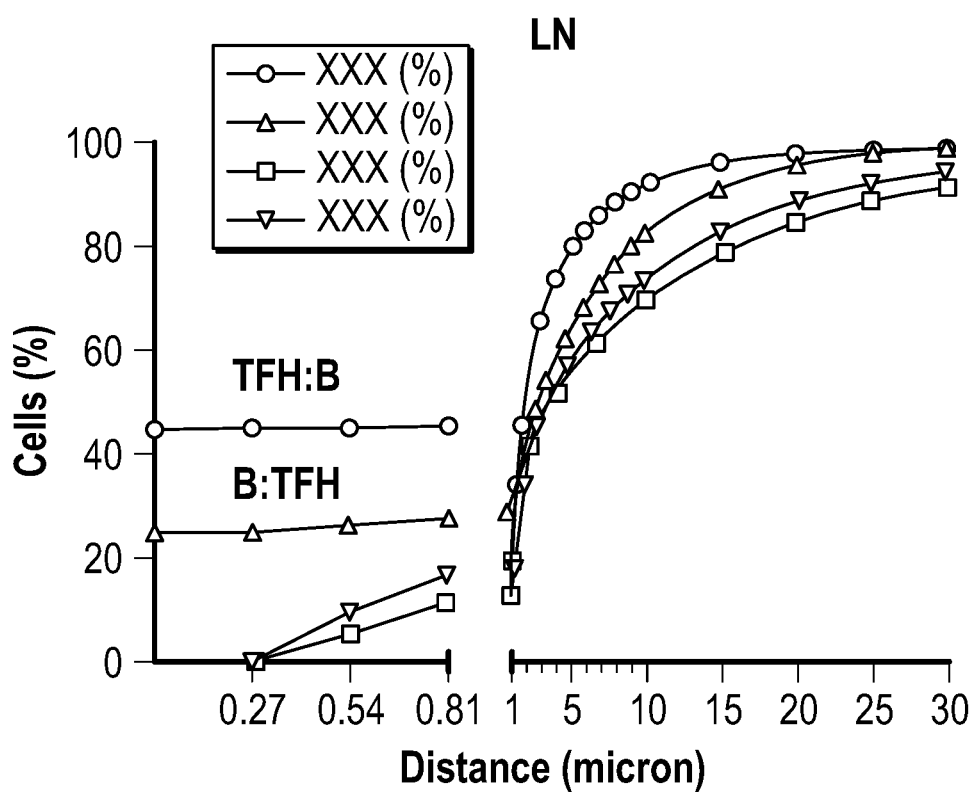
Figure 4:
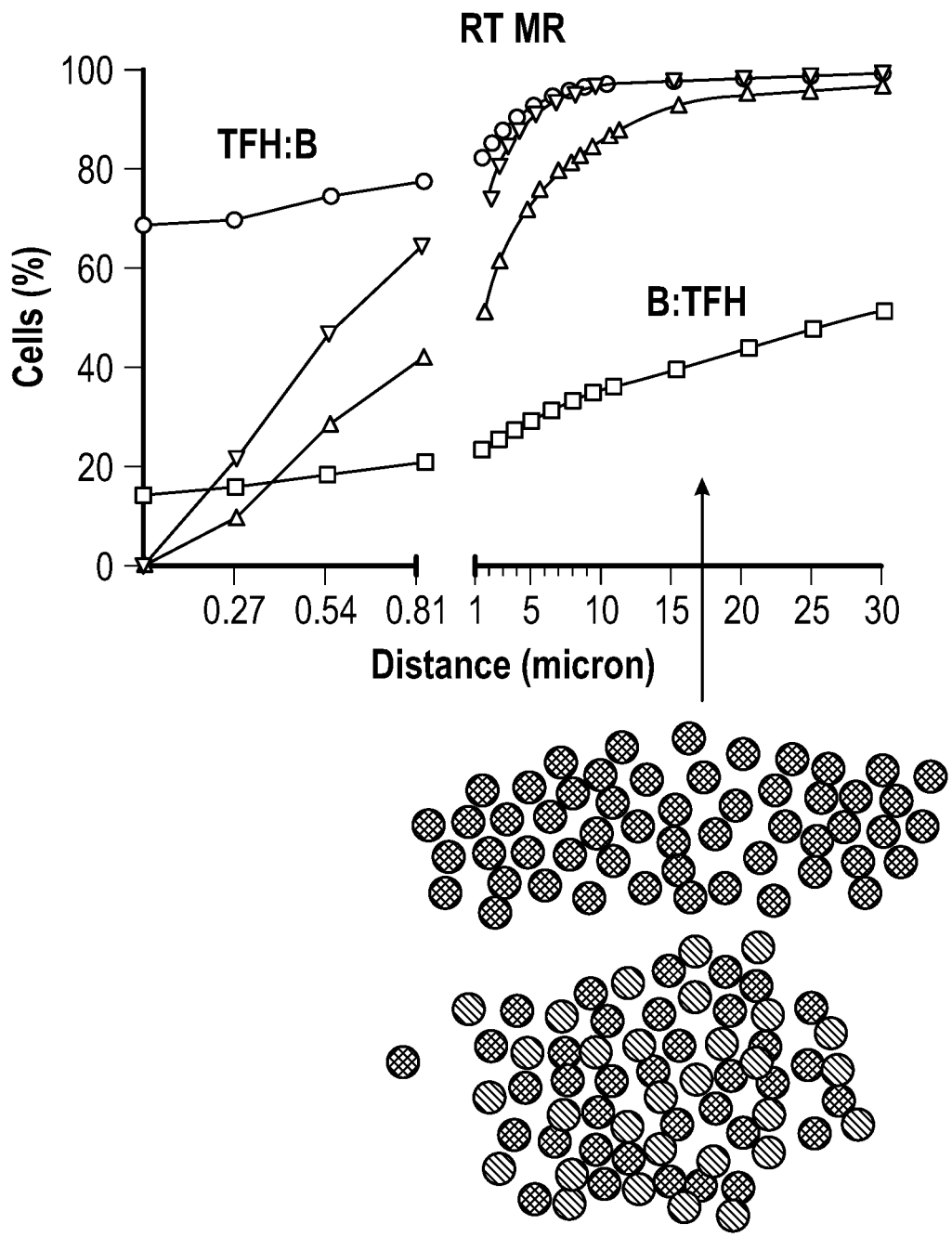

Through the use of CDM, it was demonstrated that close cell-cell approximation is an indicator of cognate interactions, as depicted in FIG. 4, while overall patterns of cell proximity reveal how cell populations are globally organized in inflammation. It is noted that cellular hierarchies, which cell types interact and to what extent, appear highly characteristic of each disease state. Lupus TII is very distinct from TCMR, which is different from MR.

An initial iteration of CDM used simple segmentation protocols that tended to under-split cell nuclei in dense cellular infiltrates. To circumvent this limitation, an embodiment of a CDM system was developed that used sequential Sobel edge detection followed by circular Hough transformation and watershed thresholding to identify nuclei outlines missed by edge detection analysis. Post-processing then refined nuclear segmentation. These sequential steps gave much more accurate object segmentation that was used to define expression distributions for apoptosis regulators in human LuN compared to those observed in secondary lymphoid organs.

Using the CDM system, LuN samples were stained with antibodies specific for CD20, BCL-2 and CD4 along with DAPI. Objects were segmented and BCL-2 expression assigned to CD4 or CD20 nuclei. Quantification across biopsies revealed that BCL-2 was frequently expressed in infiltrating lymphocytes in both LuN and MR while expression of MCL-1 was low. In contrast, in GCs MCL-1 was high and BCL-2 low. These results were confirmed with LCM coupled to qPCR. Examination of NZB/W F1 mice also revealed specific upregulation of BCL-2 in lymphocytes infiltrating the tubulointerstitium. Finally, treatment of these mice with a selective oral inhibitor of BCL-2 (ABT-199) prevented the development of TII. These studies reveal both BCL-2 as a potential therapeutic target and a general approach in which quantitative analysis of specific in situ regulatory pathways can identify putative disease effector mechanisms that can then be tested in relevant murine models.

It is also established that T cell shape resolves cognate from non-cognate interactions. The distance between T and B cell nuclei could discriminate cognate from non-cognate interactions only at very small distances of less than 2 microns. This was sufficient as nuclei make up most of the volume of each cell type and when they interact, their cell membranes form extensive entanglements. However, the spatial relationships between cognate T cells and other APCs are much different. The volume of dendritic cells is mostly cytoplasm and they can spread forming large surfaces areas. Cognate T cells splay against the DCs, ensuring large surface areas for cell:cell contact. In contrast, non-cognate T cells transiently roll along the surface of DCs scanning for MHC class II/peptide complexes. Therefore, it was determined that in addition to distance, T cell shape can potentially help discriminate between cognate and non-cognate T cell:DC interactions.

Figure 5A:
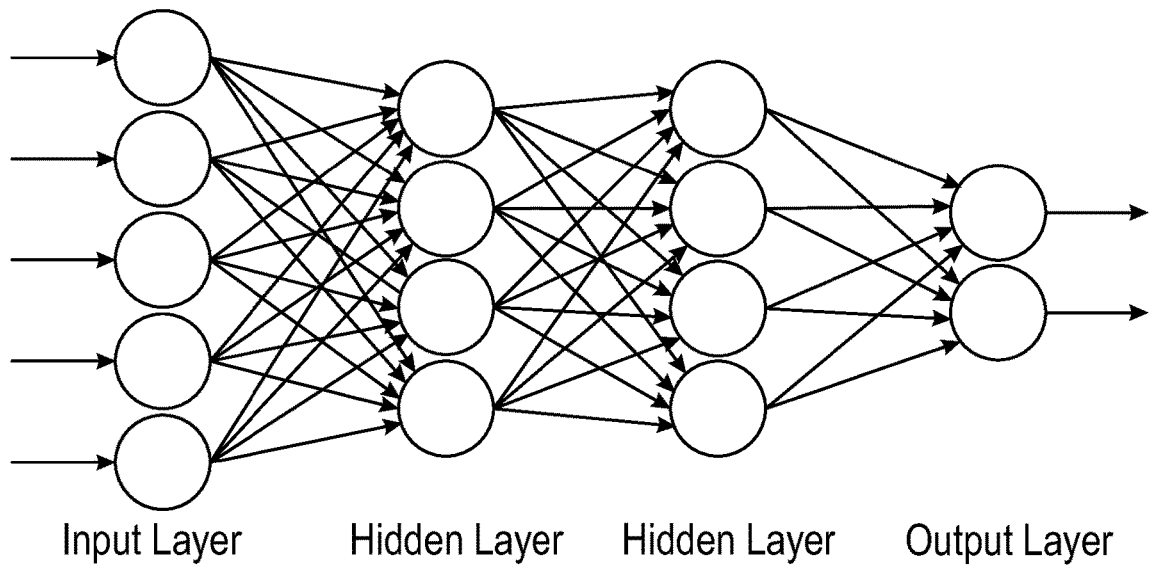
FIG. 5A is a simplified diagram depicting a CNN architecture in accordance with an illustrative embodiment.
Figure 5B:
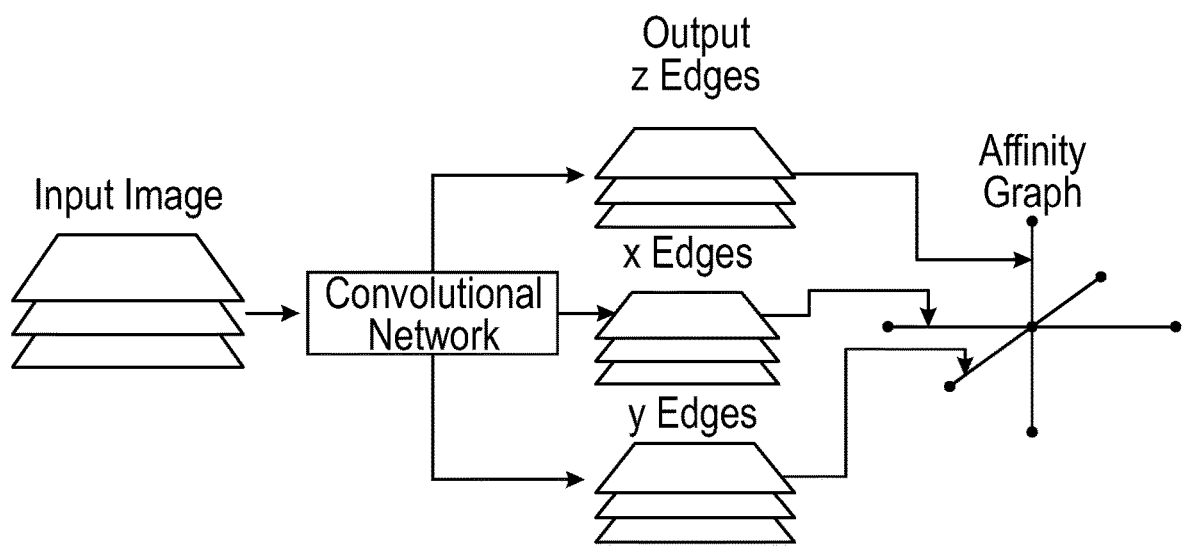
FIG. 5B depicts a parallel analysis of x edges and y edges in multiple planes (z edges) in accordance with an illustrative embodiment.
Figure 5C:
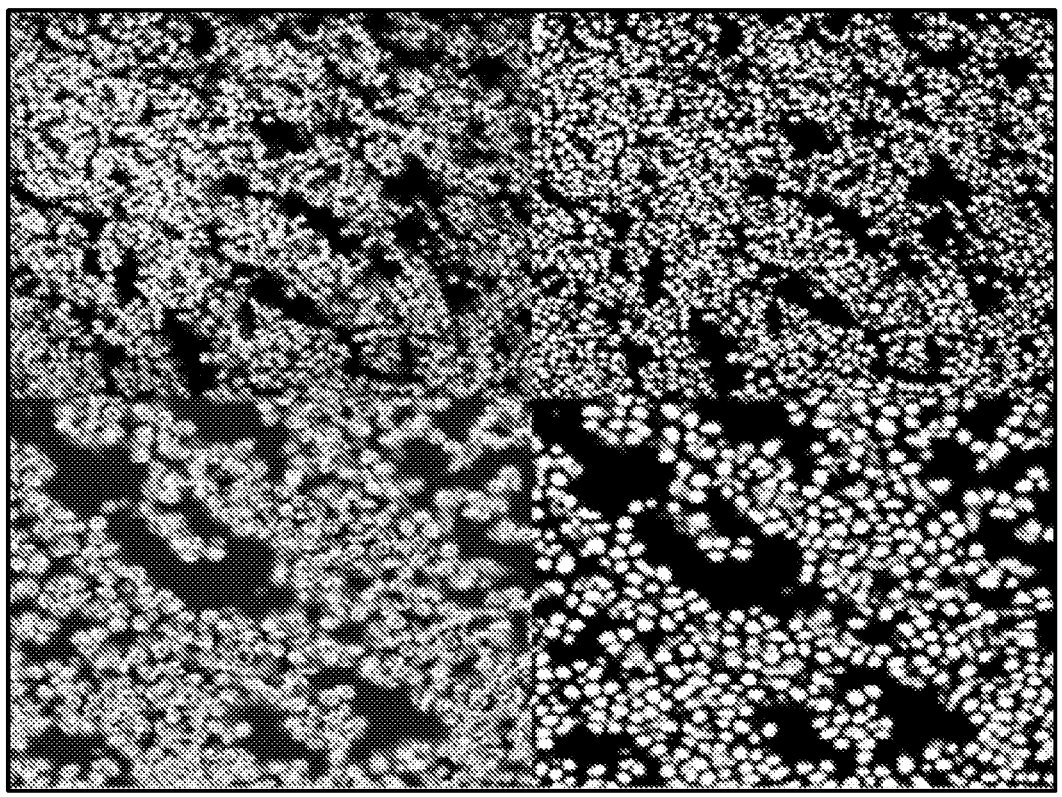
FIG. 5C depicts examples of input images of GC nuclei (on left) and output segmented images (on right) demonstrating capture of both position and shape in accordance with an illustrative embodiment.

To test this hypothesis, a murine system was developed in which T cell:DC interactions could be manipulated and antigen specificity could be controlled. Using the system, three cell populations were prepared: 1. CD11c$^+$ DCs from B10.A2 CD45.2$^-$ mice stimulated in vitro with LPS, loaded with pigeon cytochrome C peptide (pPCC) and labelled with the fluorescent dye CTB; 2. Polyclonal B10.A CD45.2$^+$ CD4$^+$ T cells labelled with CMFDA; 3. 5CC7 transgenic B10.A CD45.2+CD4+ T cells labelled with CMTPX. Cells were then transferred into recipient mice and popliteal lymph nodes imaged by two photon microscopy. These same lymph nodes were then frozen and imaged To test the hypothesis regarding cell shape, the CDM system was applied to representative confocal images from the above-discussed mouse experiments. To additionally preserve object shape, an embodiment of the CDM system was developed to include a machine learning approach utilizing deep convolutional neural networks (DCNN). The goals of the task were identification of as many objects as possible while introducing minimal distortion and artifacts. Initial training sets of 1024×1024 pixel/HPF (630×) regions of interest (ROIs) were manually segmented into output images. T The output images were then used with paired raw images which were divided into redundant overlapping patches of 100×100 pixels, to generate unique model weights using supervised backpropagation, as depicted in FIG. 5A in accordance with an illustrative embodiment. The CNN approach generated x, y and z affinity graphs to improve object separation in the output, as depicted in FIG. 5B in accordance with an illustrative embodiment. The x, y and, if applicable, z outputs were merged into a single final output comprised of foreground and background. This approach has been shown to improve separation of distinct objects using CNN. Thus, the final output image consisted of a merged x, y and possibly z affinity graph for each ROI. As an example, utilizing this approach, one original training set of 6 images gave rise to over $10^6$ individual patches that were used for training the neural network. As demonstrated by FIG. 5C, application of CNN to images preserved cell shape extremely well and performed much better than more common computer vision techniques, especially for poor quality images.

Figure 5D:
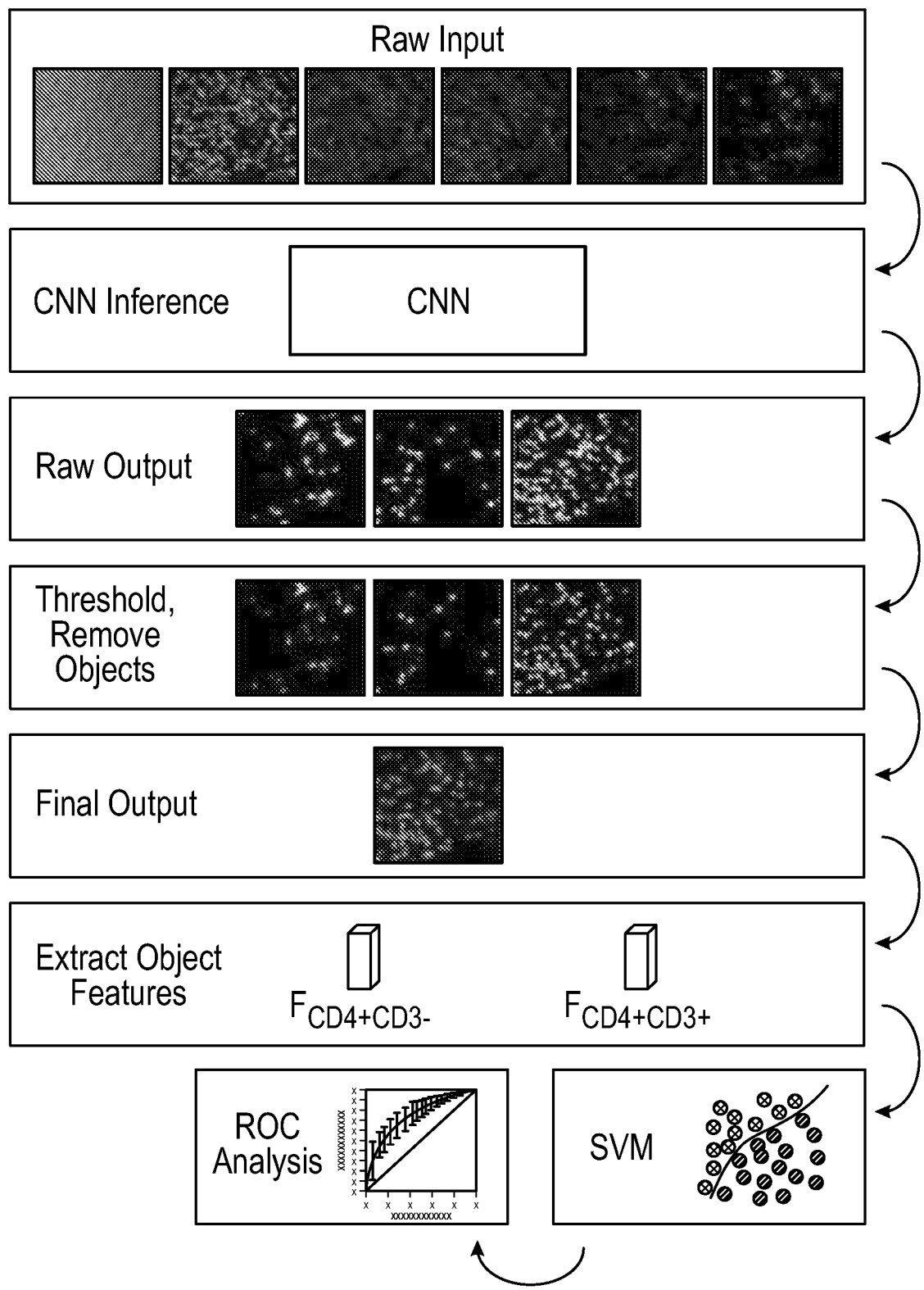
FIG. 5D is an illustrative image analysis pipeline depicting 6 image channels for each ROI being put into a convolutional neural network which outputs a 4-class prediction for CD4−CD3+ T-cells, CD4+CD3+ T-cells, dendritic cells, and background in accordance with an illustrative embodiment.

These computational approaches were incorporated into the CDM system, which was then applied to the above-referenced mouse experiment. FIG. 5D is an illustrative image analysis pipeline depicting 6 image channels for each ROI being put into a convolutional neural network which outputs a 4-class prediction for CD4−CD3+ T-cells, CD4+ CD3+ T-cells, dendritic cells, and background in accordance with an illustrative embodiment. These pixel by pixel predictions are thresholded and objects below a certain size cutoff and solidity criterion are eliminated.

Figure 6A:
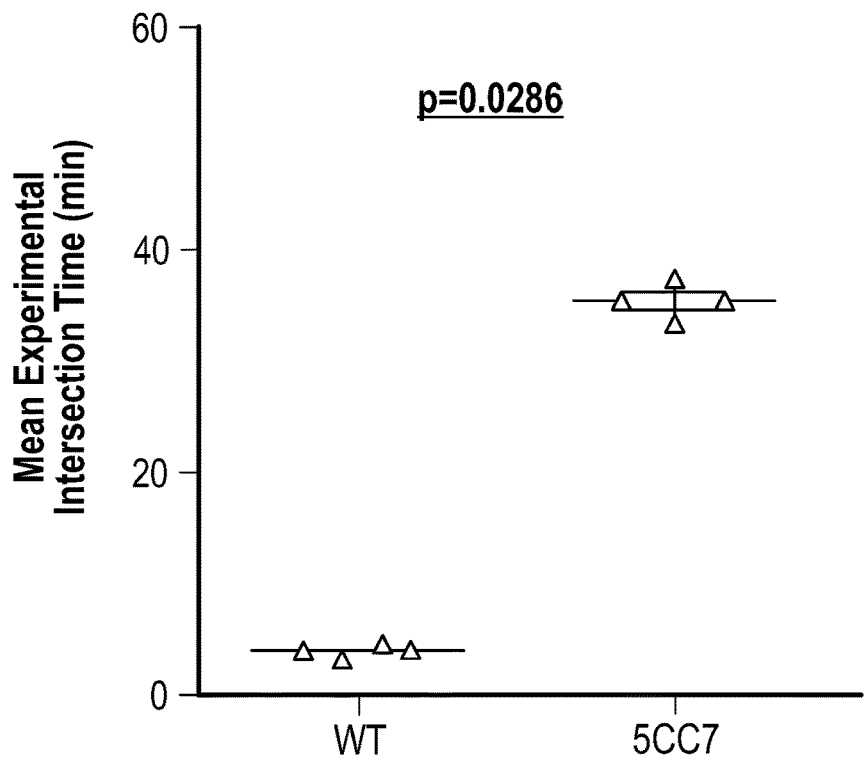
FIG. 6A depicts mean experimental interaction times for WT and antigen specific (5CC7) T cells per experimental mouse as measured by two photon microscopy in accordance with an illustrative embodiment.
Figure 6B:
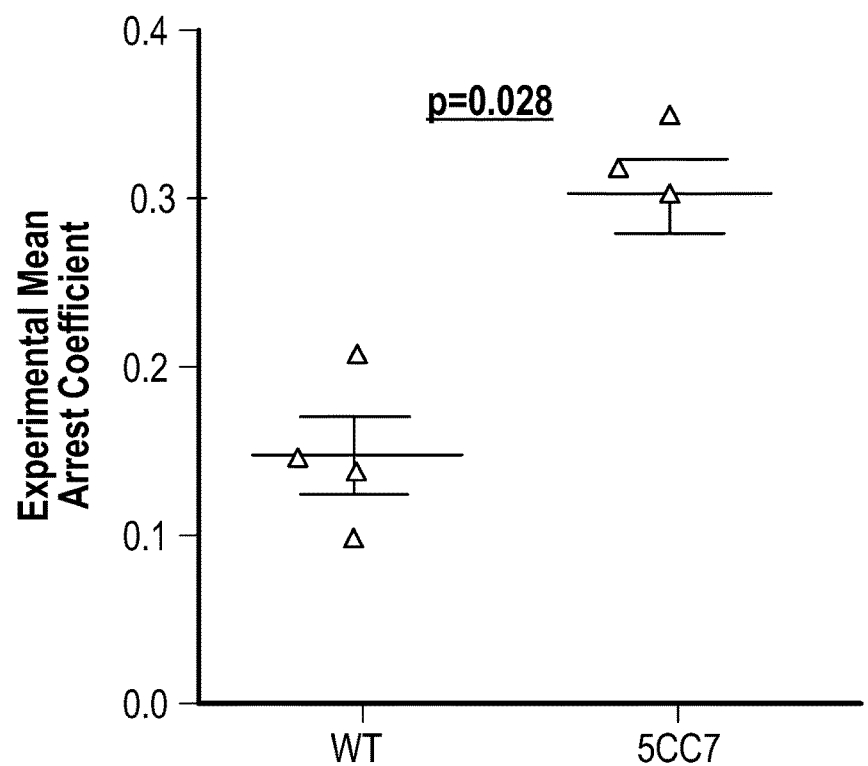
FIG. 6B depicts mean experimental arrest coefficients for WT and antigen specific (5CC7) T cells per experimental mouse as measured by two photon microscopy in accordance with an illustrative embodiment.
Figure 6C:
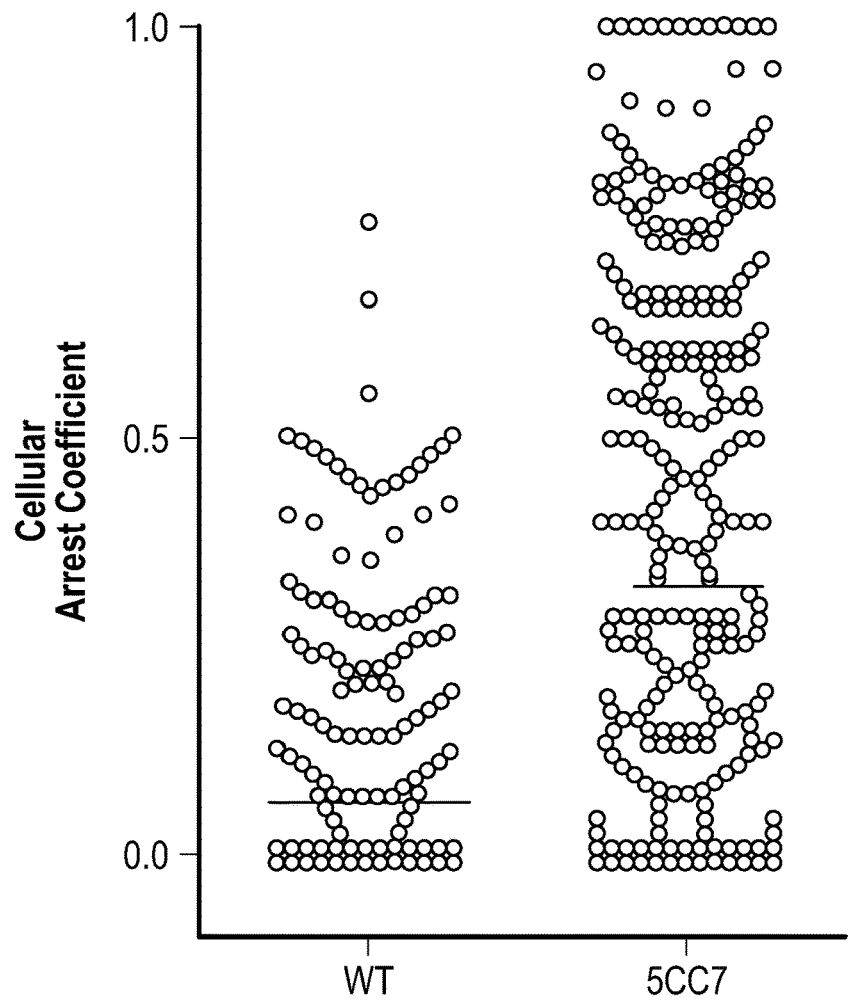
FIG. 6C depicts cellular arrest coefficients (single cell observations plotted) for WT and antigen specific (5CC7) T cells in accordance with an illustrative embodiment.
Figure 6D:
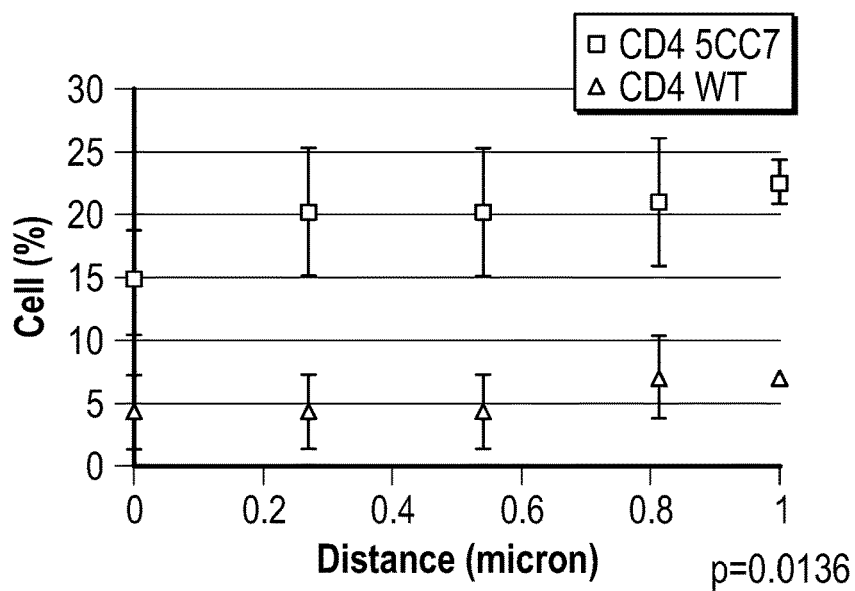
FIG. 6D depicts discrimination between WT and antigen specific (5CC7) T cells by distance to DC in accordance with an illustrative embodiment.

Results obtained using the CDM system were directly compared to two-photon microscopy for discrimination of cognate and non-cognate T cell:DC interactions, as depicted in FIG. 6A-6H in accordance with an illustrative embodiment. With two-photon microscopy, mean experimental interaction time (as shown in FIG. 6A) and cellular arrest coefficient (as shown in FIG. 6B) can discriminate between non-cognate (WT) or cognate (5CC7) interactions. However, discrimination is not absolute as there is substantial heterogeneity in each group with significant overlap apparent when individual events are graphed, as depicted in FIG. 6C. Using the CDM system, distances less than 1 μm can resolve cognate from non-cognate interactions with similar statistical power as two-photon, as depicted in FIG. 6D.

Figure 6E:
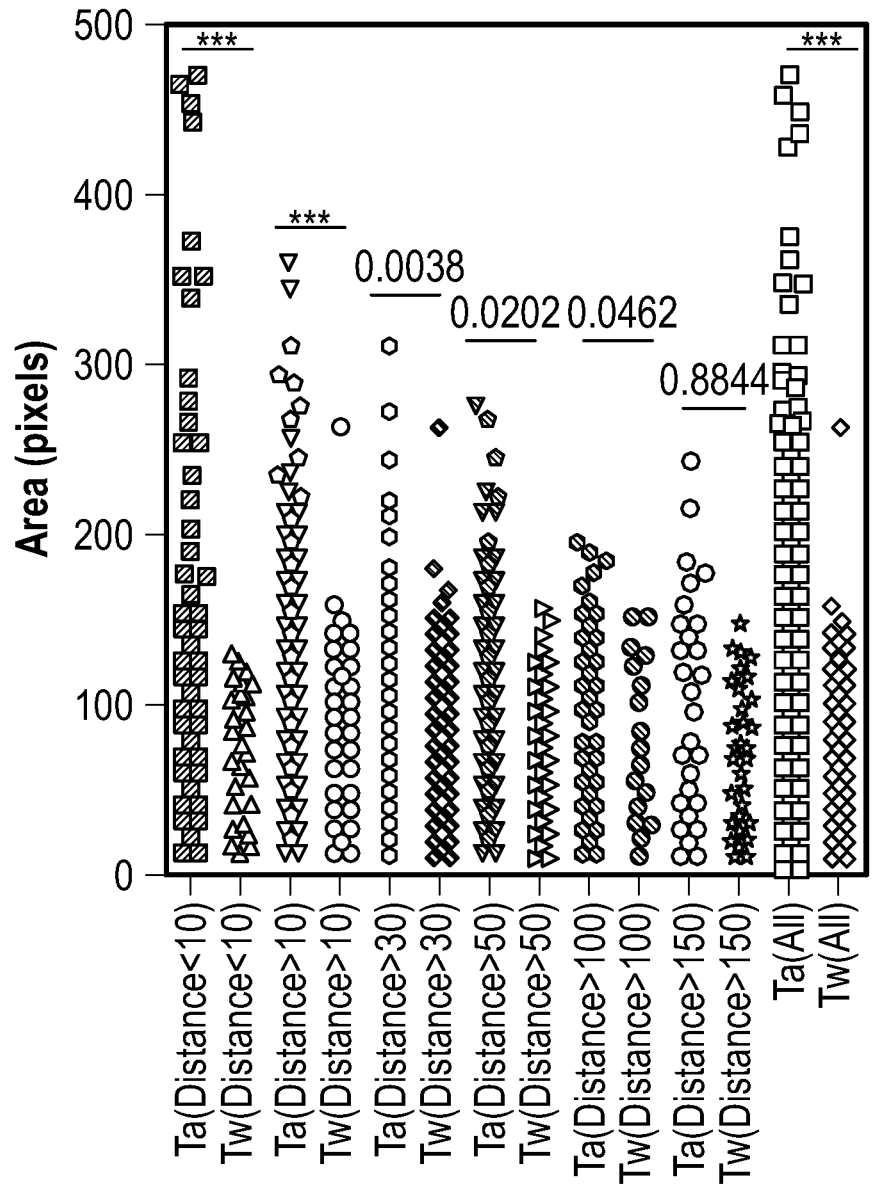
FIG. 6E depicts T cell cross-sectional area as a function of distance from DC for antigen specific (Ta, or antigen specific T cells in first column in each pair) and WT T cells, with $p=<0.0001$ in accordance with an illustrative embodiment.

However, most potential T cell:DC interactions are not captured at these distances. These studies were done on fresh frozen samples using one feature of CDM, namely the ability to precisely measure distances between individual cells in different cell populations Analysis was also conducted to determine whether T cell shape (actually DAPI-stained nuclear shape) would increase discrimination. One such parameter is cross-sectional area as this becomes apparently larger as the cognate T cell spreads across the DC. As demonstrated in FIG. 6E, at distances less than 3 µm, surface area increases discrimination between cognate and non-cognate T cells and this discrimination persists out to 24 µm. In FIG. 6E, a first column pair is at 3 µm, the last is total, and individual T cell:DC pairs are plotted. These data were obtained using the CDM system.

Figure 6F:
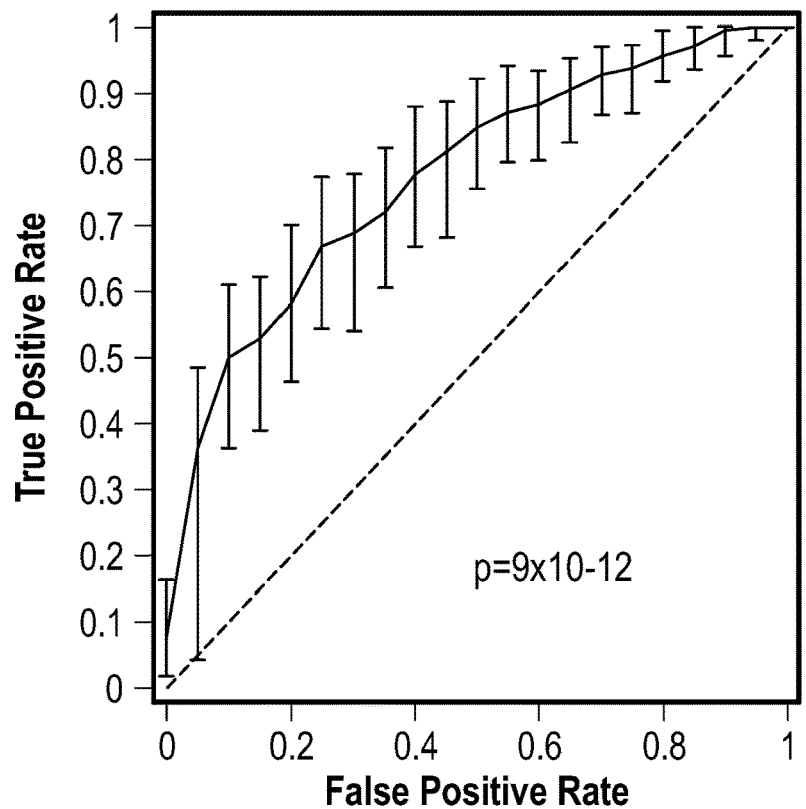
Figure 6G:
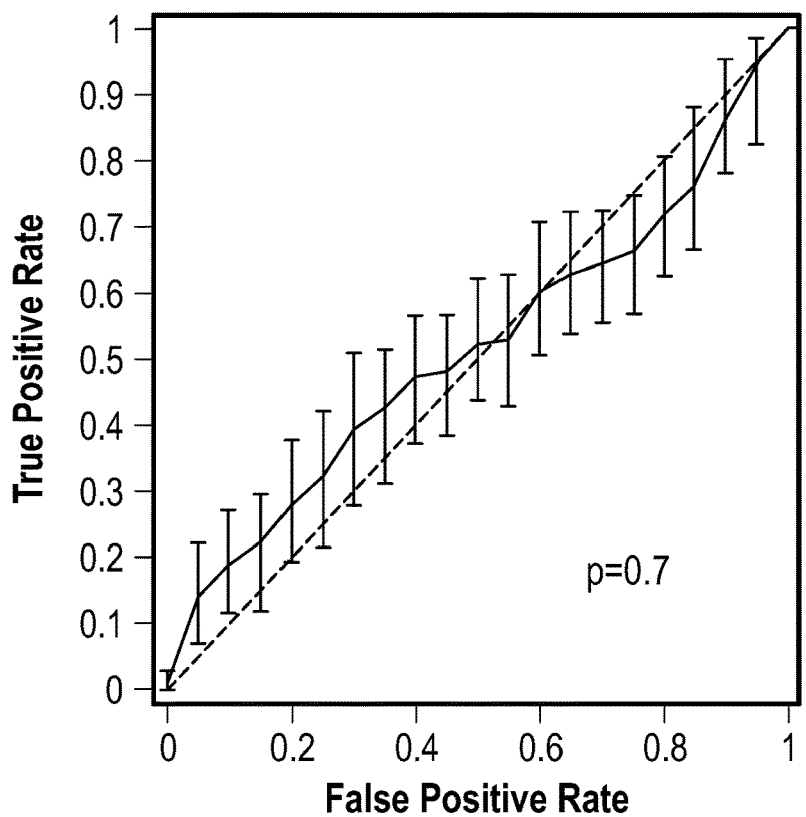
FIG. 6G depicts sensitivity and specificity of CDM composite measure (distance plus 10 T cell shape characteristics) to discriminate antigen specific from WT T cells greater than 24 µm in accordance with an illustrative embodiment. Final analysis of full data set provided in FIG. 14.
Figure 6H:
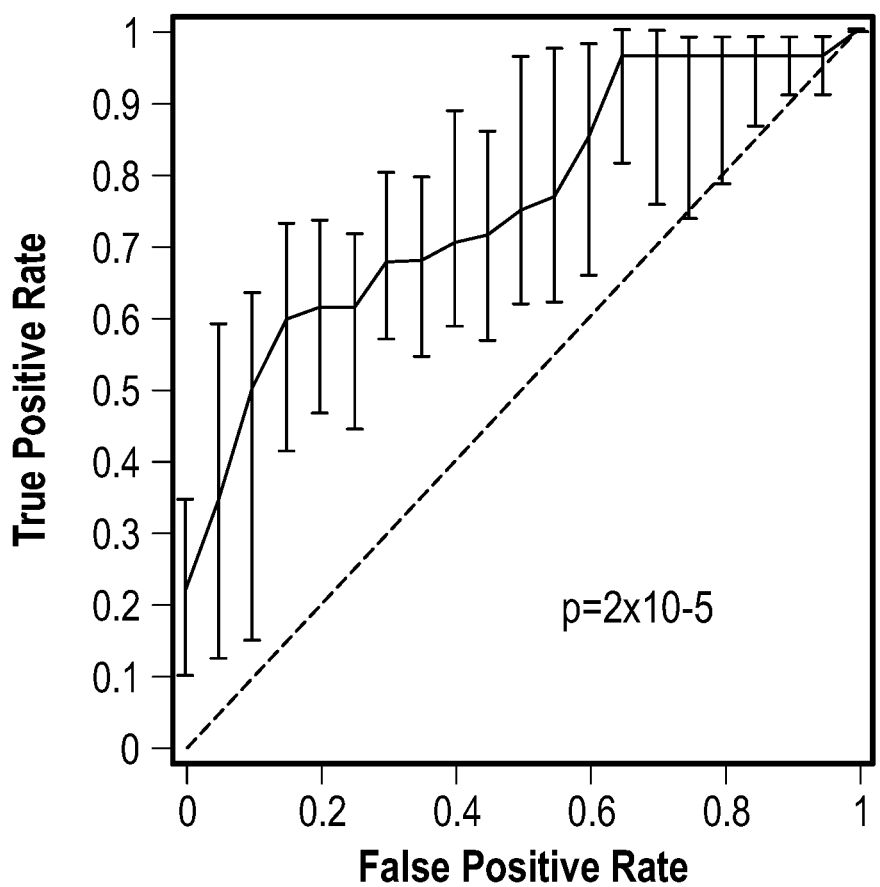
FIG. 6H depicts sensitivity and specificity of cellular arrest coefficient from 2 photon data in accordance with an illustrative embodiment. Final and more detailed analysis provided in FIG. 14.

Based on these encouraging results 10 different measures of cell shape were defined, as discussed above. These were then combined with cell distance and were built into an analytical program using supervised learning models to perform binary classification of cell populations. Results were plotted as the true positive rate (sensitivity) versus the false positive rate (1-specificity). For these studies, T cells were grouped into those that were either less than 24 µm or greater than 24 µm from a DC. At less than 24 µm, the composite index gives excellent discrimination (area under curve, AUC 0.77, $p=9\times10^{-12}$), as shown in FIG. 6F, while beyond 24 µm there is no discrimination, as shown in FIG. 6G. These data indicate that the CDM system can capture cognate interactions between T cells and large APCs (up to 48 µm across) such as dendritic cells. Furthermore, the CDM system compared favorably to two-photon based measures such as arrest coefficient (AUC 0.76, $p=2\times10^{-5}$), as shown in FIG. 6H. These data indicate that the CDM system can approximate the sensitivity and specificity of two-photon microscopy for discriminating between cognate and non-cognate T cell:DC interactions.

Figure 7A:
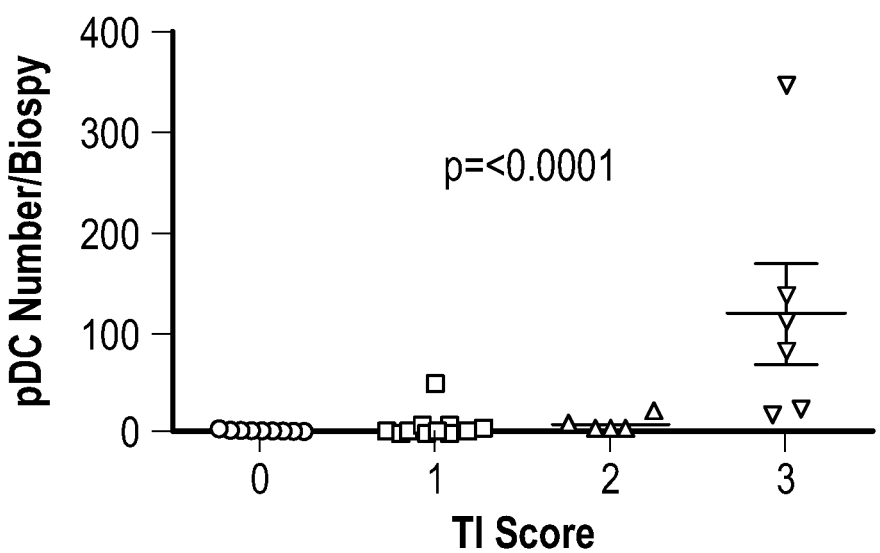
FIG. 7A depicts that pDCs are only prevalent in severe TII in accordance with an illustrative embodiment.
Figure 7B:
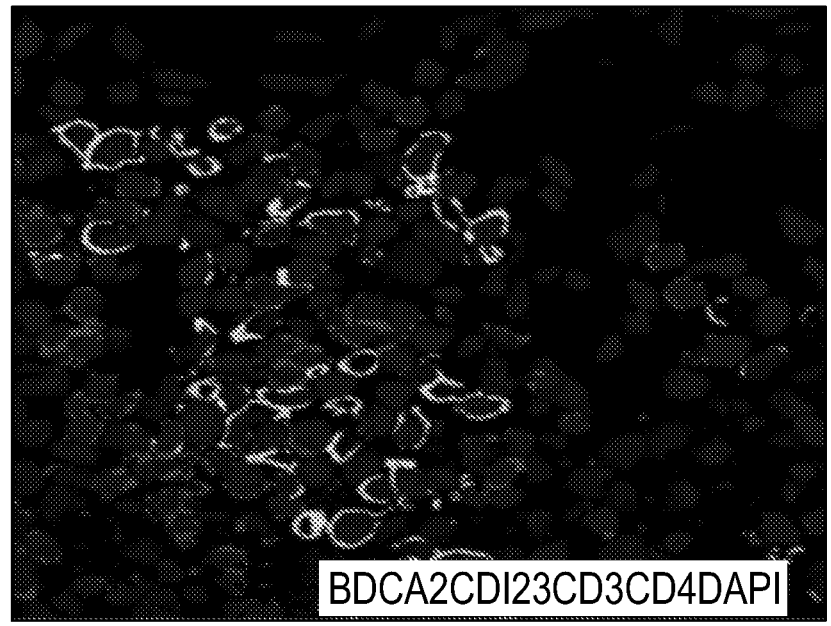
FIG. 7B depicts pDC aggregates in severe TII with associated T cells in accordance with an illustrative embodiment.
Figure 7C:
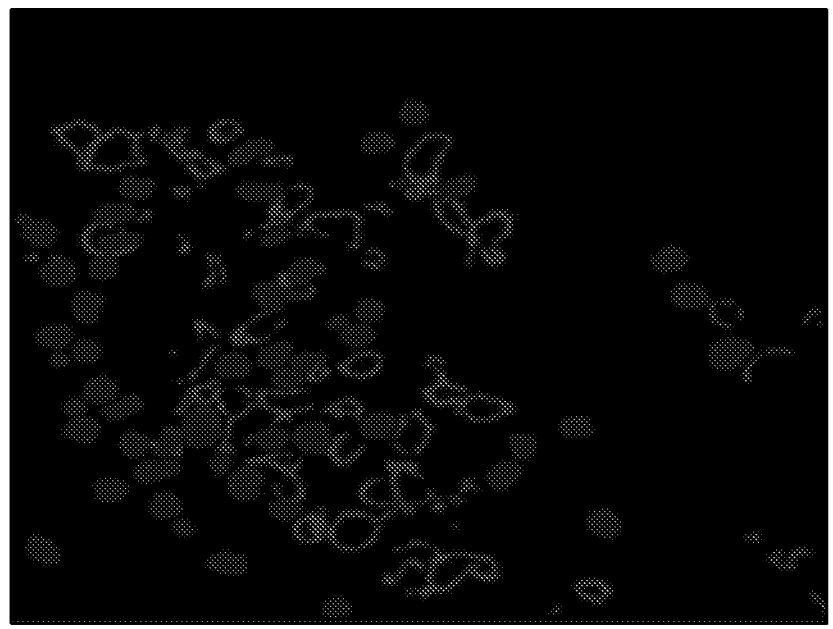
FIG. 7C depicts a processed image showing the outline of pDCs and CD4+ T cell nuclei in accordance with an illustrative embodiment.

The CDM system was also applied to human LuN biopsies to examine the relative contribution of myeloid DCs (mDCs) and plasmacytoid DCs (pDCs) to T cell activation in situ. Assaying across all degrees of LuN TII, the prevalence of mDC (BDCA1$^+$CD11c$^+$) cells was remarkably invariant at about 0.2 cells per HPF or less than 10 per full biopsy section. In contrast, pDCs (BDCA2$^+$CD123$^+$) were found at relatively high densities but only in those biopsies with severe TII, as depicted in FIG. 7A. Aggregates of pDCs and CD4$^+$CD3$^+$ T cells were common throughout the tubulointerstitium in severe TII (n=39 biopsies), as depicted in FIG. 7B. Using the CDM system, raw images were converted to images in which the pDC BDCA2$^+$CD123$^+$ membrane signature was shown along with assigned CD4$^+$CD3$^+$ nuclei. As can be seen in FIG. 7C, there was close apposition of T cells with pDCs in T cell:pDC aggregates.

Figure 7D:
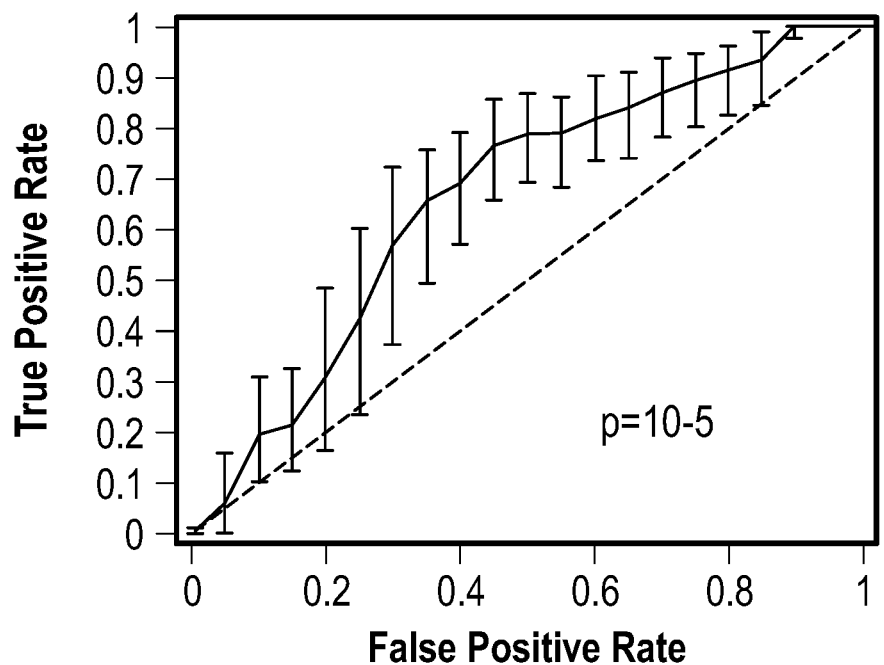
Figure 7E:
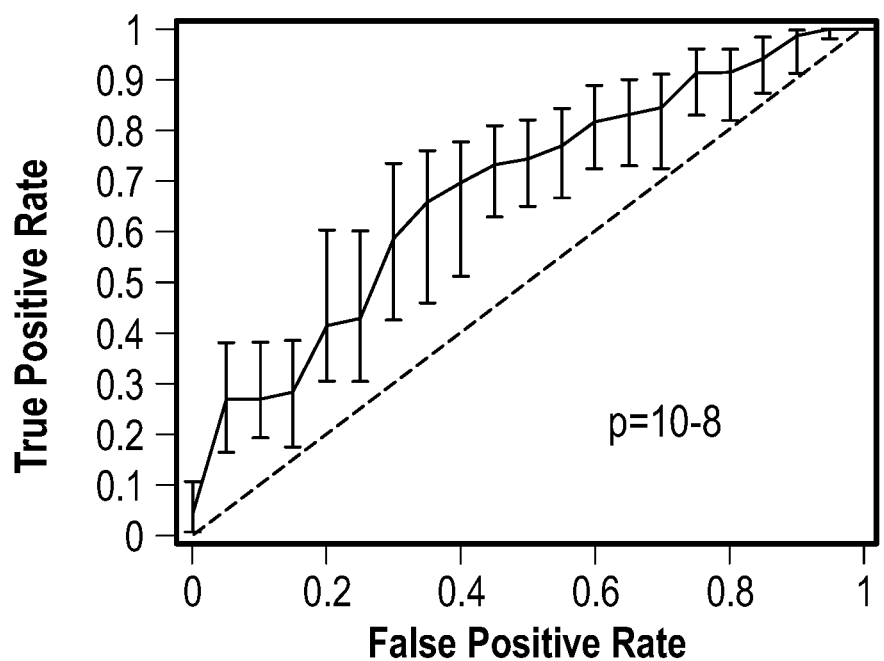
FIG. 7E depicts discrimination between CD4+ and CD4− T cells interacting with pDCs at distance less than 2.5 µm (AUC 0.68, $p=10^{-8}$) in accordance with an illustrative embodiment.

It is also apparent that the edges of pDCs can be readily defined. Therefore, the CDM system was used to examine distance and T cell shape relationships between CD3$^+$CD4$^+$ T cells or CD3$^+$CD4$^-$ (presumptive CD8$^+$ T cells, negative control) and the pDC cytoplasmic edge. The use of CDM revealed that at all distances CD3$^+$CD4$^+$ cells adopted distance and cell shape relationships consistent with APC:T cell interactions as compared to CD3$^+$CD4$^-$ T cells (AUC 0.67, $p=10^{-5}$), as shown in FIG. 7D. Differences were more apparent at very close distances to pDCs. For example, at a given distance of 2.5 µm or less, the CDM system discriminated between CD3$^+$CD4$^+$ and CD3$^+$CD4$^-$ T cells (AUC 0.68, $p=10^{-8}$), as shown in FIG. 7E. These data suggest that pDCs are an important APC in LuN. More importantly, the results demonstrate the utility of using the CDM system to identify putative APC populations in vivo in human tissue.

In addition to the CDM systems discussed herein, additional embodiments are also envisioned that enable analysis in situ of adaptive cell networks in human renal disease. For example, one embodiment utilizes seven color confocal microscopy. In an illustrative embodiment, such seven color confocal microscopy can be conducted using a Leica SP8 fitted with UV, Argon and white light lasers. This enables use of any excitation wavelength between 470 and 670 nm. Using the acoustical optical beam splitter, up to 8 laser lines can be selected simultaneously with a precision approaching 1 nm. In alternative embodiments, different equipment may be used to conduct multicolor confocal microscopy.

In another embodiment, full biopsy tiling can be used. In one embodiment, to perform such biopsy tiling, the above-referenced Leica SP8 is equipped with a XY motorized stage including Mark and Find and Autostiching/Mosaic Modules that enable tiling a high resolution (1024×1024) mosaic of entire longitudinal biopsy sections (usually 40-60 630× HPFs each). Assessing full biopsy sections will help to minimize observer bias. In an alternative embodiment, different equipment may be used to conduct the full biopsy tiling.

In another embodiment, the CDM system can utilize multi-color confocal microscopy on paraffin embedded samples. For example, seven color confocal microscopy can be performed on paraffin embedded samples with excellent resolution. These results indicate that the CDM systems described herein can be applied to human tissue prepared in different ways including fresh-frozen and paraffin embedded samples. Samples may be from biopsy, fine needle aspirates, exfoliates, blood, tissue, organs, semen, saliva, tears, other bodily fluid, hair follicles, skin, or any sample containing or constituting biological cells. In certain embodiments, samples may be, but are not limited to, fresh, frozen, fixed, formalin fixed, paraffin embedded, or formalin fixed and paraffin embedded.

Yet another illustrative embodiment, involves a CDM system that minimizes auto-fluorescence due to scarring. For example, it has been determined that collagen bundles are highly auto-fluorescent. However, using technology such as the Leica Light Gate, such auto-fluorescence can be suppressed using pulsed excitation and time-resolved detection. In one embodiment, Light Gate technology can be used to perform the pulsed excitation and time-resolved detection. Alternatively, other technology may be used.

The CDM systems described herein have also been used to develop processes to validate reagents to identify adaptive inflammatory cell networks in human renal disease. Specifically, validated panels of antibodies have been developed to detect major pathogenic subsets of immune mediators including B cells, plasma cells, CD4+ and CD8+ T cells, mDCs, and pDCs in human fresh frozen renal biopsies. The primary focus has been on MHC class II restricted CD4+ T cell activation by classical antigen presenting cells, with the goal of expanding the panel of antibodies to capture all classical MHC class II restricted APCs. This is done using MHC class II staining (Alexa 700) and a validated mixture of antibodies to common co-stimulatory receptors (e.g., CD80, CD86, CD40, and OX40L, all labelled with Alexa 647). Combination of these two channels with DAPI provides a denominator of the total number of antigen presenting cells.

Markers of specific potential APC types are then used to determine how each cell type contributes to the APC numerator for a particular biopsy. These data both provide information on the relative frequencies of different APC populations and reveal whether there are substantial populations of APCs that have not been identified using conventional markers. If such substantial populations of APCs are found, other potential APC populations of relevance to AKI and CKD can be identified. For each cell population, two antibodies targeting different cell markers are validated.

It is noted that intracellular cytokines and transcription factors are important for defining cell subsets and activation states. To visualize these markers, two approaches are taken. The first approach involves staining with monoclonal antibodies as described above. However, many cytokines are secreted, making it difficult to assign expression back to specific cell types. Therefore, a determination is made regarding whether mRNA in situ hybridization can be applied to human tissue. This approach has been validated in single cells with oligonucleotide probes to Igk intronic sequences. In these experiments, RNA FISH was combined with genomic DNA FISH and IF to visualize ongoing transcription of specific $V_k$ segments by elongating Pol II in small pre-B cells prior to Igk recombination. In addition, 2-color RNA FISH was combined with IF. These well-validated techniques can be applied to human tissue. For example, the systems and methods described herein can be used to perform up to seven color confocal microscopy and knit HPFs into single images capturing full biopsy sections (i.e., a full biopsy image). Performing seven color confocal imaging and acquiring all data as full biopsy image enables assessment, in an unbiased way, of the relative spatial relationships and inference of the functional relationships between different T cell and APC populations.

In certain embodiments, the CDM system is used to evaluate images of a sample obtained from a patient. Examples in lupus nephritis are provided demonstrating that both T follicular helper (TFH) cells activate B cells in situ and that plasmacytoid dendritic cells (pDCs) activate T cells in situ. These findings indicate TFH cells and pDCs cells are viable therapeutic targets in some patients. Furthermore, the TFH and pDCs supported cellular networks are biomarkers of specific pathogenic processes that both meaningfully subset patients and suggest that targeting these networks therapeutically, either component cells or specific molecules they express, will be beneficial in those patients. Both TFH and pDC cellular interactions occur in severe tubulointerstitial inflammation. These results indicate that TFH cells and pDCs, and the cellular networks they support, are likely important prognostic markers that can only be identified and quantified using CDM. In certain embodiments, the evaluation comprises determining the ratio of two cell types within a sample.

In addition to the analysis above, a much more in depth analysis was performed on the additional murine data set described above. In addition, the experiment was repeated and obtained an independent validation data set. Same cells and procedures were done. 1) CD11c+ DCs from B10.A2 CD45.1+ mice stimulated in vitro with lipopolysaccharide (LPS), loaded with pigeon cytochrome C peptide (pPCC) and labeled with the fluorescent dye CMF2HC; 2) Polyclonal B10.A CD45.1+CD4+ T cells labelled with CMFDA; 3) 5CC7 transgenic B10.A CD45.2+CD4+ T cells labelled with CMTPX. Cells were then transferred into recipient mice and after 12 hours, popliteal lymph nodes (LNs) imaged by TPEM. These same LNs were then frozen, sectioned, stained for cell nuclei with TO-PRO-3 and imaged by confocal microscopy.

The data described here in FIG. 8, in part, overlap with that demonstrated in FIG. 6. However, the following analysis is more complete. The use of TPEM revealed clear differences in the behavior of 5CC7 antigen specific and WT T cells relative to antigen-pulsed DCs. The 5CC7 T cells tended to form prolonged interactions with DCs, while WT T cells were more motile and only interacted briefly with DCs. Furthermore, WT T cells remained spherical when interacting with DCs as depicted in FIG. 8A, while 5CC7 T cells tended to flatten against DCs as depicted in FIG. 8B. Specifically, FIG. 8A depicts confocal microscopy of WT cells interacting with DCs in accordance with an illustrative embodiment. FIG. 8B depicts examples of 5CC7 cells interacting with DCs in accordance with an illustrative embodiment.

Figure 8E:
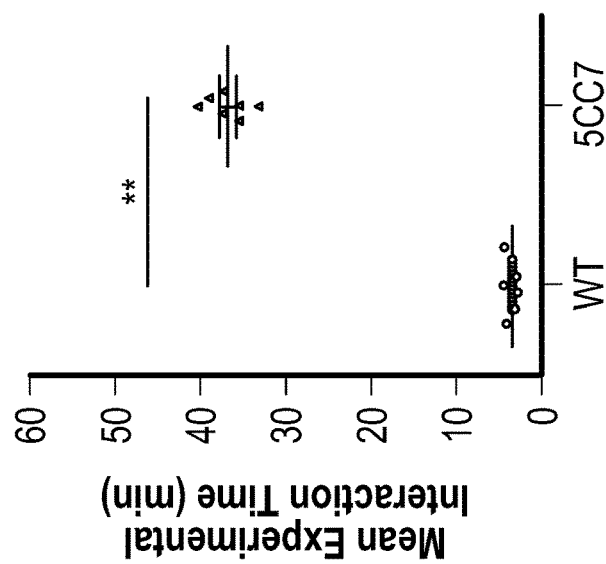
FIG. 8E depicts interaction time plotted per mouse in accordance with an illustrative embodiment.
Figure 8D:
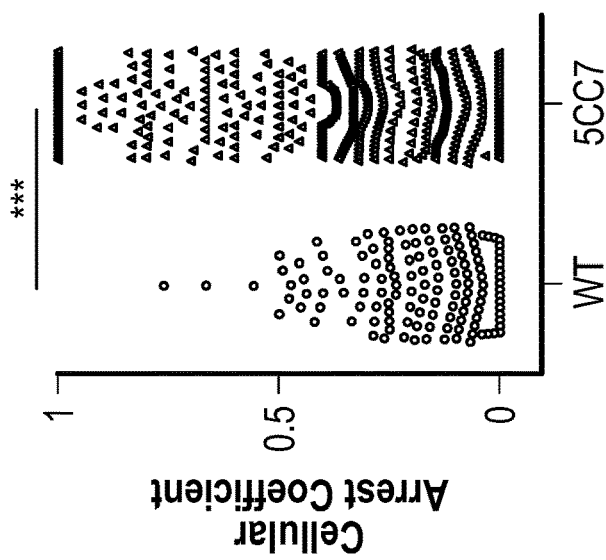
FIG. 8D depicts arrest coefficient plotted as a mean for individual cells across all experiments in accordance with an illustrative embodiment.
Figure 8C:
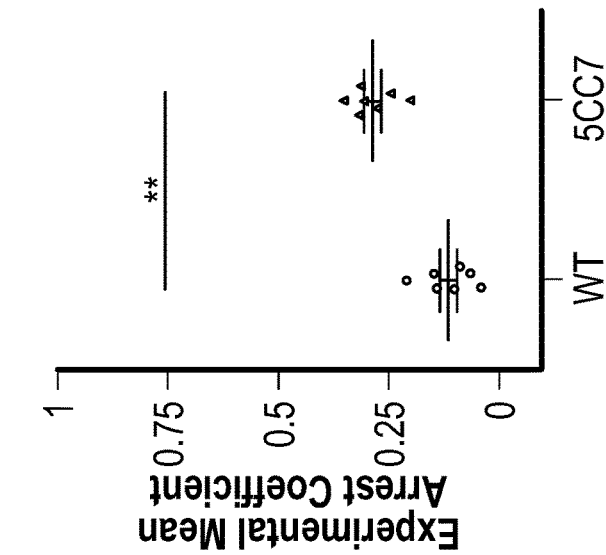
FIG. 8C depicts a plot of the mean T cell arrest coefficient per mouse which indicates that the motility of 5CC7 cells was less than that of WT cells in accordance with an illustrative embodiment. Data provided in FIGS. 8C-H is similar to that provided in FIG. 6. However, the analysis in FIG. 8 is more complete.
Figure 8F:
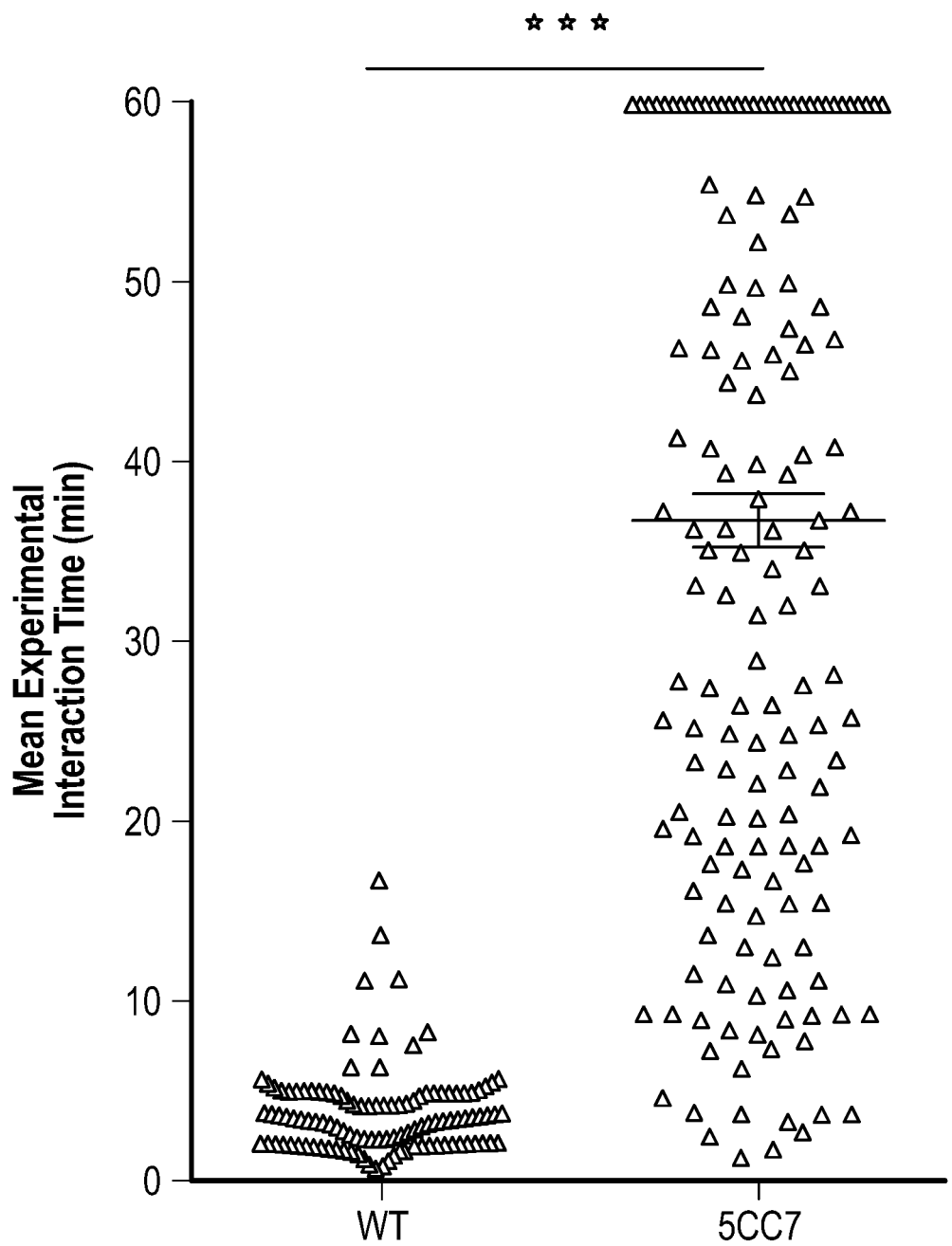
FIG. 8F depicts interaction time plotted per cell for all experiments in accordance with an illustrative embodiment.
Figure 8G:
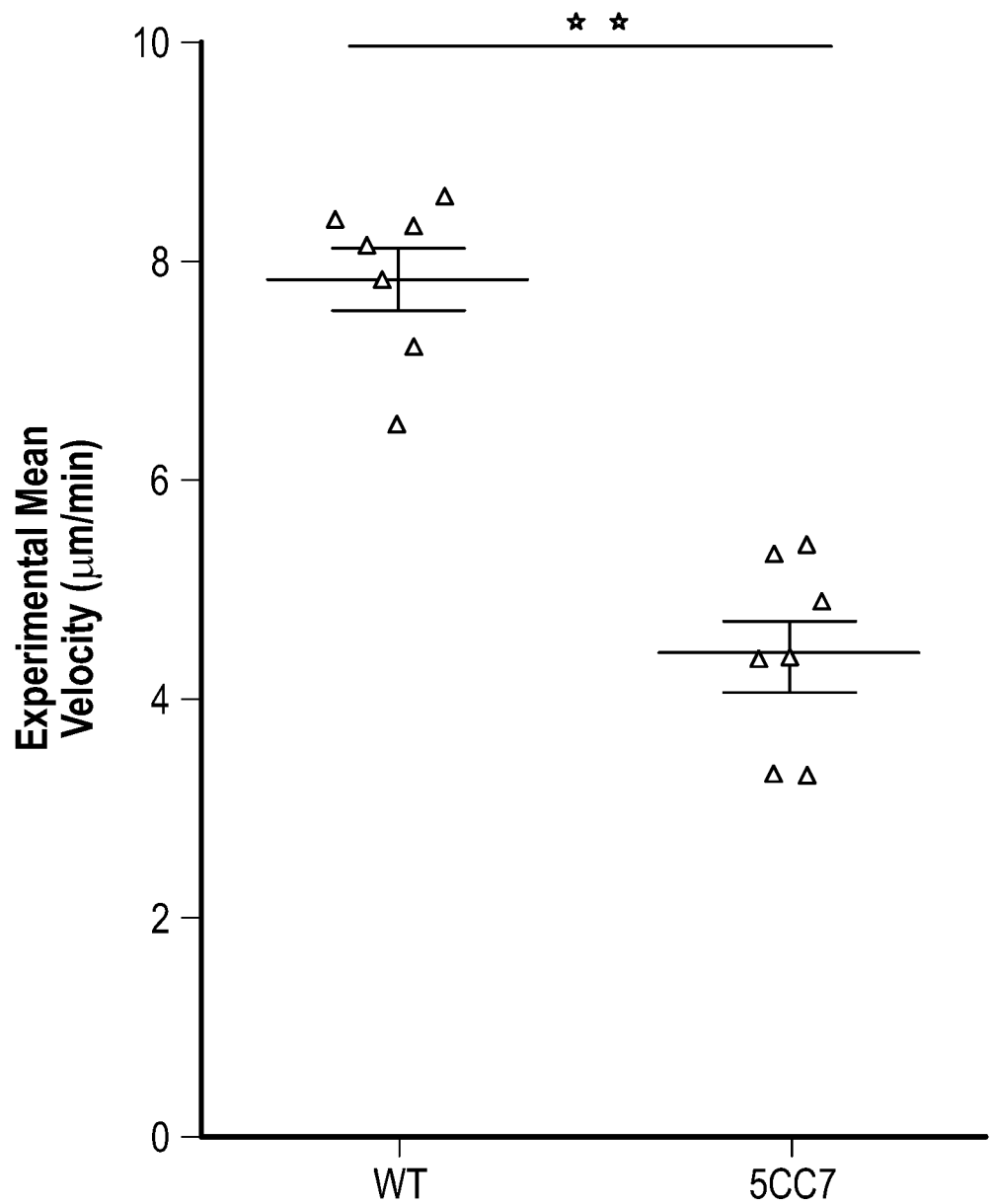
FIG. 8G depicts cellular velocity plotted per mouse in accordance with an illustrative embodiment.
Figure 8H:
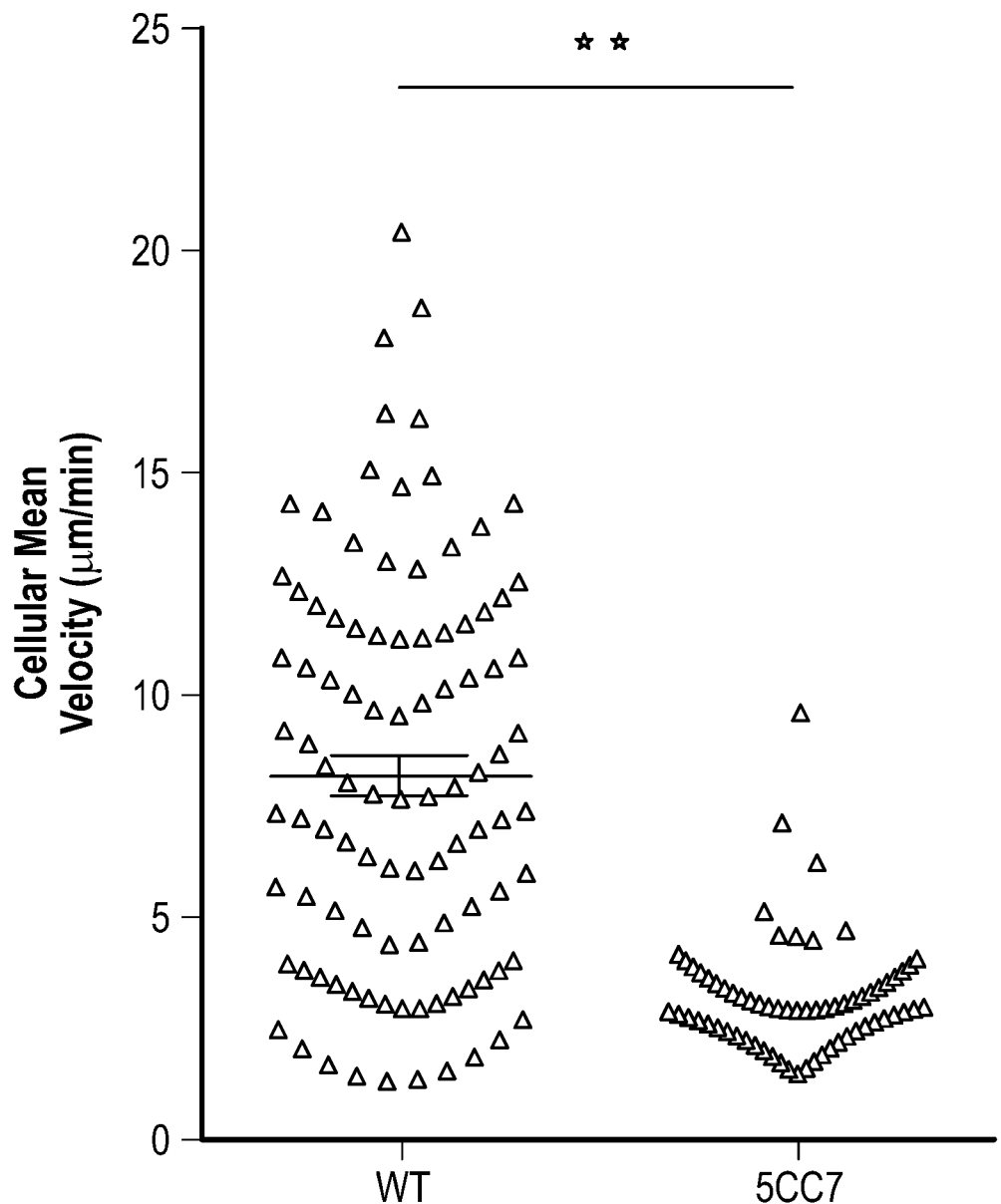
FIG. 8H depicts cellular velocity plotted per cell for all experiments in accordance with an illustrative embodiment.

Quantitative analysis of the TPEM data revealed that measures of cellular motion discriminated between WT and 5CC7 cells relative to DCs, as depicted in the table of FIG. 9. More specifically, FIG. 9 is a table that includes a summary of mouse data sets used by the CDM system in accordance with an illustrative embodiment. Referring back to FIG. 8, FIG. 8C depicts a plot of the mean T cell arrest coefficient per mouse which indicates that the motility of 5CC7 cells was less than that of WT cells in accordance with an illustrative embodiment. In FIG. 8C, the arrest coefficient is plotted as a mean per mouse (n=7). However, when plotting values per cell across mice there was substantial overlap between the two populations, as depicted in FIG. 8D, which shows arrest coefficient plotted as a mean for individual cells across all experiments in accordance with an illustrative embodiment. Mean T cell interaction time provided better separation with larger relative differences between WT and 5CC7 mice and less overlap when individual cells were plotted, as shown in FIGS. 8E-8F. Specifically, FIG. 8E depicts interaction time plotted per mouse and FIG. 8F depicts interaction time plotted per cell for all experiments in accordance with illustrative embodiments. The mean T cell interaction time with DCs, plotted both per mouse and per cell, provided intermediate separation between groups with moderate overlap between individual cell values, as shown in FIGS. 8G-8H. Specifically, FIG. 8G depicts cellular velocity plotted per mouse and FIG. 8H depicts cellular velocity plotted per cell for all experiments in accordance with illustrative embodiments. These data again indicate that TPEM measures can accurately discriminate between WT and antigen-specific T cell populations based on their behavior relative to antigen-pulsed DCs.

Figure 10A:
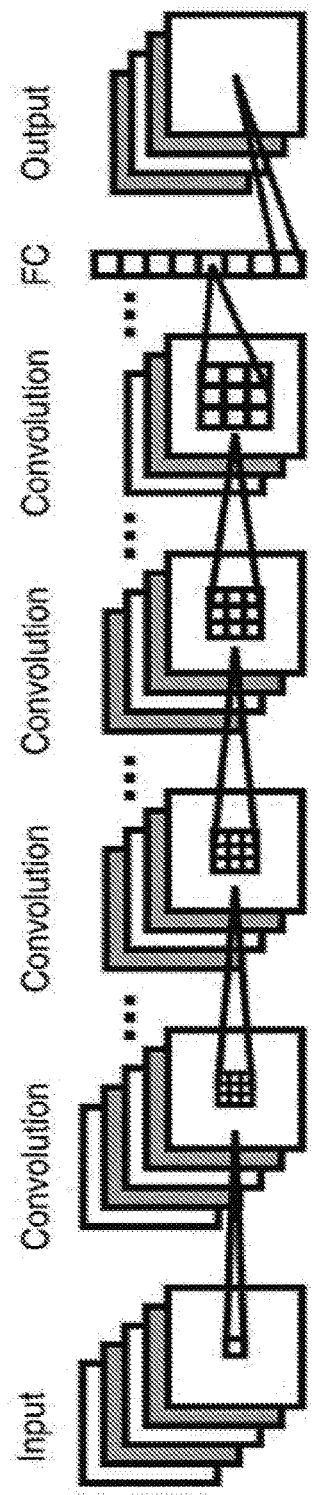
FIG. 10A depicts a schematic of the DCNN illustrating input of five layers (three fluorescent channels, DAPI and DIC), four subsequent levels of convolution (10 layers total, each level followed by a max pooling layer), and 4 classifier outputs (fluorescent signatures for WT T cells, 5CC7 T cells, DCs and DAPI) in accordance with an illustrative embodiment.

Deep learning was used to develop analytical computer tools to automatically assess confocal images of LN frozen sections yielding cell type, position, and shape. Specifically, a deep convolutional neural network (DCNN) was implemented which employs 3-dimensional convolutional kernels, 10 convolutional layers, three maximum pooling layers, a fully connected (FC) layer, and a softmax layer. The DCNN includes 701 k trainable variables. FIG. 10A depicts a schematic of the DCNN illustrating input of five layers (three fluorescent channels, DAPI and DIC), four subsequent levels of convolution (10 layers total, each level followed by a max pooling layer), and 4 classifier outputs (fluorescent signatures for WT T cells, 5CC7 T cells, DCs and DAPI) in accordance with an illustrative embodiment. Across each convolution level, sparsity is increased resulting in progressively larger kernel sizes (increasingly larger 3×3×3 boxes). The ROI stays constant throughout the DCNN while the number of channels decreases in two pooling layers. Each convolutional layer contains 24 to 200 feature maps (FMs). In the fully connected (FC) layer, all features (600) are integrated at each pixel which are then ascribed classifier probabilities in the softmax layer (not shown). Each pixel is assigned to the object type with maximum predicted probability to produce solid objects (segmentations).

Figure 10B:
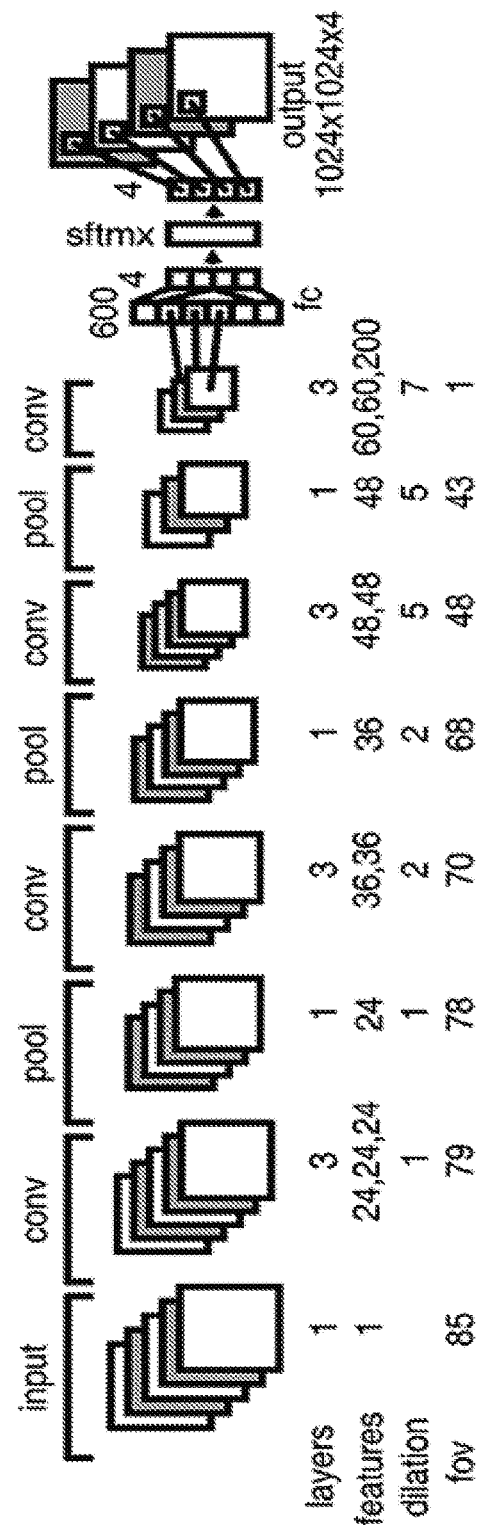
FIG. 10B depicts a DCNN schematic in accordance with another illustrative embodiment. In general.

FIG. 10B depicts a DCNN schematic in accordance with another illustrative embodiment. FIG. 10B describes the same DCNN as FIG. 10A but in more detail. In FIG. 10B, five channel input is fed through 10 convolutional and 3 pooling layers with 3×3×3 kernel size. The final convolutional layer is followed by a fully connected (FC) and softmax layer. Shown at bottom are number of layers, number of feature maps (features), dilation factor (DF), and field of view x,y size, where field of view refers to the total amount of information that goes into the final pixel cell-type prediction. The sparsity of convolutions is increased with the dilation factor by skipping pixels within the convolved kernel, resulting in effective kernel size (KS) of ((KS-1)*DF+1). Predictions at individual pixels resulted from a DCNN FOV of 85 pixels×85 pixels×5 channels. The DCNN was trained on dense 184×184 pixel patches reducing to 100×100 pixels in the final DCNN output. The fully connected layer incorporates values from all feature maps into predictions of 4 cell types. Following the fully connected layer, the softmax layer uses the softmax function to transform the cell type prediction in the range [0,1], adding up to 1.0 for all types. Each pixel is then assigned the cell type with maximum predicted probability. This produces solid cell segmentations on which shape-based object analysis can be performed.

Rather than down-sampling the feature maps (FM) resulting from the images with each max-pooling layer, the feature maps were kept at original resolution, and the sparsity of convolution and pooling layers were increased within the network. Predictions at individual pixels resulted from overlapping field of views (FOVs) of up to 85 pixels×85 pixels×5 channels, where FOV refers to the total amount of information that goes into the final pixel object (fluorescent signatures for each cell type or nuclei) prediction. Training on patches of pixels (184×184), rather than individual pixels, both improved object classification and reduced computational burden. The FC layer incorporates all features from the different convolutional layers and FMs (600 features/pixel) into final output values for each pixel. Following the fully connected layer, the softmax layer converts the output from the FC layer into object probabilities ranging between 0 and 1 (100%) adding up to 1 across object types (e.g., cell types). Finally, each pixel is assigned the object type with the maximum predicted probability. In this way, the DCNN produces solid cell or nuclear segmentations on which shape-based object analysis can be performed.

To train the DCNN, confocal images were manually segmented using software such as ICY Bio Image Analysis software and ImageJ. Alternatively, other types of software may be used. All segmentations were independently validated by a blinded observer (VML). For the murine experiment referenced above, the total data set of 295 ROIs were segmented for WT T cells, 5CC7 T cells, DCs, and corresponding cell nuclei as shown in the table of FIG. 9. Training batches included 4 image patches drawn randomly from the entire dataset, each belonging to the four different cell classes (5CC7 T cells, WT T cells, DCs, and background). The DCNN was trained for 200,000 iterations. In alternative embodiments, fewer or additional training iterations may be used.

Figure 11A:
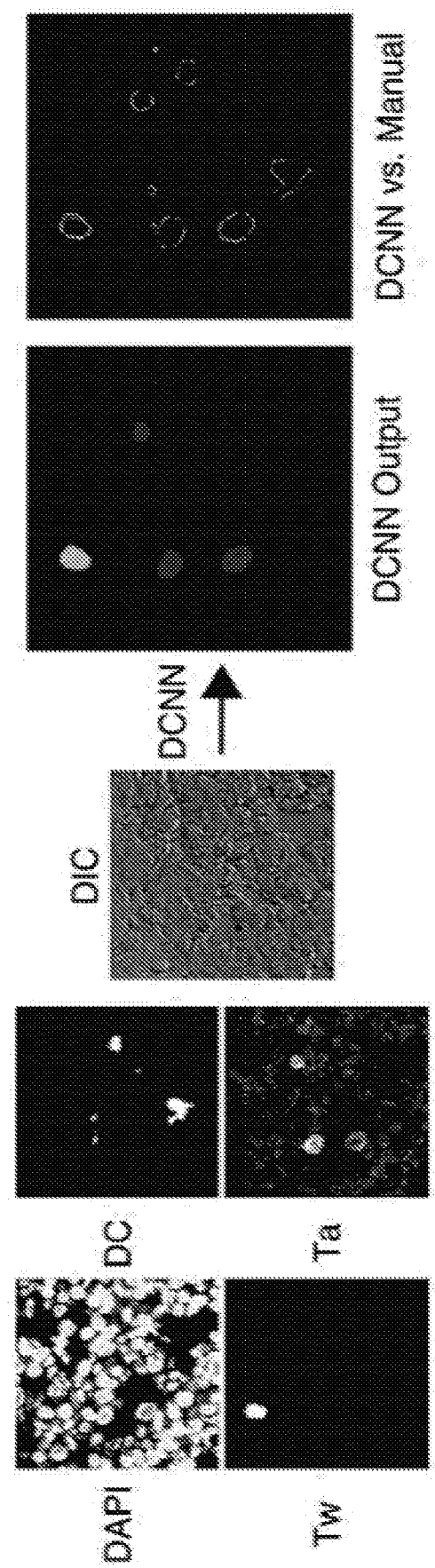
FIG. 11A is an example of input images, the DCNN output, and a comparison to manual segmentation in accordance with an illustrative embodiment.

Confocal images segmented using the DCNN were compared for concordance using 5-fold DCNN model-based cross validation against the manual segmentations. Shown in FIG. 11A is an example of input images, the DCNN output, and a comparison to manual segmentation in accordance with an illustrative embodiment. In FIG. 11A, five input channels were processed through the DCNN with an output of solid objects (middle panel) for 5CC7 T cells, WT T cells, and DCs. At right, DCNN segmentations are shown in colored lines and the corresponding manual segmentations shown in white lines. As can be seen, there was excellent agreement between the DCNN output and manual segmentation. To assess the sensitivity and specificity of localization and segmentation, a segmented cell was considered detected if the intersection over union (IOU) of the manually segmented cell with the automatically segmented cell was greater than or equal to 0.5. Overall, across all objects, the DCNN had an average sensitivity of 88%, specificity of 92%, and an IOU of 0.85. FIG. 12 is a table depicting mouse segmentation performance data in accordance with an illustrative embodiment.

From the DCNN output images, relative distances between T cell populations and DCs were extracted as well as seven independent measures of T cell shape (major and minor axis length, convex and regular perimeters, convex and regular area and equivalent diameter). These data were imported into R statistical software and analyzed to determine which combination of variables and variable weights best discriminated between the 5CC7 and WT populations relative to DCs. The approach included the use of the following models: logistic regression, support vector machines (SVM), and neural networks. For the latter, three different neural network models (simple, tuned, linear output) were generated. The performance of each model was assessed as measured by parameters of classification accuracy, error, and receiver operator curve performance for correctly predicting object type.

Figure 11B:
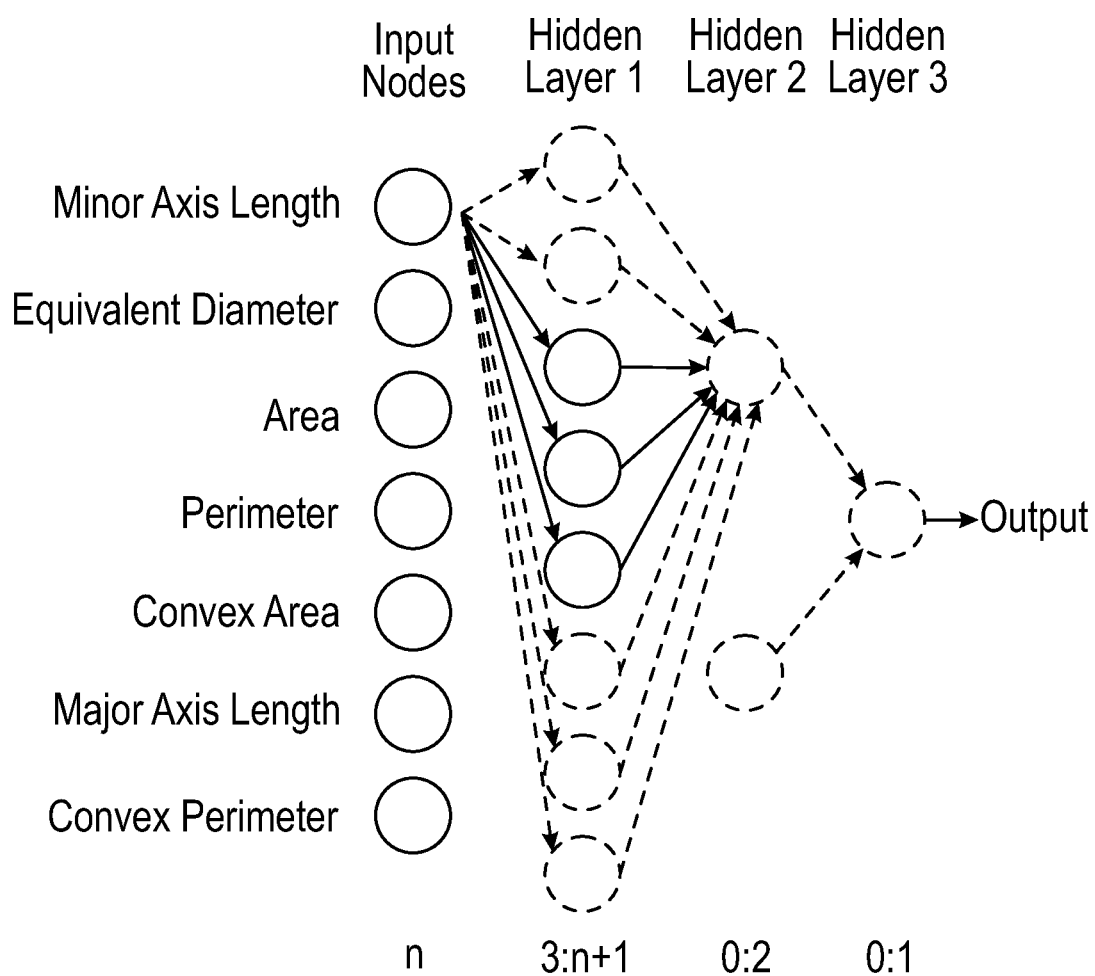
FIG. 11B depicts an actively tuned NN (TNN) model framework in accordance with an illustrative embodiment. As discussed in more detail below, the TNN is used to analyze the DCNN output.

FIG. 11B depicts an actively tuned NN (TNN) model framework in accordance with an illustrative embodiment. FIG. 11B is an outline of the neural network models used to analyze lymphocyte distance and cell shape data that was the output of the DCNN. After segregation by minimum distance, the indicated seven measures of cell shape were scaled, normalized and then used as input into three neural network models (simple, tuned, and linear output) in R statistical software, as described herein. The arrows and circles indicate data flow from a single input node throughout the network (applied weights omitted). The maximum potential number of hidden layers and nodes, used for active tuning, is indicated by dashed gray circles with data flows in between steps denoted by dashed gray lines. Dark circles and lines denote obtained optimal parameters used at the completion of network tuning. n denotes the number of input nodes. The framework of FIG. 11B consistently displayed the best performance among neural network models at the expense of increased number of steps and computation time. This computational pipeline, including sequential use of a DCNN and TNN, results in an enhanced CDM system.

Figure 13C:
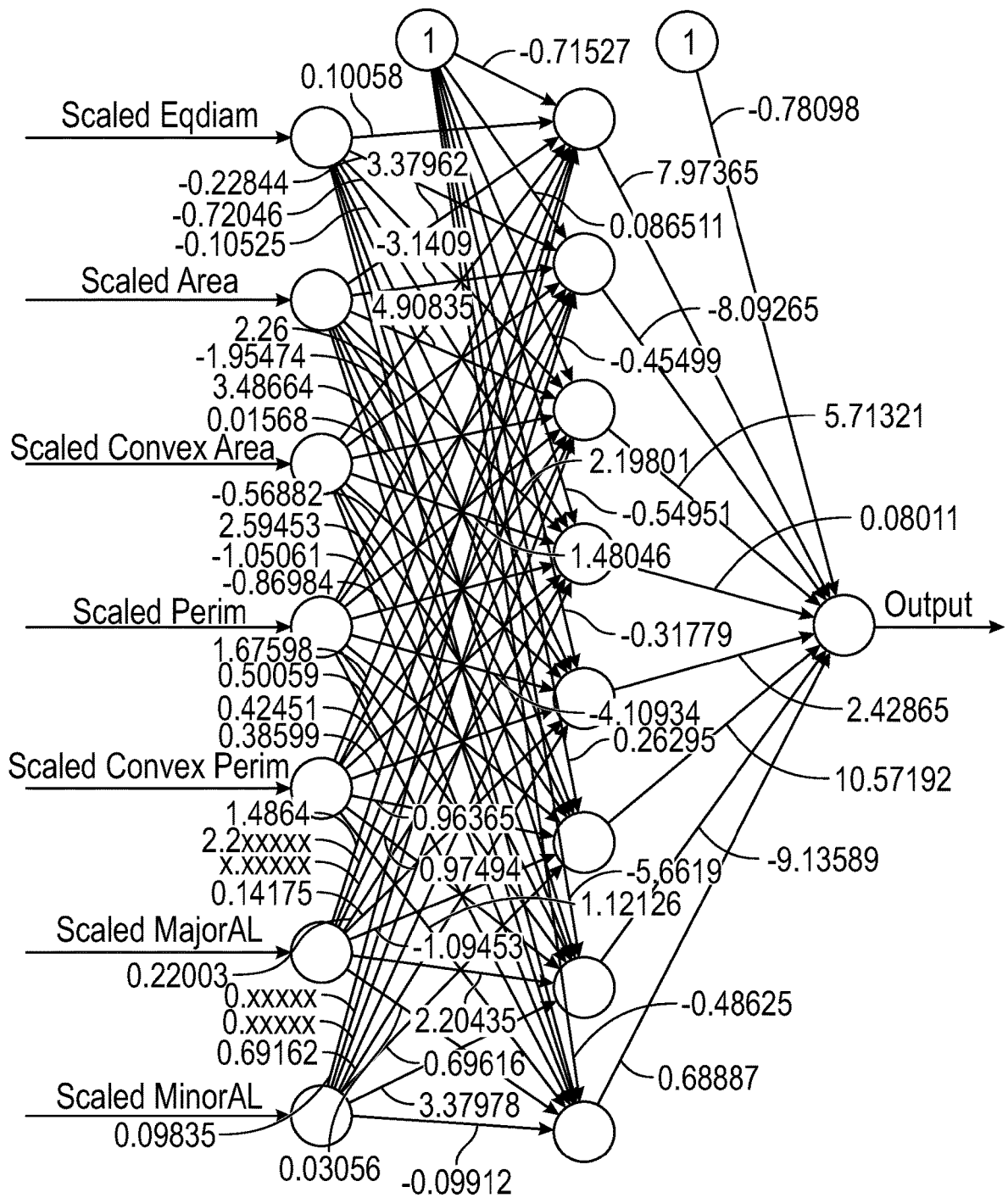
FIG. 13C is a plot of a simple neural network with input nodes hidden layer(s), and output for the dataset of FIG. 13A in accordance with an illustrative embodiment.
Figure 13D:
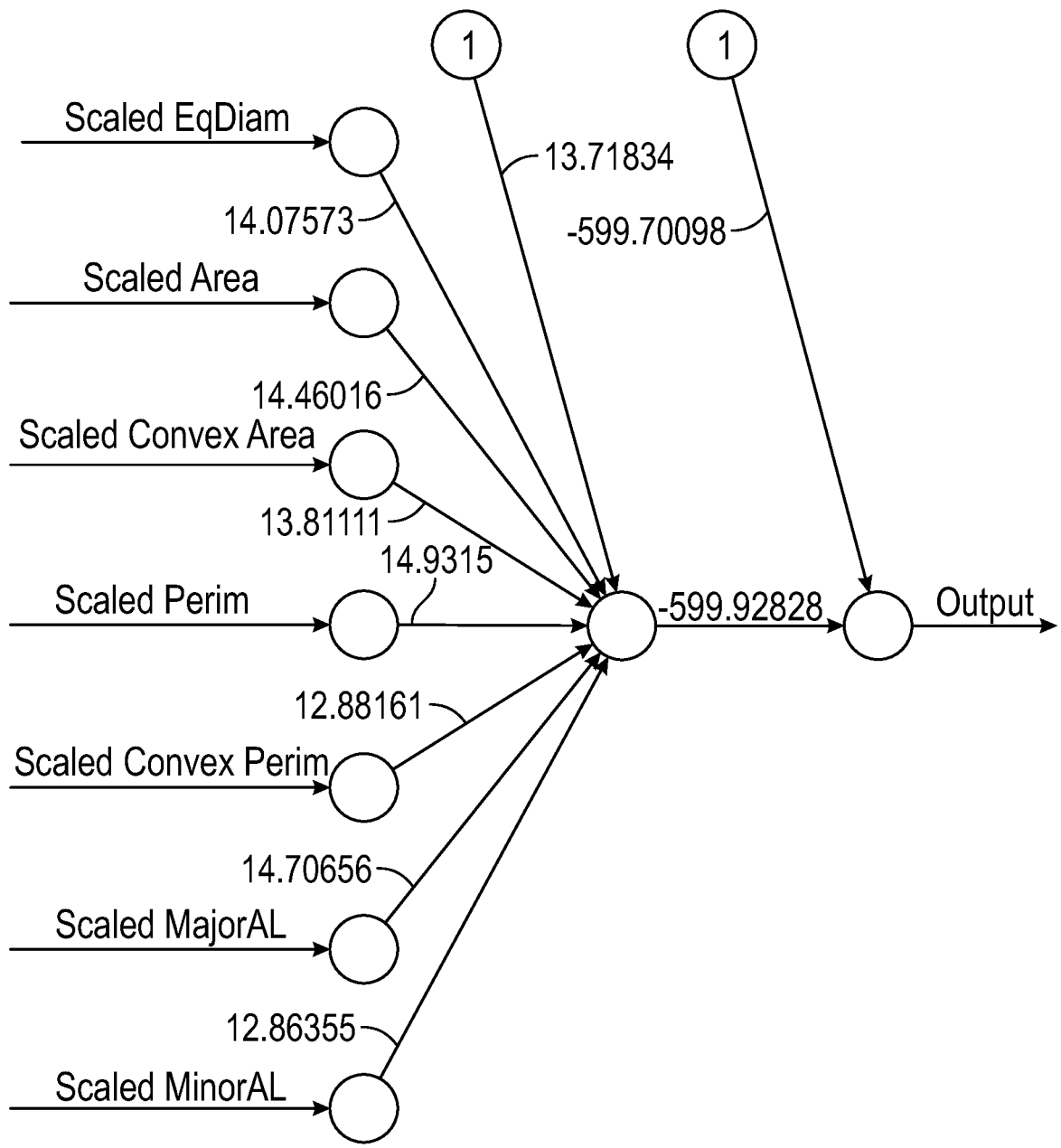
FIG. 13D is a plot of a linear output neural network with input nodes hidden layer(s), and output for the dataset of FIG. 13A in accordance with an illustrative embodiment.
Figure 13E:
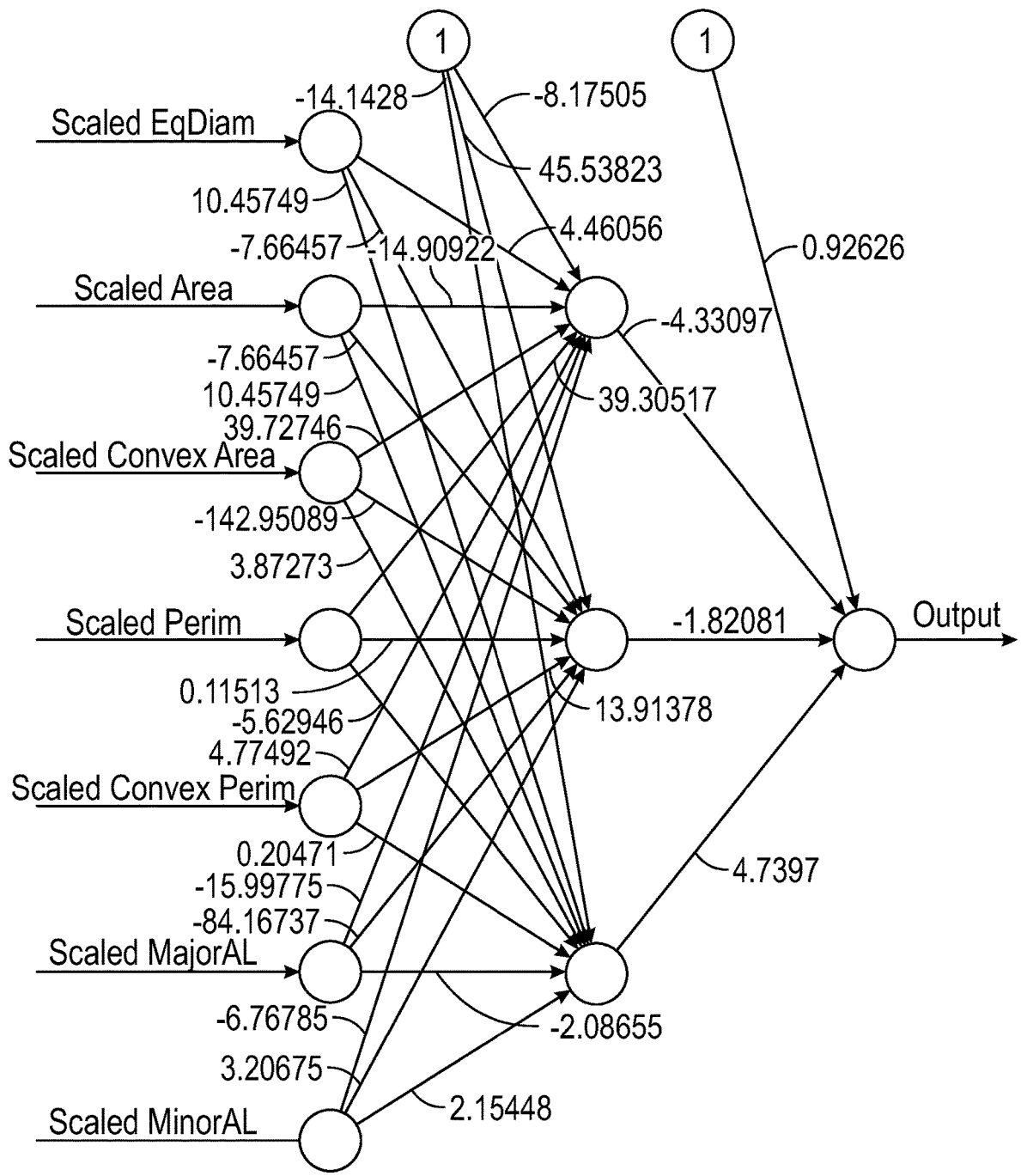
FIG. 13E is a plot of a final tuned neural network with input nodes hidden layer(s), and output for the dataset of FIG. 13A in accordance with an illustrative embodiment.

FIG. 13A is a table depicting a comparison of four models used for analysis of mouse nuclear segmentation at a minimum distance cutoff of ≤25 μm in accordance with an illustrative embodiment. The AUC, 95% confidence interval after 10,000 bootstrap replicates, accuracy and classification errors of predicting cell type in the test set are shown. Random forest analysis, pruned from 500 n-tree replicates based on optimal Cp parameter correlating to minimum error, is shown for reference. FIG. 13B is a comparison of three neural network models for the dataset depicted in FIG. 13A in accordance with an illustrative embodiment. Comparison between AUC, accuracy, and cross entropy error parameters is shown as are the number of steps in each network. FIG. 13C is a plot of a simple neural network with input nodes hidden layer(s), and output for the dataset of FIG. 13A in accordance with an illustrative embodiment. FIG. 13D is a plot of a linear output neural network with input nodes hidden layer(s), and output for the dataset of FIG. 13A in accordance with an illustrative embodiment. FIG. 13E is a plot of a final tuned neural network with input nodes hidden layer(s), and output for the dataset of FIG. 13A in accordance with an illustrative embodiment.

Figure 14A:
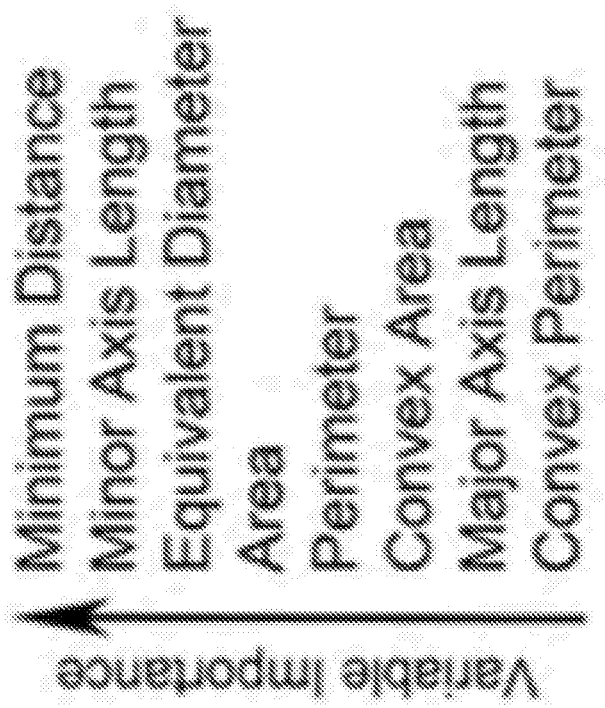
FIG. 14A is a chart depicting the relative contribution of distance and T cell shape parameters to accuracy as determined using random forest analysis in accordance with an illustrative embodiment.
Figure 14B:
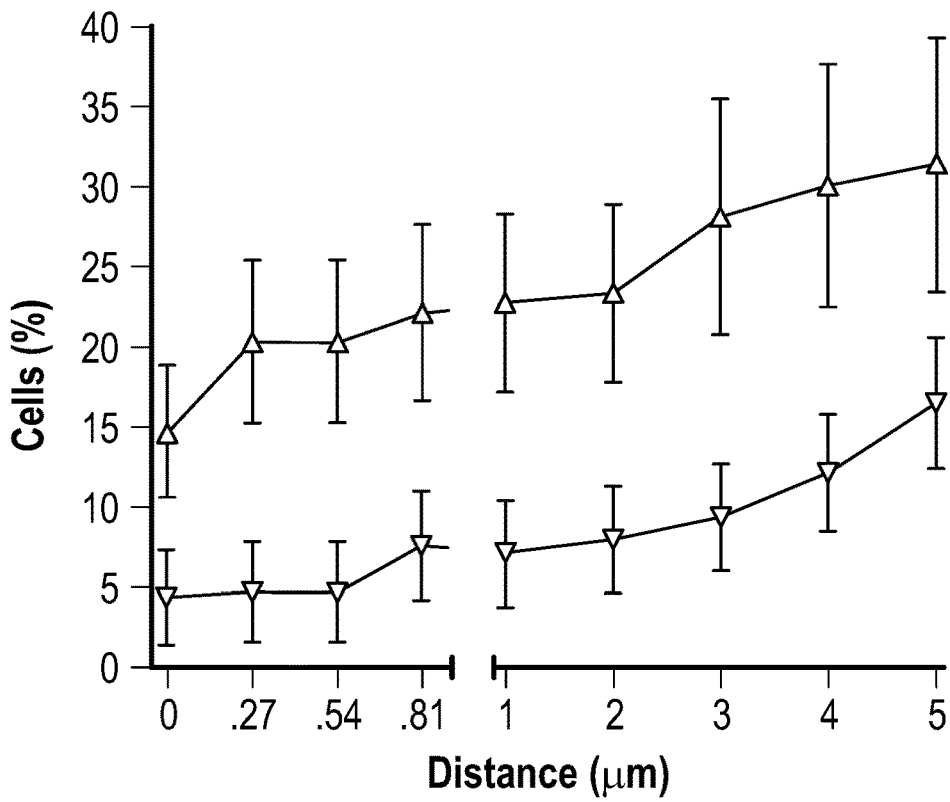
FIG. 14B depicts cumulative frequency of either 5CC7 or WT T cells as a function of distance from antigen-pulsed DCs ($p<0.005$) in accordance with an illustrative embodiment.
Figure 14C:
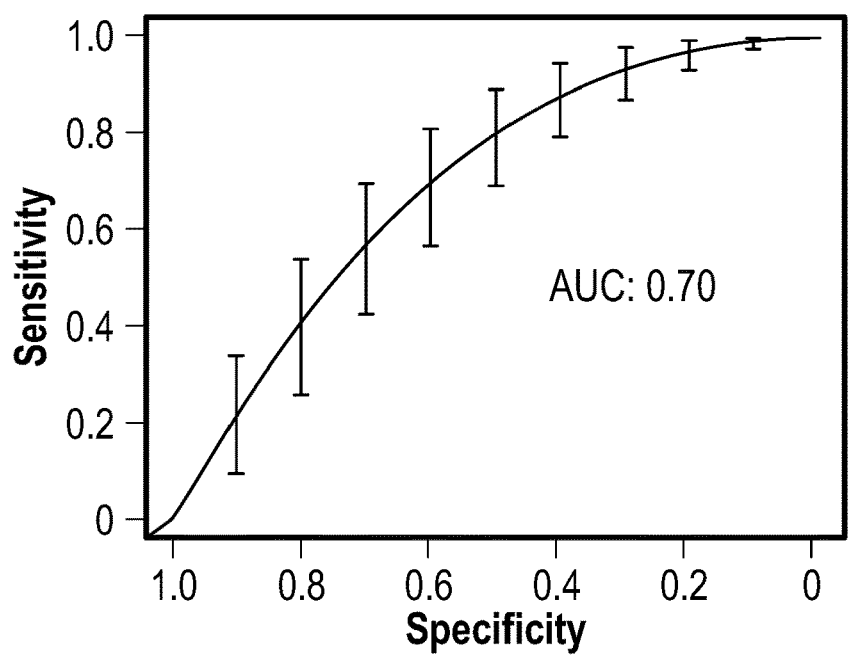
FIG. 14C is a plot of sensitivity and specificity of distance alone in discriminating between 5CC7 and WT T cells (AUC 95%, CI: 0.62-0.74; P<0.00005) in accordance with an illustrative embodiment.

Running a simplified neural network analysis, using single variables as predictors, revealed that minimum distance to DC provided the best discrimination between 5CC7 and WT T cells (FIG. 3a). FIG. 14A is a chart depicting the relative contribution of distance and T cell shape parameters to accuracy as determined using random forest analysis in accordance with an illustrative embodiment. Indeed, simply plotting relative distance to closest DC provided excellent discrimination between WT and 5CC7 T cells with 5CC7 T cells being, on average, much closer to the nearest DC. FIG. 14B depicts cumulative frequency of either 5CC7 or WT T cells as a function of distance from antigen-pulsed DCs ($p<0.005$) in accordance with an illustrative embodiment. The true positive rate (sensitivity) was also plotted versus the false positive rate (1-specificity) to determine how distance performed as a test to discriminate between WT and 5CC7 T cells. FIG. 14C is a plot of sensitivity and specificity of distance alone in discriminating between 5CC7 and WT T cells (AUC 95%, CI: 0.62-0.74; $P<0.00005$) in accordance with an illustrative embodiment. As seen in FIG. 14C, distance provided good discrimination with an area under the curve (AUC) of 0.70.

Figure 14D:
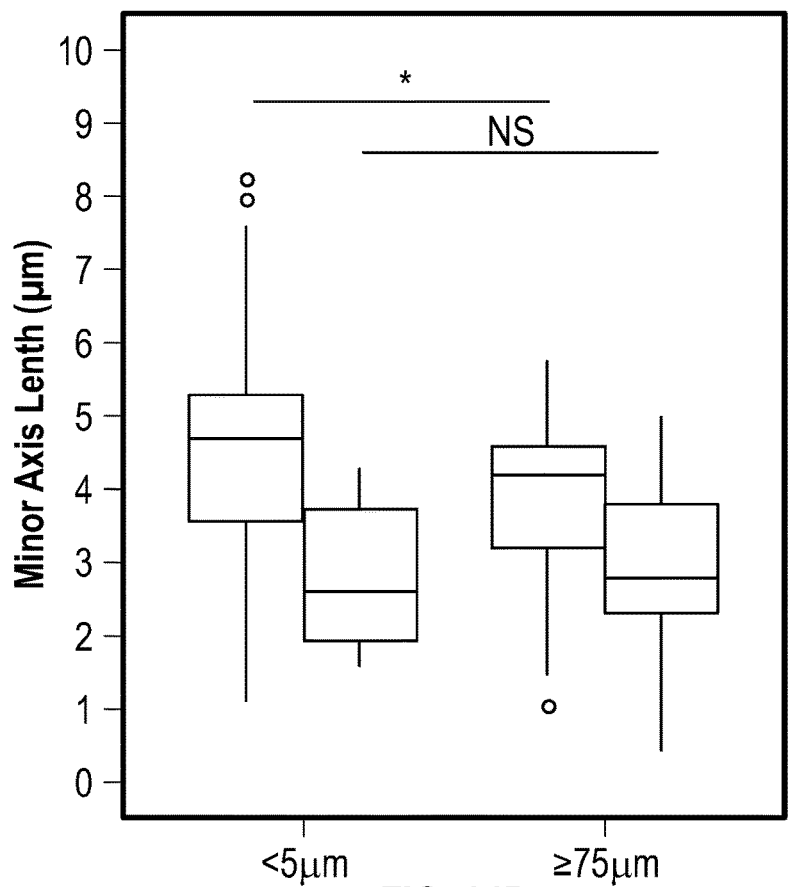
FIG. 14D is a plot of the minor axis for 5CC7 or WT T cells at indicated distances in accordance with an illustrative embodiment.
Figure 14E:
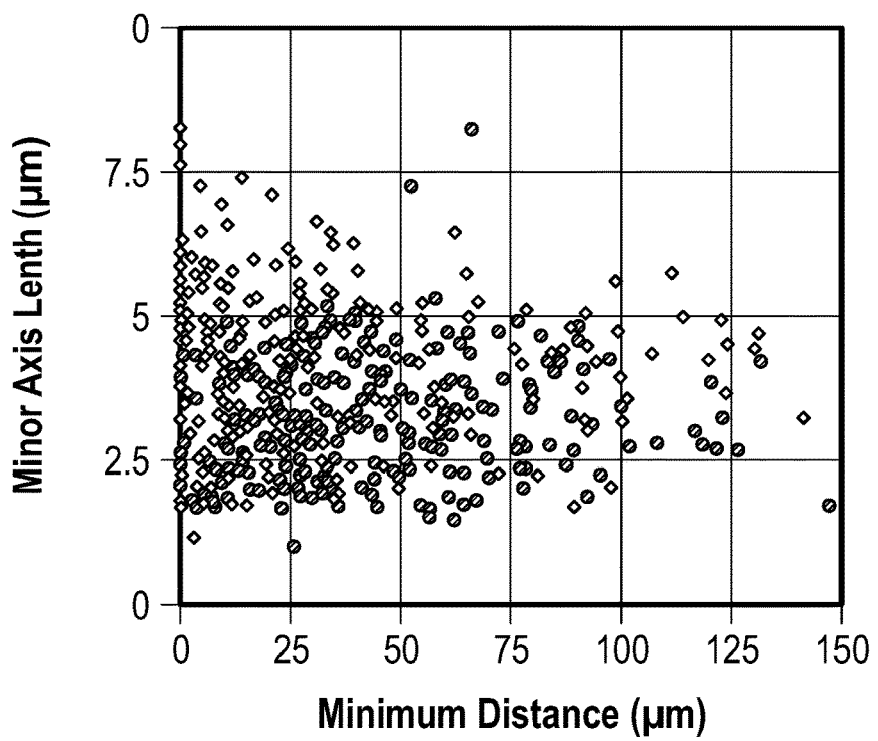
FIG. 14E is a plot of the minor axis for each cell plotted as a function of distance from DC in accordance with an illustrative embodiment.
Figure 14F:
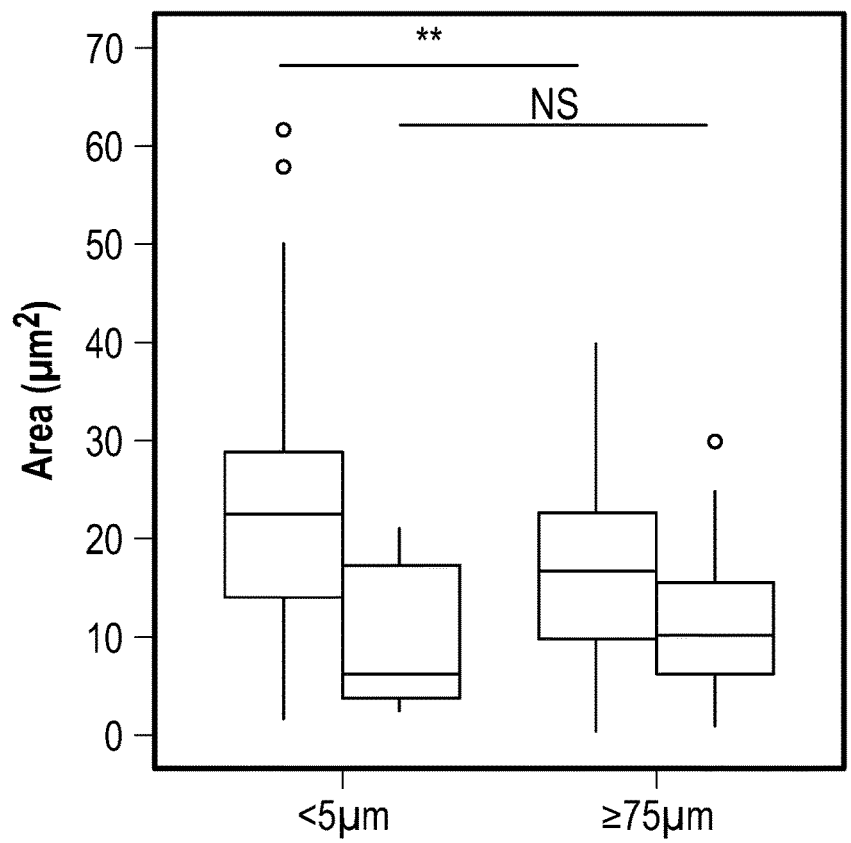
FIG. 14F is a plot of T cell cross-sectional area as an average at the indicated distances in accordance with an illustrative embodiment.
Figure 14G:
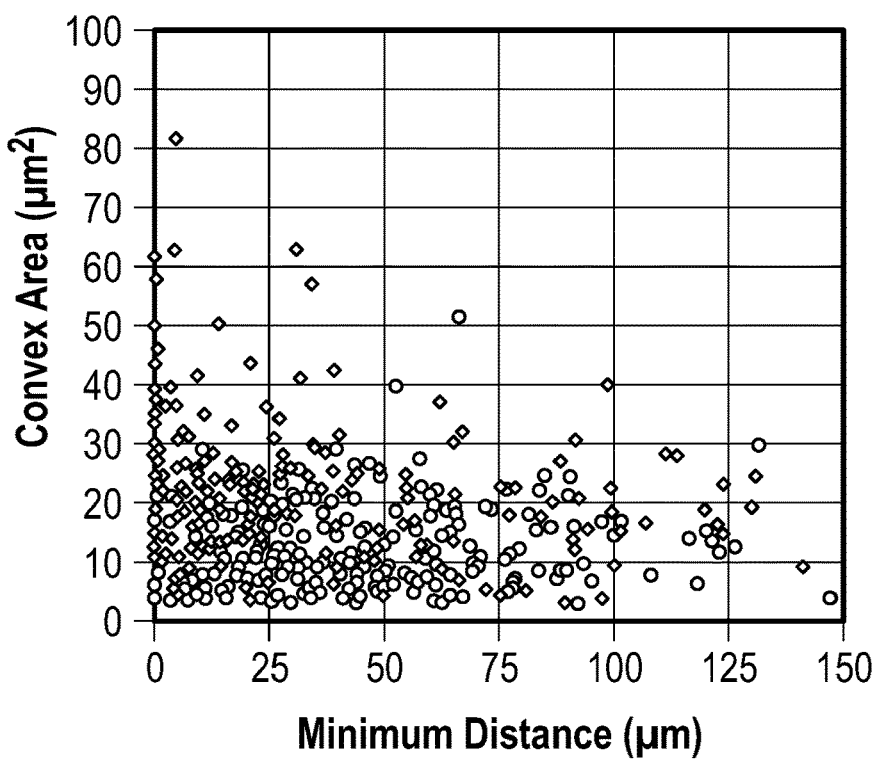
FIG. 14G is a plot of T cell cross-sectional area as an average for each cell as a function of distance in accordance with an illustrative embodiment.

Among the T cell shape variables, minor axis length provided a good basis for discriminating WT from 5CC7 T cells, as shown in FIG. 14A. Comparison of T cell minor axis length at distances of less than 5 µm versus 75 µm or greater from DCs, revealed that 5CC7 T cells had a longer minor axis compared to WT T cells at close distances. FIG. 14D is a plot of the minor axis for 5CC7 or WT T cells at indicated distances in accordance with an illustrative embodiment. FIG. 14E is a plot of the minor axis for each cell plotted as a function of distance from DC in accordance with an illustrative embodiment. Plotting individual cell minor axes as a function of distance as in FIG. 14E reveals that a subpopulation of 5CC7 cells display high values especially when contacting a DC (0 µm). This difference was diminished by 25 µm and largely lost at distances greater than 50 µm. In contrast, the minor axis of WT T cells does not appreciably change as a function of distance from DCs. Plotting T cell cross-sectional area as a function of distance reveals similar results with a subset of 5CC7 T cells having relatively large areas when very close or abutting DCs. FIG. 14F is a plot of T cell cross-sectional area as an average at the indicated distances in accordance with an illustrative embodiment. FIG. 14G is a plot of T cell cross-sectional area as an average for each cell as a function of distance in accordance with an illustrative embodiment. Again, WT T cell area did not significantly change at close DC distances. These data indicate that there were no substantial intrinsic differences between the T cell populations in shape or size. Rather, the antigen specific 5CC7 cells change shape in proximity to antigen-pulsed DCs. These data further indicate that the CDM system can capture changes in T cell shape that occur upon recognition of antigen presented by DCs.

Figure 14H:
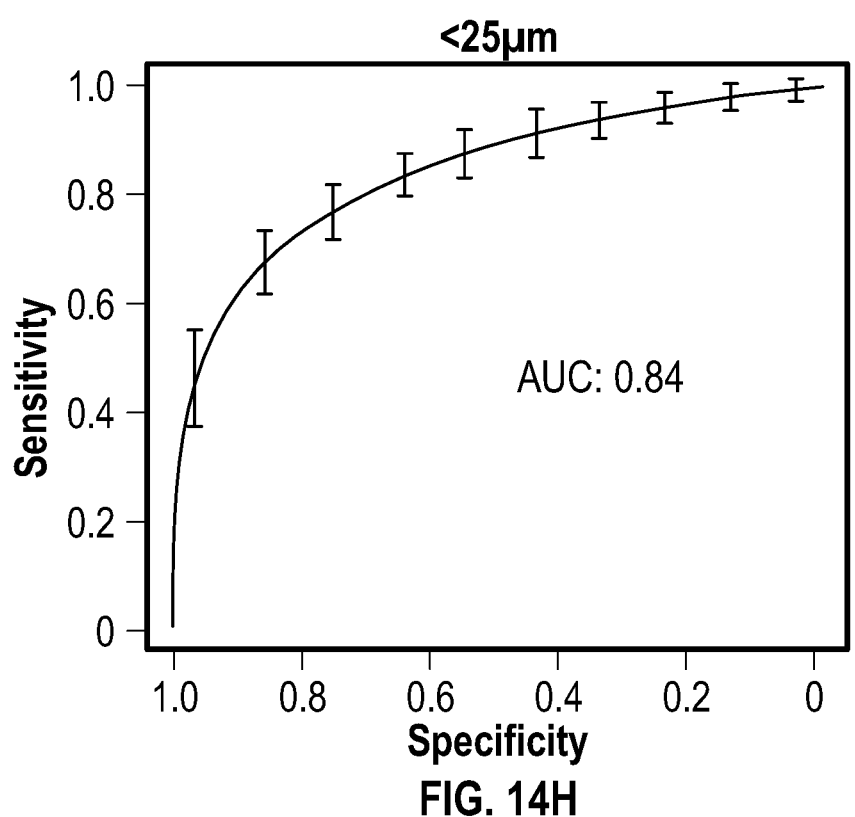
FIG. 14H depicts a plot of sensitivity and specificity of the CDM system for discriminating between 5CC7 and WT T cells (AUC 95% CI: 0.80-0.90, P<0.00005) in accordance with an illustrative embodiment.
Figure 14J:
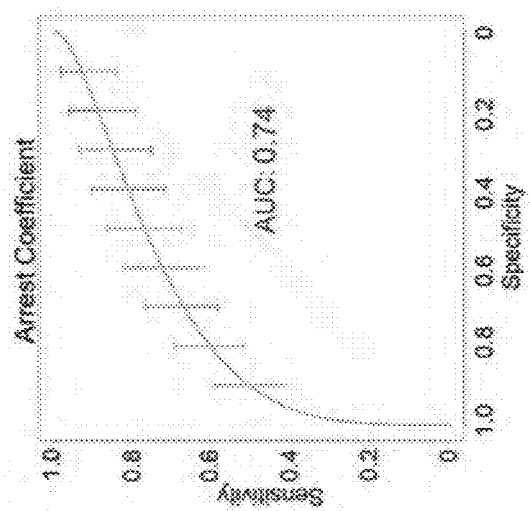
FIG. 14J depicts a plot of sensitivity and specificity of TPEM measures for discriminating between 5CC7 and WT T cells including cellular arrest coefficient (i, AUC 95% CI: 0.72-0.82 P<0.00005) in accordance with an illustrative embodiment.
Figure 14L:
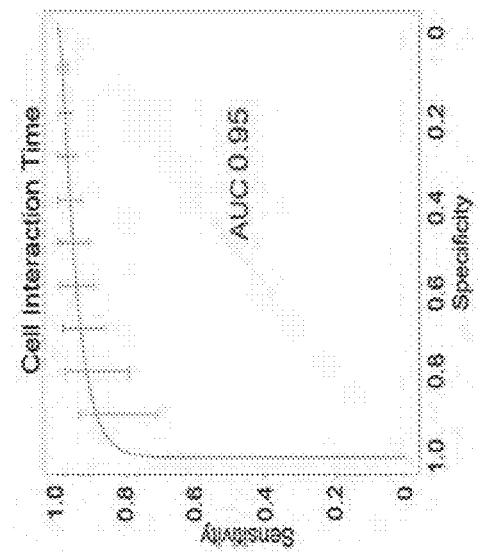
FIG. 14L depicts a plot of sensitivity and specificity of TPEM measures for discriminating between 5CC7 and WT T cells including cellular interaction time (k, AUC 95% CI: 0.94-0.97, P<0.00005). *P<0.05, **P<0.005) in accordance with an illustrative embodiment
Figure 14I:
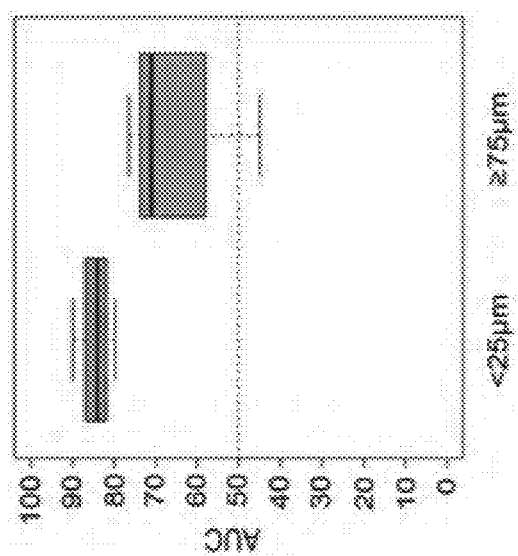
FIG. 14I depicts a plot of the AUC at less than 25 μm and at greater than or equal to 75 μm in accordance with an illustrative embodiment.

Additional testing was performed, by capturing both distance relationships and T cell shape, to demonstrate how the CDM system is able to discriminate between the 5CC7 and WT T cell populations. The analysis was limited to T cell populations within 25 µm of DCs as this was the distance at which substantial differences in T cell shape were observed. Additionally, close distances were examined in an effort to discriminate between T cells that recognize antigen and those that are scanning MHC class II/peptide complexes looking for antigen. FIG. 14H depicts a plot of sensitivity and specificity of the CDM system for discriminating between 5CC7 and WT T cells (AUC 95% CI: 0.80-0.90, $P<0.00005$) in accordance with an illustrative embodiment. FIG. 14I depicts a plot of the AUC at less than 25 µm and at greater than or equal to 75 µm in accordance with an illustrative embodiment. As shown in FIG. 14H-I, the full CDM system output, which integrates distance and T cell shape variables, provides an AUC of 0.84 which is substantially better than distance alone for all measurements. In contrast, at distances of greater than 25 µm, the two T cell populations were indistinguishable (AUC=0.71, 95% confidence interval: 0.45-0.76). Within 25 µm, distance alone could discriminate between 5CC7 and WT cells. However, differences between populations were less robust (AUC=0.65, 95% CI: 0.59-0.72). These data indicate that the CDM system, by combining measurements of both cell distance and T cell shape, provides excellent discrimination between T cell populations that are scanning for antigen versus those that have recognized antigen.

Figure 14K:
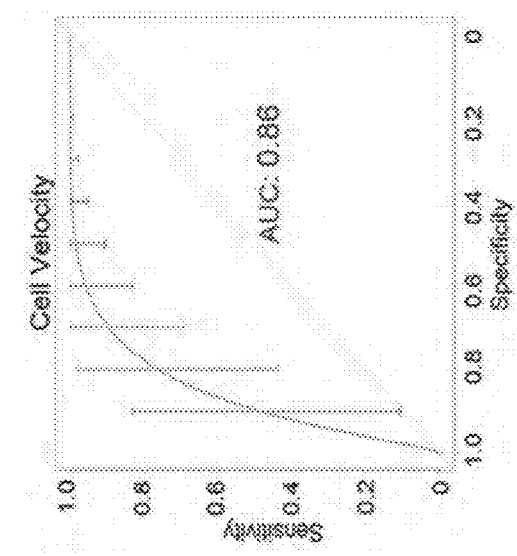
FIG. 14K depicts a plot of sensitivity and specificity of TPEM measures for discriminating between 5CC7 and WT T cells including cellular velocity (AUC 95% CI: 0.78-0.90, P<0.00005) in accordance with an illustrative embodiment.

Additional analysis was performed to determine how well measures obtained by TPEM discriminated between 5CC7 and WT cells interacting with antigen pulsed DCs. Specifically, the TPEM outputs described with reference to FIGS. 8-9 were taken and subjected to the same statistical modeling by plotting their true positive rate versus false positive rate. FIG. 14J depicts a plot of sensitivity and specificity of TPEM measures for discriminating between 5CC7 and WT T cells including cellular arrest coefficient (i, AUC 95% CI: 0.72-0.82 $P<0.00005$) in accordance with an illustrative embodiment. As can be seen in FIG. 14J, the arrest coefficient provided good discrimination with an AUC of 0.74. FIG. 14K depicts a plot of sensitivity and specificity of TPEM measures for discriminating between 5CC7 and WT T cells including cellular velocity (AUC 95% CI: 0.78-0.90, $P<0.00005$) in accordance with an illustrative embodiment. Cell velocity was more robust with an AUC of 0.86. FIG. 14L depicts a plot of sensitivity and specificity of TPEM measures for discriminating between 5CC7 and WT T cells including cellular interaction time (k, AUC 95% CI: 0.94-0.97, $P<0.00005$). *$P<0.05$, **$P<0.005$) in accordance with an illustrative embodiment. Only cell interaction time, with an AUC of 0.95 outperformed the CDM system. These data indicate that the CDM system performs as well as many TPEM measures in identifying antigen-specific T cell interactions with DCs.

Figure 15B:
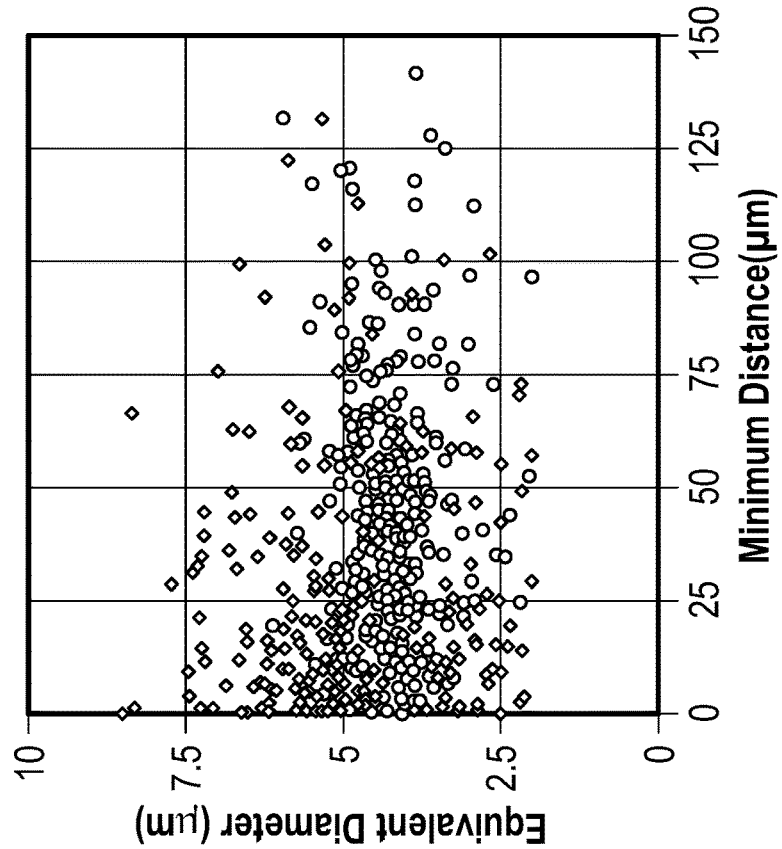
FIG. 15B is a plot of 5CC7 and WT T cell equivalent diameter as a function of minimum distance from antigen-pulsed DCs in accordance with an illustrative embodiment.
Figure 15A:
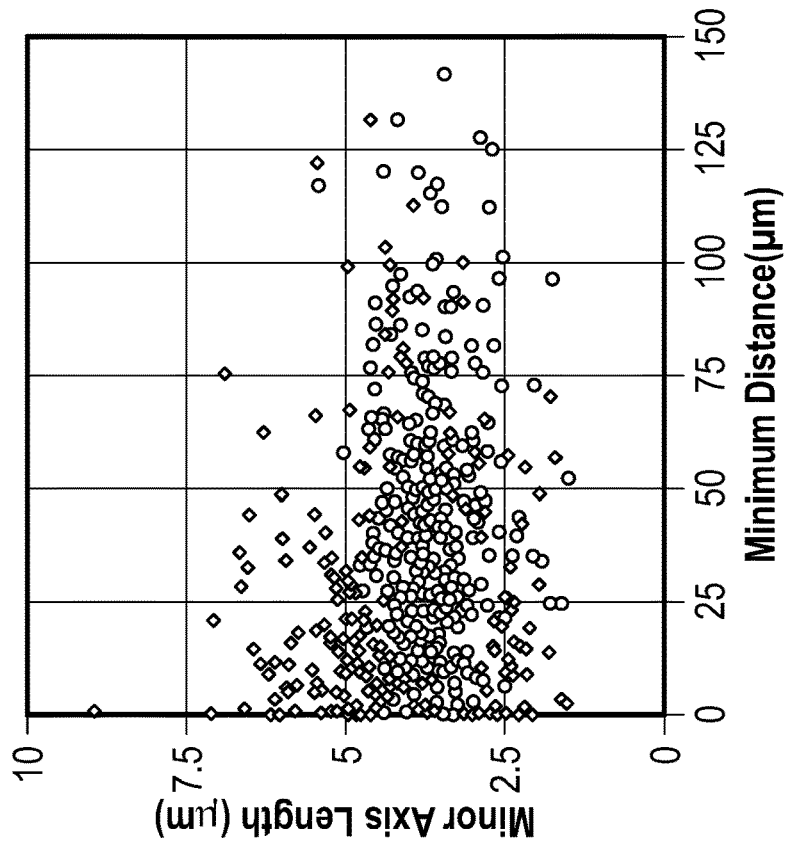
FIG. 15A is a plot of 5CC7 and WT T cell nuclear minor axis as a function of minimum distance from antigen-pulsed DCs in accordance with an illustrative embodiment.
Figure 15D:
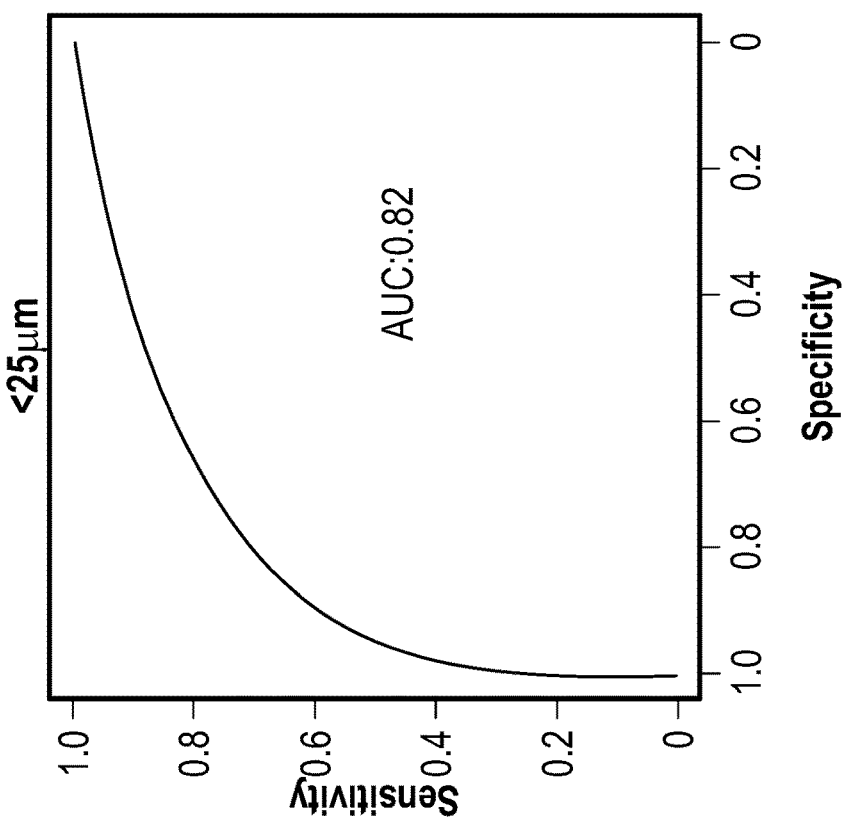
FIG. 15D is a curve denoting sensitivity and specificity of the CDM system for discriminating between 5CC7 versus WT cell nuclei at distances ≤25 μm (AUC 95% CI: 0.77-0.91, P<0.005) in accordance with an illustrative embodiment.
Figure 15C:
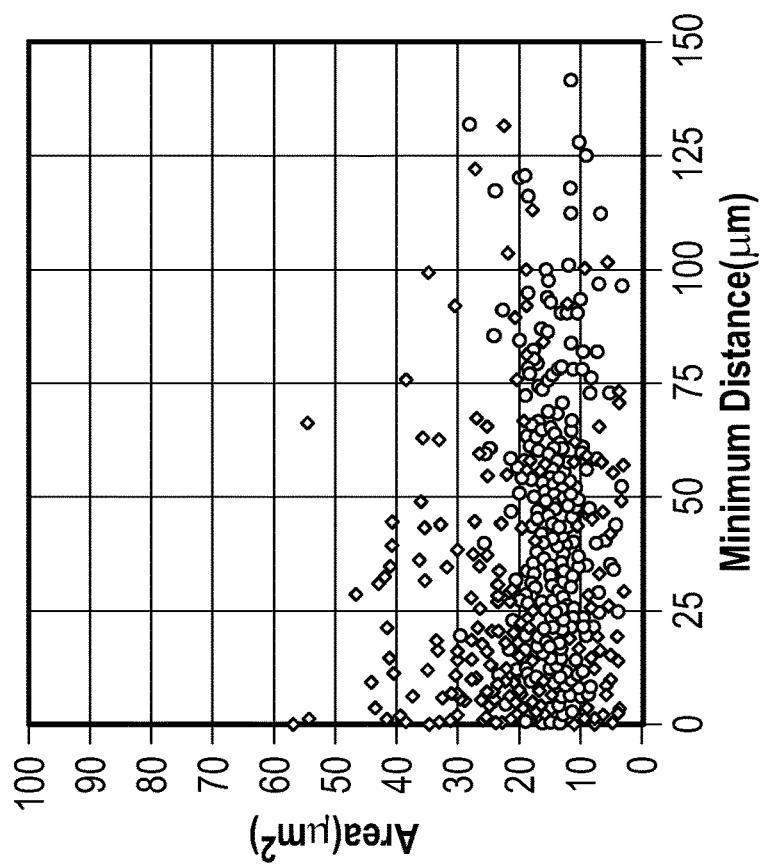
FIG. 15C is a plot of 5CC7 and WT T cell nuclear area as a function of minimum distance from antigen-pulsed DCs in accordance with an illustrative embodiment.

The CDM system was also applied to multichannel confocal images of human tissue. As known to those of skill in the art, immunofluorescence with antibodies to surface markers is often inadequate for identifying the exact boundaries of lymphocytes in dense infiltrates. In the original studies using the CDM system, nuclear stains were used to define lymphocyte position. As the nucleus constitutes the majority of a lymphocyte's volume, it was postulated that nuclear shape would approximate cell shape. Therefore, 5CC7 and WT T cell nuclei were segmented and analyzed using the CDM system. Analysis of individual shape parameters revealed similar relationships between 5CC7 and WT nuclear shape and distance to closest DCs. FIG. 15A is a plot of 5CC7 and WT T cell nuclear minor axis as a function of minimum distance from antigen-pulsed DCs in accordance with an illustrative embodiment. FIG. 15B is a plot of 5CC7 and WT T cell equivalent diameter as a function of minimum distance from antigen-pulsed DCs in accordance with an illustrative embodiment. FIG. 15C is a plot of 5CC7 and WT T cell nuclear area as a function of minimum distance from antigen-pulsed DCs in accordance with an illustrative embodiment. Furthermore, application of the composite distance and T cell nuclear shape scores revealed similar discrimination between 5CC7 and WT interactions with DCs as did use of T cell shape. FIG. 15D is a curve denoting sensitivity and specificity of the CDM system for discriminating between 5CC7 versus WT cell nuclei at distances ≤25 μm (AUC 95% CI: 0.77-0.91, P<0.005) in accordance with an illustrative embodiment. At distances greater than 25 μm, the two T cell nuclei populations were indistinguishable (AUC=0.52, 95% CI: 0.45-0.72). These data indicate that nuclear shape can be used to approximate T cell shape for the purpose of discriminating cognate from non-cognate T cell:DC interactions.

In a further effort to validate the mouse experiments, the above-described mouse transfer experiment was repeated to obtain 233 ROIs. On these images, DC and T cell nuclei were subjected to segmentation and analysis using the CDM system. These data revealed similar discrimination as before between 5CC7 and WT T cell nuclei. At less than 25 μm from DCs the AUC was 0.82 and 95% CI was 0.72 to 0.87. Likewise, at greater than 25 μm, the two T cell nuclei populations were similar (AUC=0.57, 95% CI: 0.45-0.58).

Additional testing was performed in an effort to understand the relationships between DCs and T cells in human tissue. Specifically, the relative abilities of myeloid DCs (mDCs) and plasmacytoid DCs (pDCs) to present antigen to T cells in lupus tubulointerstitial nephritis (TII) were examined. Conventionally, mDCs are considered a professional APC11,12, while the function of pDCs is thought to be the secretion of interferon alpha and other cytokines13. However, it is known that pDCs can present antigen to CD4+ T cells under some circumstances.

Single longitudinal sections were captured by either tiling HPFs across the entire renal biopsy (n=10 biopsies) or by capturing those HPFs with at least one mDC or pDC (n=12 biopsies). A total of 243 ROIs, from a total data set of 687 ROIs, were manually segmented and used for training the DCNN as discussed above. FIG. 16 is a table depicting a summary of the human data sets used to test the CDM system in accordance with an illustrative embodiment.

Figure 17A:
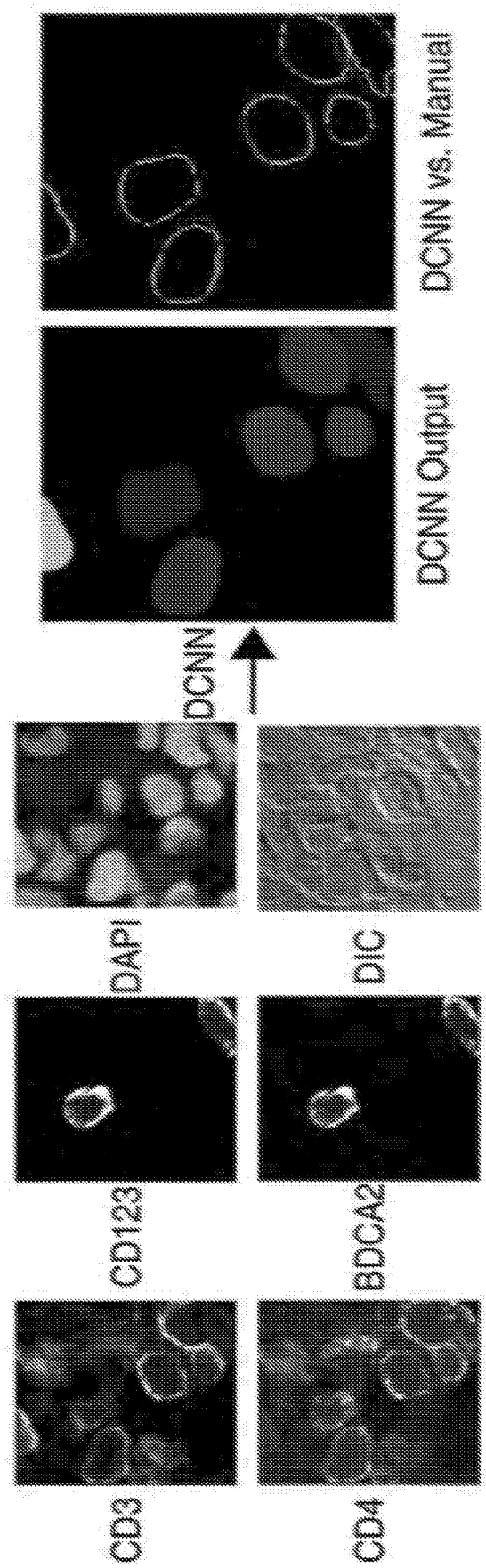
FIG. 17A is a depiction of raw input images, the output from the DCNN, and a comparison of object segmentation using DCNN versus manual in accordance with an illustrative embodiment.

FIG. 17A is a depiction of raw input images, the output from the DCNN, and a comparison of object segmentation using DCNN versus manual in accordance with an illustrative embodiment. Utilizing a similar framework as described for the murine model, six input channels are processed through the DCNN with an output of solid objects (middle panel) for CD4+CD3+ T cells, CD4+CD3− T cells, and plasmacytoid DCs. At right in FIG. 17A, DCNN segmentations are shown in colored lines and the corresponding manual segmentations shown in white lines. Overall, there was an excellent agreement between the cross-validated DCNN and the manual segmentation with a sensitivity of 0.72 and a specificity of 0.86 and a IOU of 0.7. In an illustrative embodiment, the DCNN output for pDCs and CD4+ T cell nuclei can be used to generate DC outlines and T cell nuclear edges for use in calculating minimum distances. Objects that could be categorically assigned with 90% or greater confidence were used for the subsequent analysis.

Figure 17C:
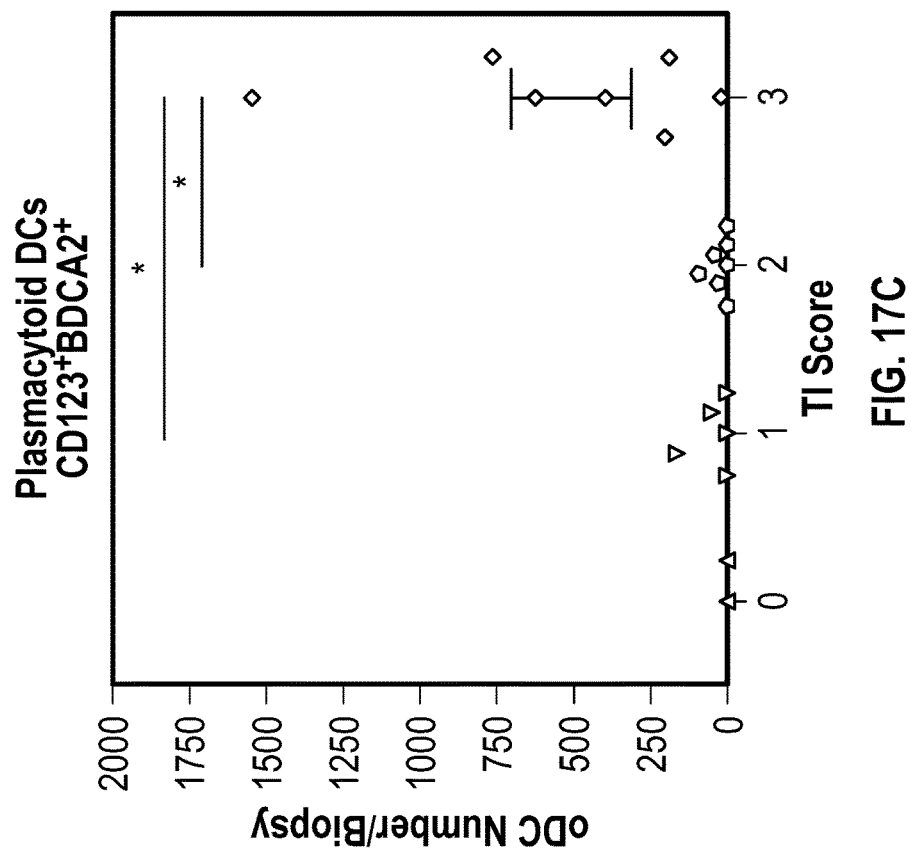
FIG. 17C depicts a plot of frequency of pDCs per biopsy by TII grade (0=none, 1=mild, 2=moderate, 3=severe) in accordance with an illustrative embodiment.
Figure 17B:
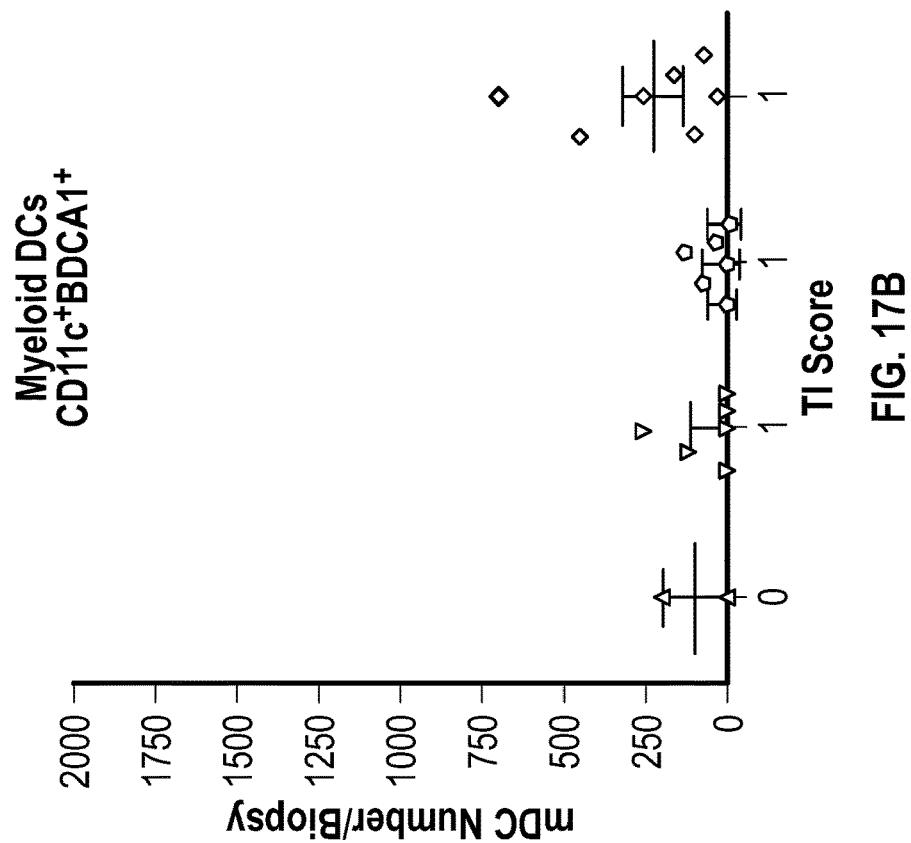
FIG. 17B depicts a plot of frequency of mDCs per biopsy by TII grade (0=none, 1=mild, 2=moderate, 3=severe) in accordance with an illustrative embodiment.

Twenty-five lupus nephritis biopsies, scored for degree of TII (scale: 0-3), were stained with antibodies specific for CD11c, BDCA1, BDCA2, CD123, CD3, CD4 and DAPI. In individual longitudinal biopsy sections, the numbers of mDCs (CD11c+BDCA1+) and pDCs (CD123+BDCA2+) cells were determined using the CDM system. Myeloid DCs were present in all degrees of TII with no statistically significant differences among the groups. In contrast, the majority of pDCs occurred in severe (grade 3) TII (p<0.05). FIG. 17B depicts a plot of frequency of mDCs per biopsy by TII grade (0=none, 1=mild, 2=moderate, 3=severe) in accordance with an illustrative embodiment. FIG. 17C depicts a plot of frequency of pDCs per biopsy by TII grade (0=none, 1=mild, 2=moderate, 3=severe) in accordance with an illustrative embodiment. Surprisingly, CD4+ T cells appeared more frequent around pDCs than mDCs. However, the number of CD4+ T cells per either DC population was similar. FIG. 18 is a table depicting a summary of lupus nephritis biopsies used for training and analysis in accordance with an illustrative embodiment. These data indicate that pDCs are more common than mDCs in severe TII and are associated with a proportional increase in local T cell infiltrates.

Figure 17D:
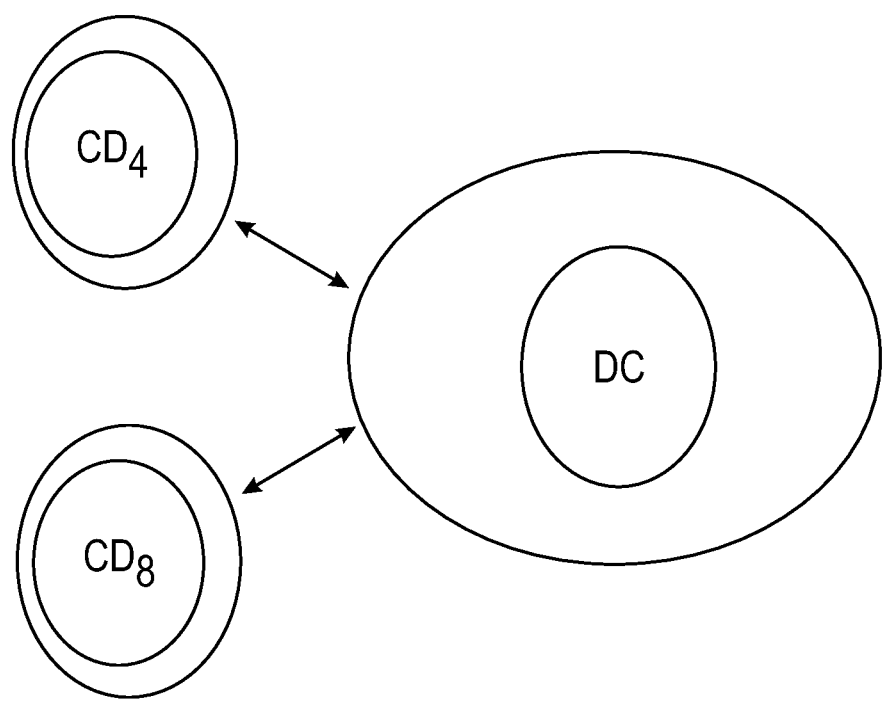
FIG. 17D is a schematic comparison of CD4+CD3+ to CD4-CD3+ T cells relative to DCs in accordance with an illustrative embodiment.
Figure 17E:
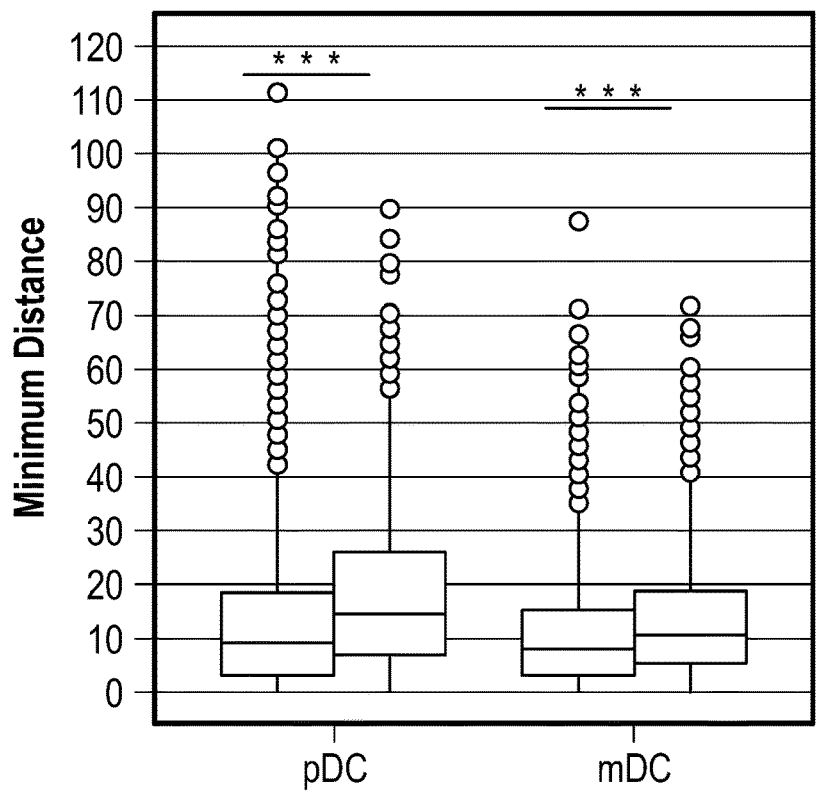
FIG. 17E depicts minimum distances between indicated DC populations and CD4+ and CD4- T cells in accordance with an illustrative embodiment.
Figure 17F:
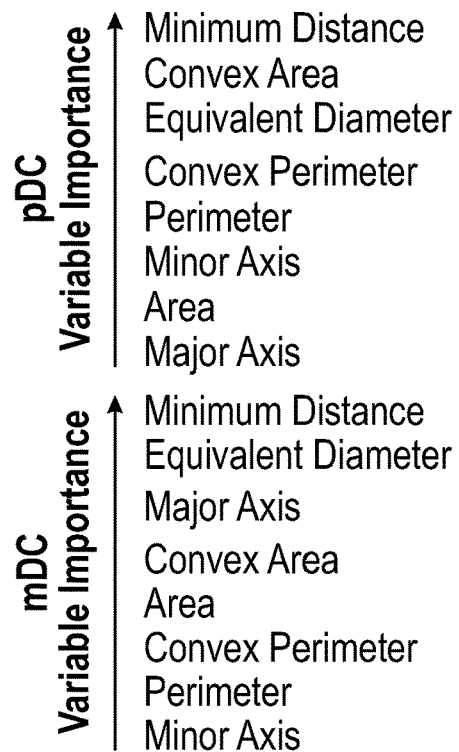
FIG. 17F depicts the relative contribution of distance and T cell shape parameters to accuracy based on random forest analysis of pDC and mDC data sets in accordance with an illustrative embodiment.

Both pDCs and mDCs could be just co-segregated with T cells in areas of active inflammation or they could be contributing to inflammation by locally presenting antigen to CD4+ T cells. To discriminate between these two possibilities, the distance and shape characteristics of CD4+ T cells were analyzed relative to each DC population in biopsies with severe TII (n=8). Local CD4−CD3+ T cells provide a non-MHC class II restricted control T cell population. FIG. 17D is a schematic comparison of CD4+CD3+ to CD4−CD3+ T cells relative to DCs in accordance with an illustrative embodiment. Analysis of relative distances revealed that CD4+CD3+ T cells were, on average, closer to both pDCs and mDCs than CD4−CD3+ T cells. FIG. 17E depicts minimum distances between indicated DC populations and CD4+ and CD4− T cells in accordance with an illustrative embodiment. Analysis of T cell shape revealed significant differences between CD4+CD3+ and CD4−CD3+ cells relative to each DC population with different measures of T cell shape making differential contributions to accuracy relative to either pDCs or mDCs. FIG. 17F depicts the relative contribution of distance and T cell shape parameters to accuracy based on random forest analysis of pDC and mDC data sets in accordance with an illustrative embodiment.

Figure 17H:
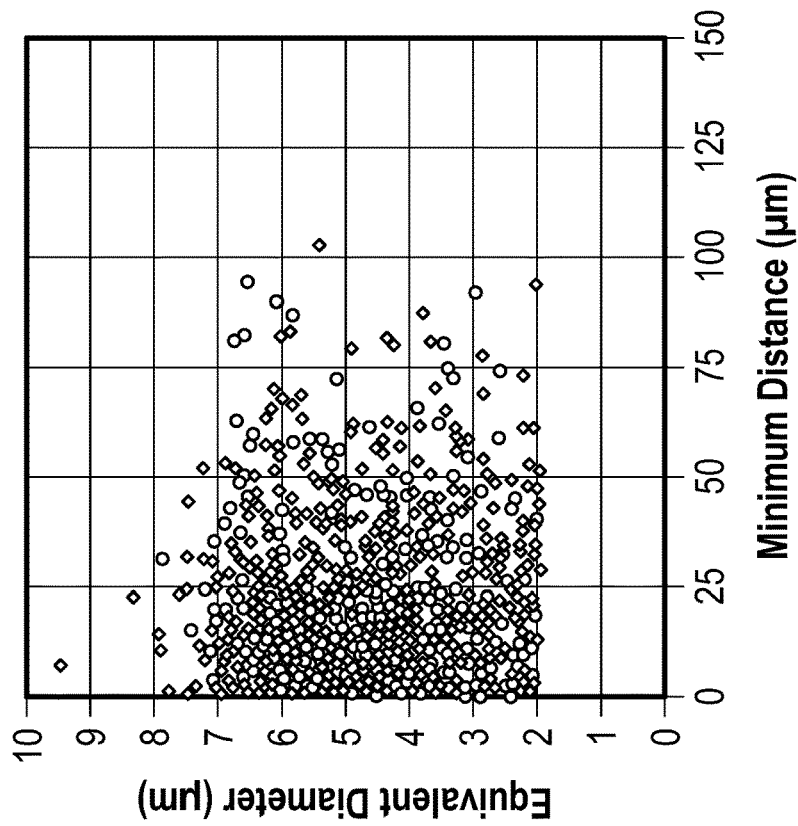
FIG. 17H is a plot of equivalent diameter per T cell (CD4+, CD4-) as a function of distance from pDCs (both P<0.0005 all distances) in accordance with an illustrative embodiment.
Figure 17G:
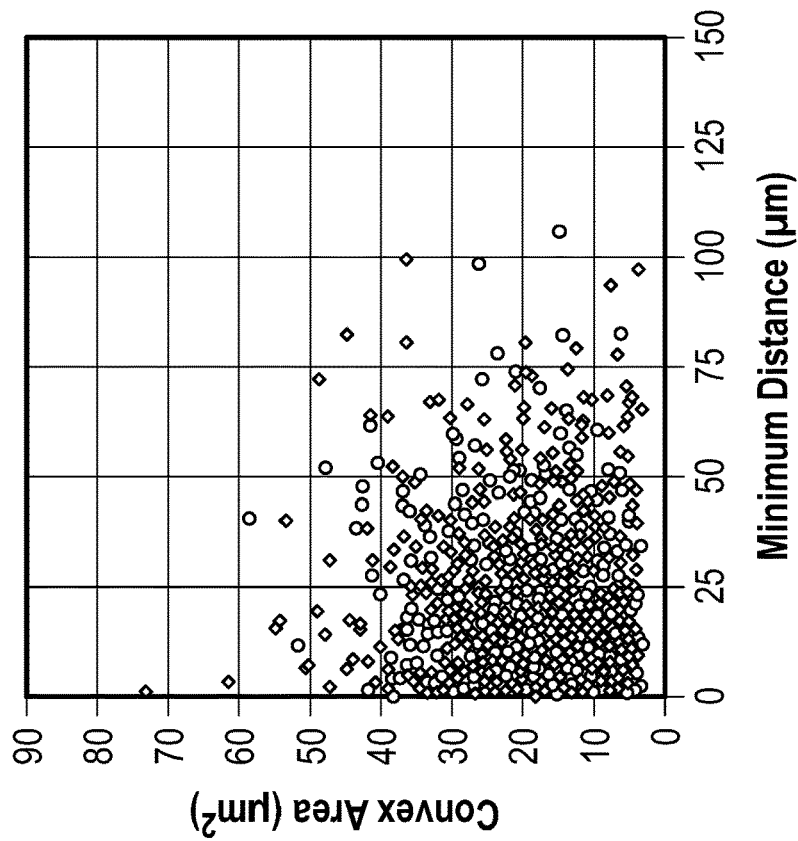
FIG. 17G is a plot of convex area per T cell (CD4+, CD4-) as a function of distance from pDCs (both P<0.0005 all distances) in accordance with an illustrative embodiment.
Figure 17J:
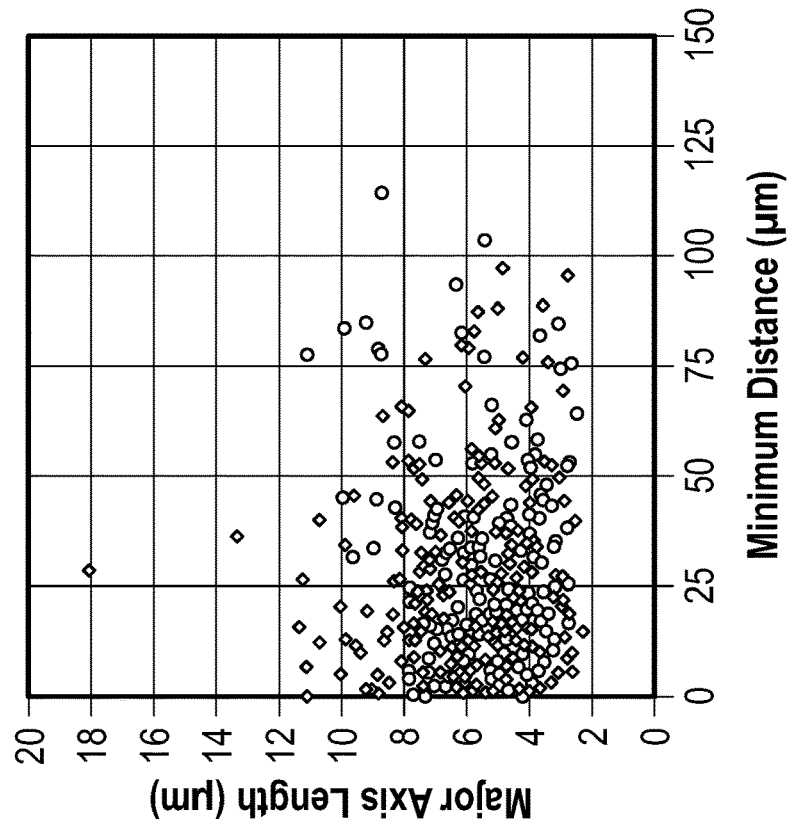
FIG. 17J depicts a plot of major axis (1, P<0.005) per T cell as a function of distance from mDCs in accordance with an illustrative embodiment
Figure 17I:
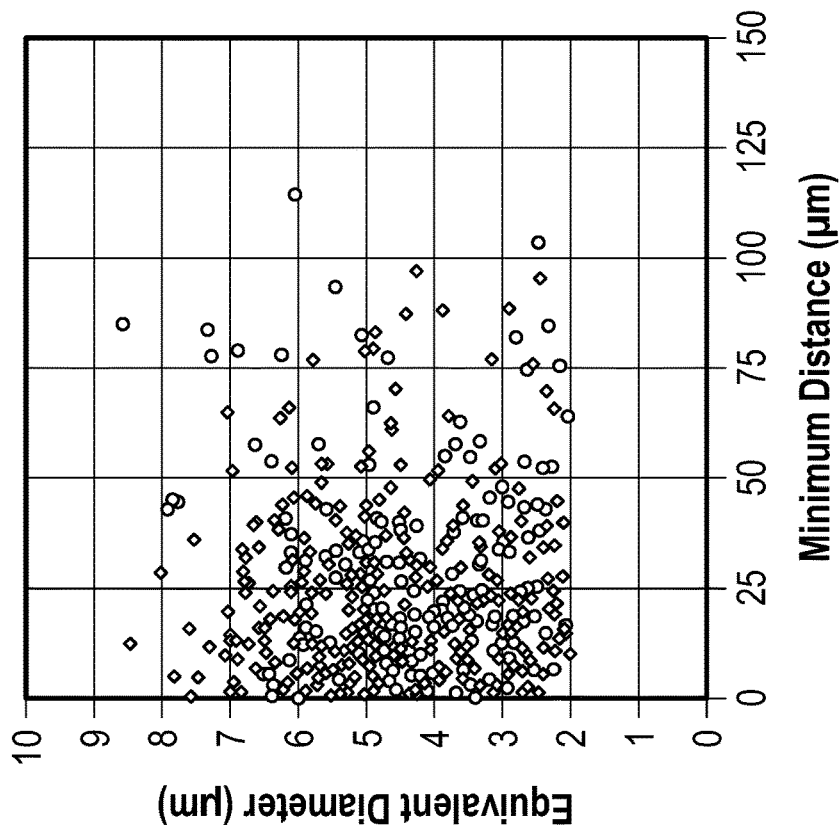
FIG. 17I depicts a plot of equivalent diameter (k, P<0.05) per T cell as a function of distance from mDCs in accordance with an illustrative embodiment.

FIG. 17G is a plot of convex area per T cell (CD4+, CD4−) as a function of distance from pDCs (both P<0.0005 all distances) in accordance with an illustrative embodiment. FIG. 17H is a plot of equivalent diameter per T cell (CD4+, CD4−) as a function of distance from pDCs (both P<0.0005 all distances) in accordance with an illustrative embodiment. Examination of both convex area (FIG. 17G) and equivalent diameter (FIG. 17H) as a function distance to pDCs confirmed CD4+CD3+ cells tended to aggregate around pDCs and, as observed in murine experiments, both T cell shape parameters tend to be larger at close distances. Similar trends were observed for T cell equivalent diameter and major axis relative to mDCs. FIG. 17I depicts a plot of equivalent diameter (k, P<0.05) per T cell as a function of distance from mDCs in accordance with an illustrative embodiment. FIG. 17J depicts a plot of major axis (1, P<0.005) per T cell as a function of distance from mDCs in accordance with an illustrative embodiment. In FIGS. 17G-17J, a random 10% of total values were plotted for visualization.

Figure 17K:
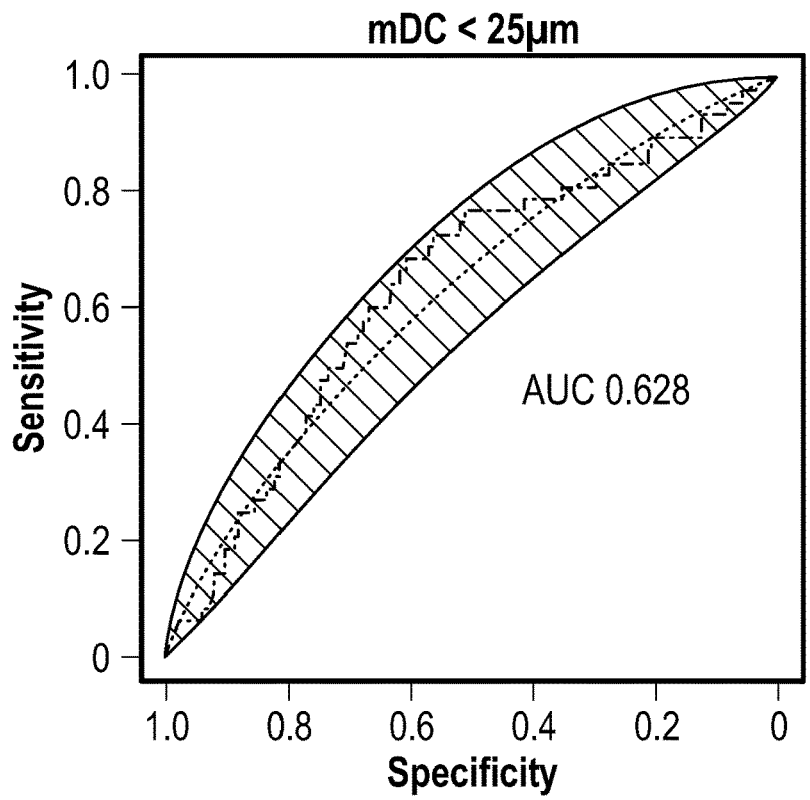
FIG. 17K depicts sensitivity and specificity of the CDM system for discriminating between CD4+CD3+ and CD4+ CD3- cells for mDC (n, 95% CI: 0.55-0.71) datasets at a minimum distance cutoff of ≤25 μm in accordance with an illustrative embodiment.
Figure 17L:
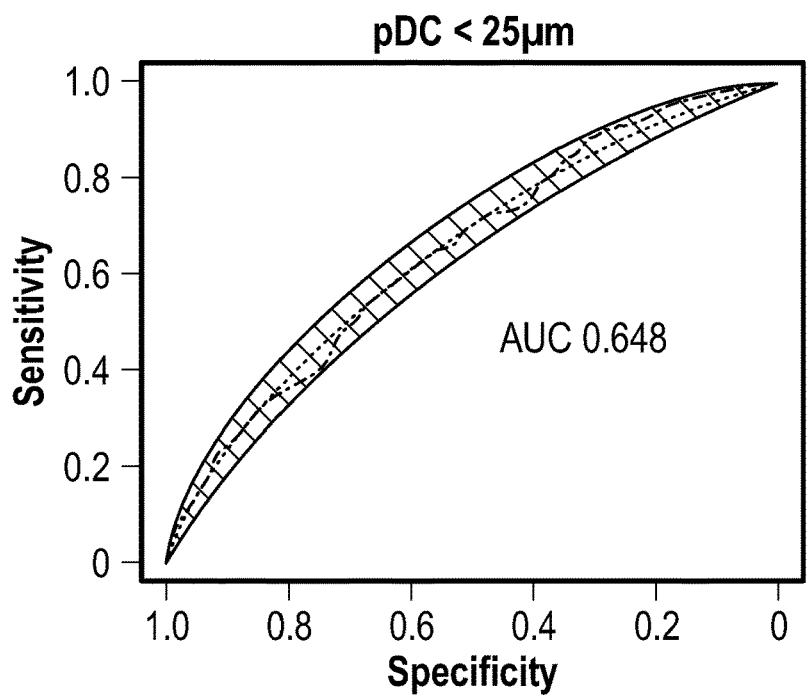
FIG. 17L depicts sensitivity and specificity of the CDM system for discriminating between CD4+CD3+ and CD4+ CD3- cells for pDC (95% CI: 0.61-0.69) datasets at a minimum distance cutoff of ≤25 μm in accordance with an illustrative embodiment.

In contrast, CD4−CD3+ cell shape did not change as a function of distance from either DC population. Plotting the composite CDM output of distance and T cell shape revealed clear discrimination between CD4+CD3+ and CD4−CD3+ T cells within 25 μm for both mDCs (FIG. 17K, AUC=0.63) and pDCs (FIG. 17L, AUC=0.65). FIG. 17K depicts sensitivity and specificity of the CDM system for discriminating between CD4+CD3+ and CD4+CD3− cells for mDC (n, 95% CI: 0.55-0.71) datasets at a minimum distance cutoff of ≤25 μm in accordance with an illustrative embodiment. FIG. 17L depicts sensitivity and specificity of the CDM system for discriminating between CD4+CD3+ and CD4+CD3− cells for pDC (m, 95% CI: 0.61-0.69) datasets at a minimum distance cutoff of ≤25 μm in accordance with an illustrative embodiment. These data are consistent with distance and T cell shape relationships observed in murine cells and suggest that, on a per cell basis, both mDCs and pDCs present antigen to CD4+ T cells. However, as there are more pDCs than mDCs in severe TII, the data suggest that pDCs make a larger contribution to in situ CD4+ T cell activation.

It was also determined using the CDM system that pDCs were an important APC in vivo. Therefore, lupus TII biopsies were stained with antibodies specific for CD3, CD4, CD43, BDCA2, the microtubule organizing center (mTOC) as well as DAPI. Three dimensional confocal imaging was then performed on representative T cell:pDC conjugates. Based on this imaging, it was determined that there is polarization of TCR CD3 towards the interface with the pDC. Likewise, the T cell mTOC is oriented towards the interface with the pDC. In contrast, CD43 is accumulated at the distal pole complex, which is consistent with a canonical, mature T cell:APC synapse. Therefore, both the CDM system and imaging data indicate that in lupus TII, pDCs commonly present antigen to CD4+ T cells.

In a direct comparison in mice, the CDM system demonstrated comparable sensitivity and specificity to most TPEM measures in discriminating cognate from non-cognate T cell:DC interactions. Furthermore, the CDM system offers several advantages. It provides higher throughput, which enables larger sample sizes and robust statistical confidence. It does not require experimental manipulations to label cells and, therefore, can be performed on native systems, minimizing experimental artifact. The CDM system can be used on any tissue, at any depth, and therefore circumvents the imaging limitations of TPEM.

A major advantage of the CDM system is that it can be performed on single sections from frozen tissue. Therefore, it is ideally suited to human studies and can be applied to biopsies that are routinely obtained as part of clinical care. In lupus nephritis, the CDM system was used to identify putative in situ cognate T cell:DC interactions and furthermore, assign relative importance of different DC populations in presenting antigen to CD4+ T cells. Overall sensitivities and specificities in human disease were less than those observed in the transgenic murine system. This could reflect inherent differences in the imaging approaches used in mice and humans. More likely, the lower signal observed in human disease reflects underlying heterogeneity in the cells and antigens driving in situ adaptive immunity. However, by capturing more events than is practical with TPEM, the CDM system was able to overcome this heterogeneity and provide data that enabled statistically robust conclusions.

The above-discussed studies were limited to single plane confocal images and simple pair-wise cell:cell interactions. However, the CDM system is also adaptable to three dimensional images that would provide more definitive measures of in situ APC function. Furthermore, the general approach illustrated by the CDM system is applicable to the study of complex cellular networks containing three or more cell types. A quantitative understanding of the cellular architectures of in situ adaptive immunity and inflammation in human disease will provide new insights into the pathogenic mechanisms of autoimmunity and features of immunity effective against cancer.

In an illustrative embodiment, the methods described herein may be performed at least in part by a computing device. In addition, any of the operations described herein may be implemented as computer-readable instructions stored on a tangible computer-readable medium such as a memory. Upon execution of the computer-readable instructions by a processor, the operations described herein are carried out.

Figure 19:
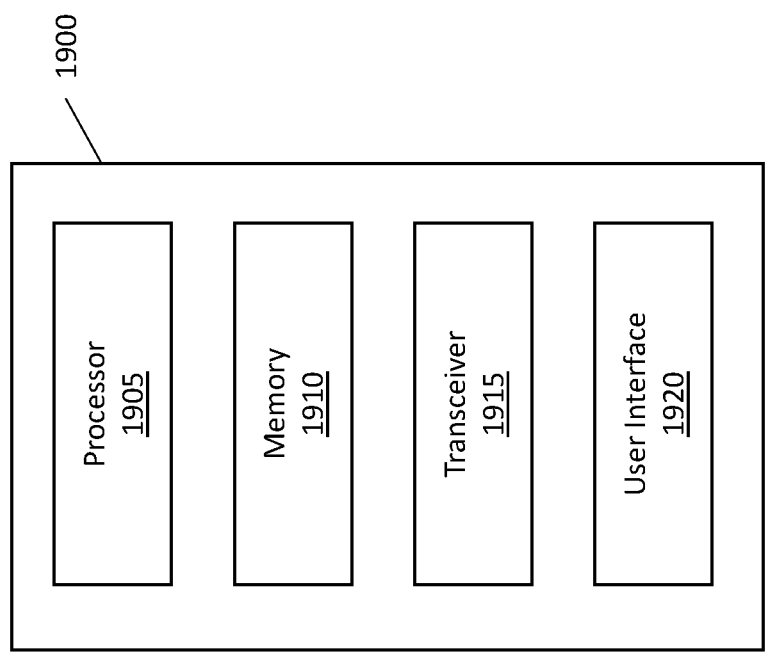
FIG. 19 is a block diagram depicting a computing device in accordance with an illustrative embodiment.

FIG. 19 is a block diagram depicting a computing device 1900 in accordance with an illustrative embodiment. The computing device 1900 includes a processor 1905, a memory 1910, a transceiver 1915, and a user interface 1920. In alternative embodiments, the computing device 1900 may include fewer, additional, and/or different components. The memory 1910 is used to store information, such as instructions to perform operations described herein, research data, computer applications, etc. The processor 1905 is in communication with the memory 1910 and is configured to execute instructions and applications stored in the memory 1910.

The processor 1905 is also in communication with the transceiver 1915, which is used to receive/transmit data. For example, the transceiver 1915 can receive images from imaging machines and, once processed, transmit data regarding the processed images. The transceiver can also be used to communicate with other computing devices, databases, etc. The user interface 1920 is also in communication with the processor, and can include a display, mouse, keyboard, and/or any other component that allows a user to interact with the computing device 1900.

More detailed information regarding the testing methods used to conduct the above-referenced tests and analyses is included below. Specifically, the subsections below describe various techniques performed to conduct adoptive transfer, imaging of mouse tissue, renal biopsy staining, the deep convolutional neural network (DCNN), data analysis and model comparison, and the tuned convolutional neural network (TNN) generation. In alternative embodiments, different methods and techniques may be used.

Adoptive Transfer

Dendritic cells were purified from mouse spleens using anti-CD11c beads. Purified dendritic cells were activated in vitro with LPS (1 ug/ml) and pulsed with pigeon cytochrome C peptide (sequence corresponding to amino acids 88-104) for 4 hours at 37° C. Activated DCs were labeled with Cell Tracker Blue (CMF2HC, Invitrogen) then injected (1 million per recipient) into the right rear footpad of recipient mice. Polyclonal and 5CC7 TCR transgenic T cells were isolated from the lymph nodes of B10.A CD45.2− and B10.A CD45.2+5CC7 TCR-transgenic Rag2−/− mice, respectively, and purified using a CD4+ T cell isolation kit. Polyclonal T cells were then labeled with Cell Tracker Green (CMFDA, Invitrogen) and 5CC7 T cells with Cell Tracker Red (CMTPX, Invitrogen). Two million of each T cell population were then co-injected intravenously into recipient mice 18 hours post transfer of DCs. Twelve hours post T cell transfer, mice were euthanized and draining popliteal lymph nodes were isolated, cured overnight in 30% sucrose, and frozen at −80° C. The tissue was subsequently sectioned at 5 μm thickness and prepared for confocal microscopy.

Imaging of Mouse Tissue

Mouse tissue sections were prepared and stained with TO-PRO-3 Iodide (Invitrogen) to visualize nuclei and avoid interference with the fluorescence spectrum of transferred cell trackers. Single fluorochrome controls were utilized to ensure no cross-bleeding was present in between fluorescent channels. Images were acquired at 12 bit depth, 1024×1024 pixel size, at 400× and 630× magnifications utilizing either a SP5 Tandem Scanner Spectral 2-photon confocal microscope or the SP8 3D 3-color STED laser scanning confocal microscope with time gating. Regions of interest (ROIs), containing all three transferred cell populations were selected for acquisition. Raw images were stored in manufacturer-specified file format, and the files were converted to multi-channel .tif images and used as input for DCNN analysis.

Renal Biopsy Staining

One of the studies performed used a total of 25 renal biopsies from various patients. The tissue was fresh-frozen in and stored at −80° C. Confirmation of the diagnosis of lupus nephritis as well as grading of the severity of tubulointerstitial inflammation was performed by a blinded reading nephropathologist. In addition, de-identified tonsil samples were utilized for antibody testing and validation. Two distinct antibody panels were utilized to stain 3-4 µm thick tissue sections; for pDC analysis—CD3 (clone SP7, abcam or clone CD3-12), CD4 (clone YNB46.1.8), BDCA2 (clone AC144), CD123 (clone 6H6); mDC analysis—CD3, CD4, BDCA1 (clone L161), CD11c (clone EP1347Y). DAPI was used with the above to visualize tissue nuclei. Single fluorochrome controls were utilized to ensure no cross-bleeding was present in between fluorescent channels. Images were acquired at 12 bit depth, 1024×1024 pixel size, at 400× and 630× magnifications utilizing either the SP5 Tandem Scanner Spectral 2-photon confocal microscope or the SP8 3D 3-color STED laser scanning confocal microscope with time gating. In addition to selecting individual ROIs for analysis, selected biopsies underwent tiling, in which the entire available tissue was imaged and a composite stitched image obtained based on default manufacturer settings (SP8). All images were stored as files that were converted to multi-channel .tif images and used as input for DCNN analysis.

Deep Convolutional Neural Network (DCNN)

To serve as truth in training or manual inputs to classification, manual segmentation of confocal images was conducted using software as discussed above. Image channels were rigidly registered using the 'multimodel' configuration of the imregister function in Matlab 18. In alternative embodiments, different software may be used. All segmentations were independently validated by a blinded observer (VML). The total data set for the murine analysis included 295 ROIs, which were segmented for WT T cells, 5CC7 T cells, transferred DCs, and corresponding cell nuclei. The standard score, $z=(x-\mu)/\sigma$ of the ROIs was taken for every individual channel within every ROI independently. All training and inference was performed on z-score transformed ROIs.

The DCNN was trained with a batch size of four 184× 184×6 image patches distributed across 4 graphics processing units with 12 GB memory per card, system memory of 128 GB with 2 high power CPUs (e.g., 2.4 GHz). Image patches were sampled from the entire labeled dataset. Each of the four patches for a training iteration represented one of the four classes to be segmented. Class membership of a patch was determined by the class of the center pixel. Where this 184×184 patch around pixel extended beyond the ROI border, mirror padding was used. Sampling was implemented in software using a list of all pixel locations by class, stored in system memory. The image, label, and data for each ROI was stored in binary 32 bit float format and accessed by software queue runners for active data augmentation (rotation and mirroring) of training examples onto a queue. Error was computed for all classes within the patch.

In addition, binomial cross-entropy was used to compute neural network error over an output image patch of 100×100 pixels, and a reduced input size of 184×184. This dense output was important because it reduces training redundancy and increases training stability. All convolutional and pooling layers were allowed to shrink the input by filter overlap at each layer in x and y, known as valid padding. Convolutional layers were padded in the channel dimension to keep channel dimensions the same. All weights were initialized with Xavier initialization and all biases were initialized at zero. Gradients were averaged across GPUs for each variable at each iteration. Stochastic gradient descent was used for optimization with learning rate of 0.001 with no decay of the learning rate. The DCNN was trained for a total of 200,000 iterations.

Inference was performed on 1024×1024 ROIs with boundary mirroring to fit the field of view. The final segmentation result was taken by assigning each pixel the label of the class with the max predicted probability from the software output. Segmentation performance was assessed using 5-fold cross validation in which a full DCNN model is trained on 4/5 folds of the data set and tested on the 5th fold, for all 5 folds. The sensitivity and specificity of the cell detection was assessed and the mean intersection over union (IOU), defined as $IOU(A,B)=|A \cap B|/|A \cup B|$ was computed for each class of detected cells. All object analysis in this work was conducted using scikit-image. For the purposes of computing sensitivity and specificity, a cell was considered to be detected if the IOU with the truth was >=0.5. In alternative studies, a different threshold may be used.

Following segmentation by the DCNN, minimum and mean minimum distances in between cells or nuclei of interest, the convex and regular area, circularity and eccentricity, convex and regular perimeter, equivalent diameter, major and minor axis lengths, aspect ratio, pixel size, solidity, perimeter:circularity ratio, and probability of belonging to the designated class for each object was computed for detected CD3+CD4+ and CD3+CD4− T-cells. In addition, for every T-cell the minimum distance to the nearest DC was computed in two ways. The first was simply the minimum Euclidean distance found between the all pixels in the T cell and the nearest DC pixel. Mean minimum distance was also computed by averaging the distances from all pixels in the T cell to the nearest dendrite.

Data Analysis and Model Comparison

Mouse adoptive transfer and lupus nephritis data was subjected to multivariate logistic regression, a support vector machine (SVM), random forest, and neural network analyses using R statistical software. The most current versions of the following R packages were used for modeling: randomforest, e1071, xgboost, rpart and rpart.plot, neuralnet, glmnet. The caret package was utilized when multiple instances or tunes were required to be generated and compared. Each instance of SVM, neural network, and random forest model generation was preceded by explicitly invoking a specific kernel seed to allow for result reproducibility. Modeling was performed on log-transformed and normalized input data with a binary outcome variable, representing classification (either wild-type or 5CC7, or CD3+CD4+ or CD3+CD4− cells). Test and train datasets were defined as random 1/3:2/3 selections of input data. All n-fold cross-validations were performed with an n=5. SVM analysis was subjected to linear, radial, and sigmoid kernels when comparing among models. Random forest analysis was used to define the relative importance of predictors as follows: a default of 500 trees were generated for each datapoint using the randomforest package and the optimal Cp parameter was selected based on minimum square error optimization. The resultant RF plots were visualized and the relative importance of each split versus mean decrease in accuracy was recorded. The features across each experiment were compared to determine predictor hierarchy. Results of logistic regression was cross-referenced to ensure data consistency and agreement. ROCR and pROC packages were used to generate AUC curves with the following parameters: 10000 bootstrap replicates with stratification and curve smoothing, a confidence interval alpha of 0.90, corresponding to a type I error of 0.05. Mann-Whitney U-test (also known as unpaired Wilcoxson rank sum test) was utilized whenever group comparisons were performed.

Tuned Convolutional Neural Network (TNN) Generation

After splitting the data based on minimum distance cutoffs, neural network models were generated using the following independent predictors: convex and regular areas, convex and regular perimeters, equivalent diameter, major and minor axis lengths. A total of 3 different models of neural networks were generated and their performance compared: i) a single layer model with (n+1) nodes in the hidden layer, where n is number of predictors; ii) an actively tuned model, with 3:(n−1) nodes in the first hidden layer with the addition of 0:2 additional hidden layers including a maximum of 2 and 1 additional hidden nodes, respectively, and iii) a linear output neural network model with the specification of no hidden layers, constant weights, and linear output. Every network analysis performed was specified with a threshold of 0.1, stepmax of 1*108, default (logistic) activation function, cross entropy error differentiable function, and otherwise default parameters for learning rate, starting weights, and number of repetitions. The performance of each model was compared based on the parameters of total error, classification accuracy, and receiver operator curve performance of correctly predicting cell type.

Definitions

In general, the terms "diagnose", "diagnosing", "diagnosis", and variations thereof refer to the detection, determination, or recognition of a health status or condition of an individual on the basis of one or more signs, symptoms, data, or other information pertaining to that individual. The health status of an individual can be diagnosed as healthy/normal (e.g., a diagnosis of the absence of a disease or condition, diagnosis of a form of cancer that is responsive to immunotherapy) or diagnosed as ill/abnormal (e.g., a diagnosis of the presence of a disease or condition, diagnosis of a form of cancer that is resistant to immunotherapy, etc.). With respect to a particular disease or condition, the terms "diagnose", "diagnosing", "diagnosis", etc. encompass the initial detection of the disease, the characterization or classification of the disease, the detection of the progression, remission, or recurrence of the disease, and the detection of disease response after the administration of a treatment or therapy to the individual.

The terms "prognose", "prognosing", "prognosis", and variations thereof refer to the prediction of a future course of a disease or condition in an individual who has the disease or condition (e.g., predicting patient survival, predicting the need for interventions, predicting the aggressiveness of a cancer, predicting the responsiveness of a disease to a particular treatment, etc.), and such terms encompass the evaluation of disease response after the administration of a treatment or therapy to the individual. Example prognoses include likelihood of mortality (e.g., <1%, <5%, <10<, <20%, <30%, <40%, <50%, >50%, >60%, >70%, >80%, >5 90%, >95%, >99%), likelihood of responsiveness/resistance to treatment (e.g., <1%, <5%, <10<, <20%, <30%, <40%, <50%, >50%, >60%, >70%, >80%, >90%, >95%, >99%), likely lifespan (e.g., <1 month, <2 months, <3 month, <6 months, <1 year, 2 years, 3 years, >3 years, etc.).

"Evaluate", "evaluating", "evaluation", and variations thereof encompass both "diagnosis" and "prognosis" and also encompass determinations or predictions about the future course of a disease or condition in an individual who does not have the disease as well as determinations or predictions regarding the likelihood that a disease or condition will recur in an individual who apparently has been cured of the disease. The term "evaluate" also encompasses assessing an individual's response to a therapy, such as, for example, determining the aggressiveness of a disease or condition, predicting whether an individual is likely to respond favorably to a therapeutic agent or is likely to develop resistance to a therapeutic agent, selecting a therapeutic agent for administration to an individual, or monitoring or determining an individual's response to a therapy that has been administered to the individual.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of analyzing cells, the method comprising:
   receiving, by a transceiver of a computing device, an image of a tissue sample;
   analyzing, by a processor of the computing device, the image of the tissue sample using image analysis, wherein image analysis parameters are determined by machine learning, and wherein the analyzing includes thresholding a probability map image of the tissue sample to identify a cell segmentation corresponding to a cell in the tissue sample;
   determining, by the processor and based on the analyzing, one or more cell features of the cell in the tissue sample, wherein the one or more cell features include a shape of the cell; and
   determining, by the processor and based at least in part on the shape of the cell, whether an interaction of the cell with an additional cell is a cognate interaction or a non-cognate interaction.

2. The method of claim 1, further comprising determining, by the processor and based on the image, a distance from the cell to the additional cell.

3. The method of claim 2, wherein determining whether the interaction of the cell with the additional cell is the cognate interaction or the non-cognate interaction is based at least in part on the distance from the cell to the additional cell.

4. The method of claim 1, further comprising determining, by the processor and based on the image, a type of the cell.

5. The method of claim 4, wherein the type of cell comprises an immune cell, a tumor cell, or an organ cell.

6. The method of claim 1, wherein the image is received from a confocal laser scanning microscopy device, and wherein the image comprises a multi-channel confocal cellular image.

7. The method of claim 1, further comprising determining, by the processor, that the cell comprises an antigen presenting cell (APC) based at least in part on the interaction of the cell.

8. The method of claim 1, further comprising determining, by the processor, that the cell contributes to in situ T cell cognate help based at least in part on a determination that the interaction of the cell with the additional cell is the cognate interaction.

9. The method of claim 1, wherein analyzing the image includes performing max filtering on the image.

10. The method of claim 1, further comprising generating, by the processor, the probability map image.

11. The method of claim 1, further comprising predicting, by the processor, where the cell is likely to be found in the image based at least in part on the probability map image.

12. The method of claim 1, further comprising predicting, by the processor and based at least in part on the probability map image, a likelihood that a pixel of the image belongs to a given cell type.

13. The method of claim 1, further comprising determining, by the processor and based on the cell segmentation, at least one of: an area of the cell, a major axis length of the cell, a minor axis length of the cell, an eccentricity of the cell, an equivalent diameter of the cell, a solidity of the cell, a perimeter of the cell, a circularity of the cell, a major minor axis ratio of the cell, a perimeter to circularity ratio of the cell, and a minimum distance from the cell to a dendritic cell.

14. The method of claim 1, further comprising identifying, using a cross validated support vector machine classifier, a population to which the cell belongs.

15. A method of analyzing cells, the method comprising:
receiving, by a transceiver of a computing device, an image of a tissue sample;
segmenting, by a processor of the computing device, the image of the tissue sample using image analysis, wherein image analysis parameters are determined by deep learning;
identifying, by the processor and based at least in part on the segmenting, a plurality of different cell populations in the tissue sample and a shape of one or more cells in a first cell population; and
determining, by the processor and based at least in part on the shape of the one or more cells in the first cell population, whether an interaction of the first cell population with a second cell population is a cognate interaction or a non-cognate interaction.

16. The method of claim 15, wherein identifying the plurality of different cell populations is performed using a tuned convolutional neural network.

17. The method of claim 15, wherein the segmenting comprises:
determining a location of a cell in the image; and
determining a distance between the cell and another cell in the image.

* * * * *